United States Patent [19]
Iwai et al.

[11] Patent Number: 5,686,718
[45] Date of Patent: Nov. 11, 1997

[54] RECORDING METHOD, DECODING METHOD, AND DECODING APPARATUS FOR DIGITAL INFORMATION

[75] Inventors: Toshiyuki Iwai, Yamatokooriyama; Atsushi Aoki, Kashiba; Masahiro Esashi; Hiroaki Niwamoto, both of Nara, all of Japan

[73] Assignee: Sharp Kabushiki Kaisha, Osaka, Japan

[21] Appl. No.: 616,446

[22] Filed: Mar. 15, 1996

[30] Foreign Application Priority Data

Mar. 15, 1995 [JP] Japan .................. 7-056077

[51] Int. Cl.⁶ ................................. G06K 7/10
[52] U.S. Cl. ......................... 235/494; 235/462
[58] Field of Search .................. 235/494, 462, 235/456, 454, 437, 487

[56] References Cited

U.S. PATENT DOCUMENTS

| | | | |
|---|---|---|---|
| 4,707,612 | 11/1987 | Martin | 235/494 |
| 4,736,109 | 4/1988 | Dvorzsak | 235/494 X |
| 4,874,936 | 10/1989 | Chandler et al. | 235/494 |
| 4,924,078 | 5/1990 | Sant'Anselmo et al. | 235/494 |
| 4,939,354 | 7/1990 | Priddy et al. | 235/494 |
| 5,153,418 | 10/1992 | Batterman et al. | 235/494 |
| 5,343,031 | 8/1994 | Yoshida | 235/494 |
| 5,576,532 | 11/1996 | Hecht | 235/494 |

FOREIGN PATENT DOCUMENTS

| | | |
|---|---|---|
| 2-173879 | 7/1990 | Japan . |
| 2-244293 | 9/1990 | Japan . |
| 3-38791 | 2/1991 | Japan . |
| 5-94561 | 4/1993 | Japan . |
| 6-44397 | 2/1994 | Japan . |
| 07254037A | 3/1995 | Japan . |

OTHER PUBLICATIONS

U.S. application No. 08/578,502 is related and may be considered relevant to this case.

Primary Examiner—Donald T. Hajec
Assistant Examiner—Thien Minh Le
Attorney, Agent, or Firm—David G. Conlin; Brian L. Michaelis

[57] ABSTRACT

There is provided a method for recording digital information that, when digital information is recorded as a two-dimensional pattern on a planar recording surface, the digital information can be easily coded and decoded. A specific pattern for representing a location within the recording surface is made up by giving marks in a specified pattern to a plurality of meshes which are adjoined to one another into a specific shape. A rectangular block is composed of a plurality of meshes adjoined to one another longitudinally and transversely into a rectangular shape and has longitudinal and transverse dimensions larger than those of the specific pattern. A segment in which the specific patterns are overlaid in the units of meshes or circumscribed to the rectangular block is set. An information recording area for expressing the two-dimensional pattern is composed by arraying a plurality of the segments without clearances on the recording surface. The digital information to be recorded is divided according to the number of the segments and then resulting pieces of unitary information are recorded into the segments.

36 Claims, 52 Drawing Sheets

| Arrangement: 1100 Number: 1 | Arrangement: 0110 Number: 2 | |
|---|---|---|
| Arrangement: 1001 Number: 3 | Arrangement: 1011 Number: 4 | Arrangement: 0110 Number: 5 |
| | Arrangement: 1101 Number: 6 | Arrangement: 0010 Number: 7 |
| | Arrangement: 0001 Number: 8 | |

Fig.65
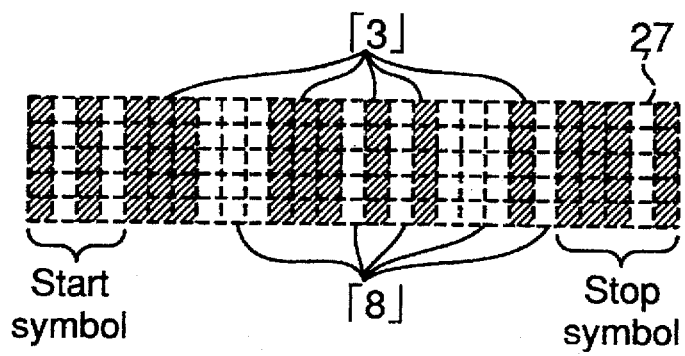
Fig.66
| Code | Module arrangement | Code | Module arrangement |
|------|--------------------|------|--------------------|
| 0    | 00110              | 5    | 10100              |
| 1    | 10001              | 6    | 01100              |
| 2    | 01001              | 7    | 00011              |
| 3    | 11000              | 8    | 10010              |
| 4    | 00101              | 9    | 01010              |
Fig.67
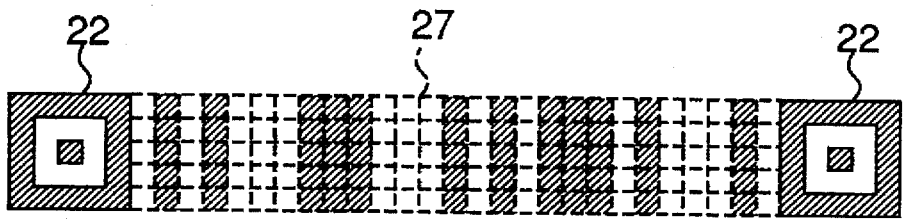

RECORDING METHOD, DECODING METHOD, AND DECODING APPARATUS FOR DIGITAL INFORMATION

BACKGROUND OF THE INVENTION

1. Field of the Invention

The present invention relates to a digital information recording method for recording digital information onto a recording surface as two-dimensional patterns, and also relates to decoding method and decoding apparatus for such digital information.

2. Description of the Prior Art (a) Segmentation

For recording of large capacity data, it is a common practice to record the data in the units of segmented blocks in terms of data management or the like. When information is recorded in such units of blocks, it is an important technique how to segment the blocks or to identify them.

The two-dimensional information recording pertinent to the present invention is exemplified by the multi-stage bar code system. Among the multi-stage bar codes, the Code 49 and the Code 16K use overlapped bar codes, which are segmented from code to code by transverse lines. Another known system is the PDF417 (two-dimensional bar code), in which the stages are discriminated by using sub-sets which differ from stage to stage.

The technique that a plurality of symbols are arrayed to represent one piece of information can also be regarded as a kind of block-by-block division. In such a technique, data can be obtained, for example, by reading arrayed bar codes sequentially one by one.

One of the present inventors has proposed a technique for encoding information in block units in Japanese Patent Application No. HEI 6-070911 which is not a prior art because it was not opened before the priority date of this application. One of the present inventors has also proposed a technique for reading image data in block units by virtually setting rectangular windows in Japanese Patent Application No. HEI 6-185858 which is not a prior art because it was not opened before the priority date of this application. In these cases, whereas no delimiter lines are provided between blocks, and whereas the same sub-sets are used to implement the encoding, it is arranged that data is recorded so that meshes showing the same value will not succeed in series to more than a certain number, and that the data is read in the units of blocks by recognizing the boundaries between the meshes.

For recording of digital information by arraying two-dimensional matrices as described above, when the block-by-block coding methods shown as the prior arts are applied, there arise some problems.

First, in a method in which delimiter lines are provided, a certain extent of width is required to allow a reading device to recognize the delimiter lines. The smaller the meshes for higher density of recorded data, the higher the ratio of the delimiter lines occupying in the recording surface, with a result of poorer storage efficiency. In particular, the Code 49 and the Code 16K have delimiter lines extending over the length from end to end of the recording surface, so that their occupying ratio in the recording surface cannot be disregarded.

Also, in a method in which symbols (bar codes) are arrayed, it would matter, likewise, that silent regions between symbols cannot be used for data recording.

Further, when the sub-sets used for coding are changed from block to block (in the PDF417 method) or when easy-to-read sub-sets are selected (in the technique the present inventor has previously proposed), it is not necessary to provide delimiter lines between blocks or control information for reading the silent regions. However, sine one bit of the data cannot be simply replaced with a white or black of one mesh in the coding process, there is still a problem that the storage efficiency lowers.

SUMMARY OF THE INVENTION

An object of the present invention is therefore to provide a digital information recording method which allows a recording surface to be used efficiently by setting an information recording area as a combination of segments, which are regions represented in synchronization with specified patterns.

Another object of the present invention is to provide a digital information recording method which allows the information recording area to be set into any desired configuration.

(b) Decoding method and decoding apparatus for digital information

For reading two-dimensionally recorded information as image information, there are some cases where an information recording area becomes so large that data is not captured into the memory of a reading device at a time. Another problem is that when the entirety of a large information recording area where data is recorded by a digital recording method of two-dimensional mesh arrangement is read with a CCD camera or the like, the number of CCD devices corresponding to one mesh is so small that the information could not be read correctly.

For reading two-dimensionally recorded information with a CCD camera or the like, there has already been known a technique of magnifying the image by using an optical system. For example, there is provided a method of reading information by magnifying symbols such as bar codes to an appropriate magnification by using an optical system. However, this technique is based on the assumption that the whole image of the recording surface will be present on the image sensor still after the magnification is effected (as for the bar code, however, it is suggested that bar code information can be read by using a known bar code automatic restoration function even if the whole image of the symbols cannot be developed on the image sensor).

Therefore, it is a further object of the present invention to provide a digital information decoding method and decoding apparatus which allow recorded information recorded by the aforementioned digital information recording method to be read simply and conveniently in the units of segments.

(c) Utilizing marginal portions of recording surface (1) Setting frame information Japanese Patent Laid-Open Publication No. HEI 03-038791 discloses a technique that positioning boundaries using black meshes are provided in adjacency to at least two sides, or edge lines, of the information recording area.

When the positioning boundaries are provided by using black meshes along the sides of the information recording area as in this case, it is necessary to use meshes of at least a length corresponding to the length of the sides as the positioning boundaries.

Particularly when certain patterns (specific pattern) are arranged along the sides of the information recording area, conceivable are a system in which positioning boundaries are further provided outside the information recording area, and another system in which positioning boundaries are provided only at portions which do not overlap the specific patterns within the information recording area. The former system involves larger numbers of meshes constituting the positioning boundaries than the latter system, so that the latter is more advantageous in terms of storage efficiency. However, the latter system may encounter difficulty in searching for specific patterns because the positioning boundaries and the specific patterns adjoin.

Therefore, a yet further object of the present invention is to provide a digital information recording method which makes it possible to provide frame information for discriminating the range of the information recording area within the recording surface in the process of arranging the specific patterns along the sides of the information recording area, and also which makes it easy to search for specific patterns along the sides of the information recording area in reading process.

(2) Setting readable characters and the like

Japanese Patent Laid-Open Publication No. HEI 03-038791 describes an example in which symbols that can be read not only by machine but also by viewing with human eyes are recorded on the recording surface. The information that can be read by persons is therein exemplified by alphabets, numerals, or Morse codes. Aside from the fact that the information can be read by persons, the publication has no description on what purpose the information can be used for.

However, as far as those examples are concerned, the information contained in the symbols is only one which can be read by persons (principally, expressions of analog information in the digital form). It is not said that the Japanese Patent Laid-Open Publication discloses a technique in which both information readable for persons and digital information recognizable by reading devices can be mixedly presented in one symbol.

Therefore, still another object of the present invention is to provide a digital information recording method which allows information useful for reading operation or information recognizable for persons to be contained in regions that are not used as segments or specific patterns when dividing the recording surface in the units of segments.

(3) Setting information for discriminating top and bottom, right and left of recording surface Also, an object of the present invention is to provide a digital information recording method which allows information with which the top and bottom, right and left, and front and rear can be discriminated visually by persons or internally by the reading device, to be contained in regions that are not used as segments or specific patterns when dividing the information recording area in the units of segments.

(4) Setting silent regions and clock information

Yet another object of the present invention is to provide a digital information recording method which allows information that makes it easier to extract specific patterns arranged at specified positions from within the recording surface, to be contained in regions that are not used as segments or specific patterns when dividing the recording surface in the units of segments.

(d) Bar codes and matrix codes

The method of recording digital information by two-dimensional matrix array makes it possible to implement higher density recording than one-dimensional bar codes. However, in two-dimensional information recording in the units of meshes, only a change in the value of one mesh would make it impossible to read recorded information correctly. On the other hand, the one-dimensional bar code is, indeed low in the amount of recordable information, but high in redundancy as compared with the information recording with two-dimensional mesh arrangement, so that even partly crushed information can be correctly read in many cases.

Thus, a further object of the present invention is to provide a digital information recording method which has both the advantage of the one-dimensional bar code of high redundancy and the advantage of the information recording of two-dimensional mesh arrangement that allows high density recording.

In addition, Japanese Patent Laid-Open Publication No. HEI 6-44397 has disclosed a technique of reading one-dimensional codes (bar codes) by using a device designed to read two-dimensional codes. A one-dimensional code is captured as two-dimensional bit map data, recognized as a bar code, and decoded. However, a one-dimensional code and a two-dimensional code to be read by this device are recorded at absolutely different areas. Such a recording method has never been known that one-dimensional codes and two-dimensional codes are mixedly recorded in the same information recording area. Moreover, when a two-dimensional mesh pattern becomes absolutely identical to a bar code pattern, this device is unable to discriminate whether the information is a two-dimensional code or a one-dimensional code. To be able to discriminate it, it is required to adopt a two-dimensional code having a format that will never have an arrangement absolutely identical to a bar code, such that the format of the two-dimensional bar code is largely limited.

(e) Index information

It is assumed that, for making up the information recording area by combining a plurality of segments, supplementary information such as the array state of segments or the format of data recorded in the segments is referred to as index information for data.

Japanese Patent Laid-Open Publication No. HEI 2-173879 has disclosed a technique of expressing information relating to data size in the primary scan direction by providing one format mark to eight meshes, a number of meshes corresponding to the bits. This makes it possible to read data even when the data width in the primary scan direction differs depending on the recording medium.

In this way, an efficient reading is enabled by obtaining information relating to data arrangement before reading original recorded information.

Likewise, also when an information recording area is made up by combining a plurality of segments together, an efficient reading is enabled by obtaining knowledge, prior to reading the original recorded information, how many segments the information recording area is made up of, or how the segments are arranged (for example, the number of segments longitudinal by transverse).

Further, when the length of data recorded in the information recording area or an error correcting code to the data has been added, or when an interleave has been performed, an efficient reading is enabled by obtaining the information relating to the types of error correcting code and interleave and the like.

In addition, Japanese Patent Laid-Open Publication No. HEI 02-244293 discloses a technique that important information is recorded in a central portion of the substrate that is relatively unsusceptible to dirt. This technique, however, is indeed advantageous for less effect of dirt, but could not be advantageous for reading information prior to other information such as index information.

Thus, still another object of the present invention is to provide a digital information recording method which allows index information relating to segments or recorded information recorded in the segments to be easily obtained prior to reading the original recorded information. A further object of the present invention is to provide a digital information recording method which allows index information to be obtained without problem even when index information of one place has crushed.

In order to achieve the aforementioned objects, according to the present invention, there is provided a method for recording digital information, comprising the steps of virtually setting in a matrix form meshes corresponding to bits on a planar recording surface, providing the meshes with optically recognizable marks corresponding to digital information to be recorded, and recording the digital information to be recorded as a two-dimensional pattern, and further comprising the steps of:

setting a specific pattern for representing a location within the recording surface, said specific pattern being made up by giving the marks in a predetermined pattern to a plurality of meshes which are adjoined to one another into a specific shape, and setting a rectangular block which is composed of a plurality of meshes adjoined to one another longitudinally and transversely into a rectangular shape and which has longitudinal and transverse dimensions larger than those of the specific pattern;

setting a segment in which the specific patterns are overlaid or circumscribed to the rectangular block in the units of meshes;

setting an information recording area in which the two-dimensional pattern is to be expressed, by arraying a plurality of the segments without clearances on the recording surface;

preparing pieces of unitary information by dividing the digital information to be recorded according to a number of the segments, and assigning the pieces of unitary information to the segments, respectively; and recording the pieces of unitary information to meshes other than those occupied by the specific patterns within the respective segments.

In the method for recording digital information according to the present invention, the pieces of unitary information are prepared by dividing the digital information to be recorded according to the number of segments, and the resulting pieces of unitary information are allocated to the segments, respectively, and thus recorded. Therefore, the digital information can be managed in the units of segments. For example, upon a mis-read of information recorded in a particular segment, it is possible to read again only the segment. Otherwise, it is possible to suppress the effect of the mis-read to only one segment.

Also, by setting the specific pattern to small size, a more efficient use is made of the information recording area, as compared with cases where segmenting lines or the like are used.

A method for recording digital information according to an embodiment comprises the steps of:

preparing divisional patterns by dividing specific patterns in at least one direction of longitudinal and transverse directions within the respective segments, and locating the divisional patterns so that they are inscribed on the four corners of the rectangular block, respectively;

arraying the segments so that the specific pattern is synthesized from the divisional patterns allocated to adjoining four rectangular blocks, over a point where the four rectangular blocks are adjoining one another with their vertices abutting.

In the method for recording digital information according to the embodiment, the specific patterns are resultantly placed at vertices of the rectangular block, which are constituent elements of the segment. Therefore, when reading the recorded information, it is possible to extract, as one segment, a range defined by adjoining four specific patterns placed at positions corresponding to the vertices of the rectangular block. It is also possible to determine the positions of the individual meshes within the segment, by referring to the positions of the four specific patterns. In such a case, the reading precision is enhanced as compared with the case where the position of one specific pattern is referred to. Further, the data of any given mesh within the segment can be read by using the positional information of the set of the four specific patterns.

According to an embodiment, in the segments present along a perimeter of the information recording area, the divisional patterns that are located on the perimeter side of the blocks are combined with the divisional patterns that are circumscribed to the blocks to synthesize the specific pattern.

With this arrangement, the specific patterns are arranged resultantly in a complete state on the perimeter side of the segments. As a result, even for the segments present along the perimeter of the information recording area, it is possible to correctly determine the positions of meshes within the segments by referring to the positions of the four specific patterns synthesized at the four corners of the segments. Thus, the reading precision is enhanced.

In a method for recording digital information according to an embodiment, number information representing a sequence of the pieces of unitary information is recorded to the segments.

Therefore, in reading the recorded information, the pieces of unitary information are read from the segments in the same sequence as the pieces of unitary information have been recorded in the recording stage. Accordingly, the original digital information is restored easily. As a result, the information recording area can be set into any desired configuration in the recording stage.

In a method for recording digital information according to an embodiment, adjacency information representing whether or not each of the segments has a adjoining segment is recorded to the segments.

Therefore, in reading the recorded information, it is possible to read the respective segments one after another while confirming whether or not one segment has a adjoining segment, based on the adjacency information. As a result, the information recording area can be set into any desired configuration in the recording stage.

In a method for recording digital information according to an embodiment, the segments are arrayed according to specified array rules containing a direction and a number with which the segments should be arrayed.

Therefore, in reading the recorded information, the pieces of unitary information is read from the individual segments in the same sequence as they have been recorded in the recording stage, based on the array rules. As a result, the original digital information is easily restored. For example, when the width or shape of the information recording area needs to be changed in accordance with the size or shape of the printing paper, the arrangement of segments is automatically determined only by, for example, specifying the number of segments to be arrayed transverse.

It is noted that the array rules here refer not to the specification of how to array each of the segments, but to an upper concept containing the direction and number with which the segments are to be arrayed. For example, it may specify a rule that the information recording area be set into a square, or that arraying ten segments transverse and then arraying another group of segments to a row next to the row.

According to an embodiment, there is provided a method for decoding digital information which comprises the steps of: recognizing a portion of the recording surface corresponding to a corner of the information recording area;

recognizing four specific patterns located at positions corresponding to vertices of one rectangular block present at the corner of the information recording area;

decoding, within one segment specified by the four specific patterns in the information recording area, a pattern represented by meshes other than those occupied by the specific patterns to thereby read the unitary information assigned to the segment;

detecting four specific patterns located at positions corresponding to vertices of a rectangular block adjoining the one rectangular block;

decoding, within a segment adjoining the one segment specified by the four specific patterns in the information recording area, a pattern added to meshes other than those occupied by the specific patterns to thereby read the unitary information assigned to the segment; and linking the unitary information read from the one segment with the unitary information read from the segment adjoining the one segment.

In the method for decoding digital information according to the embodiment, reformation recorded by the method for recording digital information as described in the above embodiment is easily restored. Particularly because the information is read in the units of segments, the reading precision is enhanced as compared with the case where the entire information recording area is read and decoded. Also, because the information is read in the units of segments, the memory capacity necessary for image information to be stored in decoding operation is only required to correspond to one segment size, advantageously. The reason is that when one segment is finished being decoded, the result is outputted, where the image memory is required now only to store (overwrite) image information about the next segment. This means that even if the image memory capacity is constant, the digital information recorded to a wide-range information recording area is read. It is noted that when the entire information recording area is read as image information at a time, the memory capacity corresponding to the image information of the entire information recording area is needed.

Further, it is possible to perform, in the units of segments, such processes as reading error detection or error correction. In such a case, an excess bit such as a checksum or CRC is added for each segment. It is also possible to implement, in the units of segments, a shuffling process for dispersing burst errors.

Further, it is also possible to read again only the target segment upon generation of a reading error. Also, in a process of increasing the magnification of the CCD camera for reading the segment again or in a process of analyzing the read image by using a higher-precision analysis method, it is possible to read again the segment by a method different from that used for the first reading. In this case, if a method that could be expected to do high-speed processing is used for the first reading operation and a lower-speed but higher-precision method is used for the re-reading operation, then a high-speed, high-reliability reading as a whole is achieved.

An apparatus for decoding digital information according to an embodiment comprises a reading means opposed to the recording surface, for outputting image information representing an opposing portion out of a two-dimensional pattern recorded on the recording surface; and a control means for performing control steps of: moving the recording surface and the reading means relatively to each other; recognizing a portion of the recording surface corresponding to a corner of the information recording area based on image information outputted by the reading means; thereafter, recognizing four specific patterns located at positions corresponding to vertices of one rectangular block present at the corner of the information recording area; decoding, within one segment specified by the four specific patterns in the information recording area, a pattern represented by meshes other than those occupied by the specific patterns to thereby read the unitary information assigned to the segment; subsequently, with a reading range in the recording surface changed by moving the recording surface and the reading means relatively to each other, detecting four specific patterns located at positions corresponding to vertices of a rectangular block adjoining the one rectangular block; decoding, within a segment adjoining the one segment specified by the four specific patterns in the information recording area, a pattern added to meshes other than those occupied by the specific patterns to thereby read the unitary information assigned to the segment; and linking the unitary information read from the one segment with the unitary information read from the segment adjoining the one segment.

In the apparatus for decoding digital information according to the embodiment, the method for recording digital information according to the preceding embodiment can be carried out. Therefore, the functional advantages as expected from the preceding embodiment are obtained.

According to an embodiment, the reading means comprises an optical system that can change a magnification with which a two-dimensional pattern recorded on the recording surface is converted into the image information;

the control means performs at least a control step of changing the magnification of the optical system between the step of recognizing a portion of the recording surface corresponding to a corner of the information recording area and the step of reading the unitary information from the segment specified by the four specific patterns in the information recording area.

In the information decoding apparatus according to the embodiment, the control means performs at least a control step of changing the magnification of the optical system between the step of recognizing a portion of the recording surface corresponding to a corner of the information recording area and the step of reading the unitary information from the segment specified by the four specific patterns in the information recording area. Therefore, the precisions with which the optical reading means captures image information are set to levels appropriate for the above steps.

In more detail, in the former step, image information is captured with such a coarse precision that the entire information recording area is included in the field of view, where the portions corresponding to corners of the information recording area are recognized. In the latter step, the image precision can be adjusted by increasing the magnification of the optical system, so that the marks added to the meshes within the segments can be detected, where the unitary information can be read from the segments specified by the four specific patterns. As a result, the reading operation can be carried out at high speed and besides the reading precision is further enhanced.

According to an embodiment, there is provided a method for recording digital information, comprising the steps of virtually setting in a matrix form meshes corresponding to bits in a generally rectangular information recording area provided within a planar recording surface, providing the meshes with optically recognizable marks corresponding to digital information to be recorded, and recording the digital information to be recorded as a two-dimensional pattern, and further comprising the steps of:

arranging a plurality of specific patterns for representing a location within the recording surface in such a way that the specific patterns are spaced from and paralleled to one another with specified intervals in directions of row and column in the information recording area, said specific patterns being made up by giving the marks in a specified pattern to a plurality of meshes which are adjoined to one another into a specific shape; and arranging the specific patterns arrayed in the direction of row or column to locations where the specific patterns protrude out of the information recording area with respect to at least one side of the information recording area.

In the method for recording digital information according to the embodiment, specific patterns arrayed in rows or columns are located so as to protrude out of the information recording area at its at least one side. Therefore, in reading operations, the specific patterns located at such protruding positions are more easily found. For example, if "black" information is obtained through a search made along the side of the information recording area, then the "black" is regarded as part of a specific pattern so that the specific pattern are recognized. Thus, specific patterns located at protruding positions are easily recognized.

A method for recording digital information according to an embodiment comprises the step of: placing, in marginal portions each defined by a side of the information recording area and opposing sides of two adjacent protruding specific patterns, a frame pattern extending along an outer tangent line of the information recording area with at least a clearance of one mesh size with respect to the opposing side of the protruding specific patterns.

In the method for recording digital information according to the embodiment, in the marginal portions each defined by a side of the information recording area and opposing sides of two adjacent protruding specific patterns, the frame patterns extending along an outer tangent line of the information recording area are arranged. Therefore, the range of the information recording area on the recording surface is easily detected during a reading operation. Also, the frame patterns are arranged with a clearance of at least one mesh size with respect to the opposing side of the protruding specific patterns. Therefore, the search for the protruding specific patterns is not obstructed. Accordingly, it becomes easy to search for specific patterns. For example, assuming that the frame patterns and the protruding portions of specific patterns are "black", during a search made along the side of the information recording area, each time black information and white information are switched over, it can be considered that a specific pattern, a one-mesh size clearance, a frame pattern, a one-mesh size clearance, and a specific pattern have switchedly appeared one by one in this order. As a result, the search for the specific patterns placed at the protruding positions is not obstructed, so that the search for the specific patterns is easily carried out.

In a method for recording digital information according to an embodiment, in the marginal portions, clocking patterns provided with marks alternately different from one another with respect to the direction along the side of the information recording area are arranged.

Therefore, it becomes easy to find, from one specific pattern protruding out of the side of the information recording area, another specific pattern during a reading operation. Also, based on the clocking patterns, the positions of the meshes within the information recording area are determined correctly.

In order to find, based on the position of one specific pattern, its adjacent specific pattern belonging to the same row or column, it is general practice to adopt a method of obtaining information on the size of a mesh from the specific pattern, and deducing the presence of the adjacent specific pattern at a position away therefrom by a known number of meshes. This method, however, has a possibility that the search may involve a positional shift because a distant position is predicted. In contrast to this, if a search is made for the adjacent specific pattern by tracking clocking patterns while correction is made one after another, the predictive position of the adjacent specific pattern is set correctly, so that the adjacent specific pattern is easily found.

In a method for recording digital information according to an embodiment, the presence or absence of patterns in the marginal portions each defined by a side of the information recording area and the circumscribed divisional patterns are switched over, between segments present at the corners of the information recording area and the other segments out of the segments present along the perimeter of the information recording area, or patterns different from one another are arranged in the marginal portions concerning segments present at the corners of the information recording area and the other segments out of the segments present along the perimeter of the information recording area.

Therefore, the segments present at the corners of the information recording area are easily recognized during a reading operation.

It is noted that whether or not segments are present at the corners of the information recording area can be a decision criterion for the end condition in the process of reading recorded digital information in the units of segments.

According to an embodiment, there is provided a method for recording digital information, comprising the steps of virtually setting in a matrix form meshes corresponding to bits in an information recording area provided within a planer recording surface, providing the meshes with optically recognizable marks corresponding to digital information to be recorded, and recording the digital information to be recorded as a two-dimensional pattern, and further comprising the step of:

expressing, in the units of meshes, characters or symbols that can be understood by persons as they are, at part of the information recording area.

In the method for recording digital information according to the embodiment, characters or symbols that can be understood by persons as they are, are expressed, in the units of meshes, at part of the information recording are. Therefore, both information that can be directly understood by persons and information that cannot be directly understood by persons are recorded in one information recording area at the same time. Further, both types of information are read by one decoding apparatus in reading operation, so that it can be known what pattern constitutes each type of information.

Applicable characters or symbols that can be understood by persons as they are, may be, for example, information necessary for a reading operation, such as instructions on the direction of insertion to the scanner, or information on the contents of recorded digital information (file name or the like).

According to an embodiment, there is provided a method for recording digital information, comprising the steps of virtually setting in a matrix form meshes corresponding to bits in an information recording area provided within a planer recording surface, providing the meshes with optically recognizable marks corresponding to digital information to be recorded, and recording the digital information to be recorded as a two-dimensional pattern, and further comprising the steps of:

arranging, in the information recording area, specific patterns for representing a location within the recording surface, said specific patterns being made up by giving the marks in a specified pattern to a plurality of meshes which are adjoined to one another into a specific shape; and expressing, in the units of meshes, characters or symbols that can be visually recognized by persons, at part of regions other than regions where the specific patterns are arranged, in the information recording area.

In the method for recording digital information according to the embodiment, specific patterns are arranged in the information recording area. Therefore, during reading operations, the positions of the individual meshes in the information recording area can be correctly determined based on the specific patterns, so that the reading precision is enhanced. Still, as in the preceding embodiment, both information that can be directly understood by persons and information that cannot be directly understood by persons can be recorded in one information recording area at the same time.

According to an embodiment, there is provided a method for recording digital information, comprising the steps of virtually setting in a matrix form meshes corresponding to bits in an information recording area provided within a planar recording surface, providing the meshes with optically recognizable marks corresponding to digital information to be recorded, and recording the digital information to be recorded as a two-dimensional pattern, and further comprising the steps of:

arranging, in the information recording area, specific patterns for representing a location within the recording surface, said specific patterns being made up by giving the marks in a specified pattern to a plurality of meshes which are adjoined to one another into a specific shape; and arranging patterns representing top and bottom, right and left, and front and rear of the recording surface, at part of regions other than regions where the specific patterns are arranged, in the information recording area.

In the method for recording digital information according to the embodiment, patterns representing top and bottom, right and left of the recording surface are arranged at part of regions other than regions where the specific patterns are arranged, in the information recording area. Therefore, during reading operations, the positions of the individual meshes in the information recording area are correctly determined based on the specific patterns, so that the reading precision is enhanced. Still, since the patterns representing the top and bottom, right and left, and front and rear of the recording surface are arranged at part of regions other than regions where the specific patterns are arranged in the information recording area, the top and bottom, right and left, and front and rear of the recording surface are easily discriminated during reading operations.

For example, in reading the recording surface optically by using a CCD camera or the like, no matter what direction the recording surface is read in, the top and bottom, right and left, and front and rear of the recording surface are discriminated by the processing by the decoding apparatus based on the patterns. In particular, if the patterns representing the top and bottom, right and left, and front and rear are understood by persons as they are, it becomes possible for persons to visually discriminate the top and bottom, right and left, and front and rear of the recording surface. Accordingly, even when the recording surface is read optically by using a paper-feed type scanner, the paper can be inserted into the scanner in a correct direction.

According to an embodiment, there is provided a method for recording digital information, comprising the steps of virtually setting rectangular meshes corresponding to bits and arrayed into a matrix form, in an information recording area provided within a planar recording surface, providing the meshes with optically recognizable marks corresponding to digital information to be recorded, and recording the digital information to be recorded as a two-dimensional pattern, and further comprising the step of:

recording bar codes made up from bars and spaces in the units of meshes, at part of the information recording area.

In the method for recording digital information according to the embodiment, both the bar codes as one-dimensional codes and the two-dimensional patterns made up by providing marks to the meshes are recorded in the same information recording area in the units of meshes. Because both are in the units of meshes, the same print control method can be applied for printing operations. Also, both types of information can be decoded by using the same decoding apparatus during reading operations. Further, if the bar code portions can be extracted from captured image information, the bar code portions can be decoded by one-dimensional scanning.

Also, since the bar and space constituting the bar codes are made up by using a plurality of meshes, they have larger redundancies as compared with a pattern in which one mesh represents one value. As a result, portions where reading errors are unlikely to occur (bar code portions) can be formed in the information recording area. Such portions where reading errors are unlikely to occur are suitable for recording important information such as index information.

A method for recording digital information according to an embodiment further comprises the steps of: arranging in regions other than regions occupied by the bar codes in the information recording area, specific patterns for representing a location within the recording surface, said specific patterns being made up by giving the marks in a specified pattern to a plurality of meshes which are adjoined to one another into a specific shape.

In the method for recording digital information according to the embodiment, the specific patterns are arranged in the information recording area. Therefore, during reading operations, the positions of the individual meshes in the information recording area can be correctly determined based on the specific patterns, so that the reading precision can be enhanced. Still, the same functional advantages as in the preceding embodiment can be effected. In addition, when the specific patterns arrayed in rows or columns are arranged at locations where they protrude out of the information recording area at its at least one side, an efficient use can be made of the recording surface by recording the bar codes in the marginal portions each defined by a side of the information recording area and opposing sides of two adjacent protruding specific patterns.

A method for recording digital information of an embodiment comprises the step of: recording in marginal portions each defined by a side of the information recording area and the circumscribed divisional patterns, index information representing at least one of an array state of the segments, size of digital information recorded in the information recording area, coding method and error correction method for pieces of unitary information recorded within the segments.

In the method for recording digital information according to the embodiment, index information is recorded in marginal portions defined by a side of the information recording area and the circumscribed divisional patterns. Therefore, in reading operations, an efficient reading is enabled by reading the index information prior to reading information recorded to segments. For example, during a reading operation, by previously knowing the size of digital information recorded in the information recording area as index information, memory buffer necessary for decoding can be ensured. Further, by previously knowing the array state of segments, for example, the number of segments or their longitudinal and transverse numbers, an efficient reading is enabled.

Also, since the error correction method (code) or interleave method added to data can be recorded for each recording carrier, there will not occur disturbances in reading operations even if error correction methods or interleave methods are different every one recording carriers. This is because the error correction method (code) or interleave method can be previously known by the recorded index information.

Furthermore, the index information is recorded in the marginal portions, and not within the segments of the information recording area. As a result, recording the index information will never cause any reduction in the amount of information that can be recorded in the information recording area.

A method for recording digital information according to an embodiment comprises the step of: recording in segments present at particular positions within the information recording area, index information representing at least one of an array state of the segments, size of digital information recorded in the information recording area, coding method and error correction method for pieces of unitary information recorded within the segments.

In the method for recording digital information according to the embodiment, the index information representing the array state of segments or the like is recorded in segments present at particular positions within the information recording area. Therefore, during reading operations, by first reading the segment, the array state and the like of the segments present at other locations can be known. As a result, an efficient reading is enabled.

In a method for recording digital information according to an embodiment, the information recording area is set into a generally rectangular shape; and the index information is recorded to the segments present at the four corners of the information recording area.

In the method for recording digital information according to the embodiment, the index information is recorded to the segments present at the four corners of the information recording area. Therefore, since the segments present at the four corners of the information recording area can be found more easily than the segments present at other positions, the index information can be easily captured prior to reading the segments present at the other positions. As a result, an efficient reading is enabled.

According to an embodiment, there is provided a method for recording digital information, comprising the steps of virtually setting in a matrix form meshes corresponding to bits on a planar recording surface, providing the meshes with optically recognizable marks corresponding to digital information to be recorded, and recording the digital information to be recorded as a two-dimensional pattern, and further comprising the steps of:

setting rectangular small blocks composed of a plurality of adjoining meshes;

arraying a plurality of the small blocks without clearances on the recording surface to thereby set an information recording area where the two-dimensional pattern is to be expressed; and preparing pieces of unitary information by dividing the digital information to be recorded according to a number of the small blocks, and assigning and recording the pieces of unitary information to the small blocks, respectively; and further comprising the step of:

recording to small blocks present at particular locations in the information recording area, index information representing at least one of an array state of the small blocks, size of digital information recorded in the information recording area, and coding method and error correction method for the pieces of unitary information recorded in the small blocks.

In the method for recording digital information according to the embodiment, to the small blocks present at the particular locations in the information recording area, the index information representing the array state of the small blocks or other information is recorded. Therefore, during reading operations, by first reading the small blocks, the array state and the like of the small blocks present at the other positions can be known. As a result, an efficient reading is enabled.

According to an embodiment, the information recording area is set into a generally rectangular shape; and the index information is set to small blocks present at the four corners of the information recording area.

In the method for recording digital information according to the embodiment, the index information is recorded to the small blocks present at the four corners of the information recording area. Since the small blocks present at the four corners of the information recording area are found more easily than the small blocks present at other positions, the index information are captured easily prior to reading the small blocks present at the other positions. As a result, an efficient reading is enabled.

In methods for recording digital information according to embodiments, identical index information is recorded to a plurality of marginal portions, segments, or small blocks, respectively.

In this case, during reading operations, even if index information recorded at one place is mis-read, correct index information can be read from other places.

For example, let us consider a case where identical index information is recorded to the four segments present at the four corners of the information recording area. Whereas the index information of the segment of the left top corner is normally used, there are some cases where the specific pattern of the left top corner crushes such that the segment of the left top corner cannot be recognized. In such a case, by reading the segment of the right top corner, the index information is obtained. Further, if the number of segments arrayed transverse can be obtained from the index information obtained from the segment of the right top corner, then the specific pattern of the left top corner is supplemented so that the segment of the left top corner can be read newly once gain.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 44A is an example of a square layout, FIG. 44B is an example in which the number of transverse segments is two, and FIG. 44C is an example in which the number of longitudinal segments is two;

FIG. 63A is an example in which a different peripheral specific pattern within the information recording area is mis-recognized as the specific pattern of the left top corner, FIG. 63B is an example in which a pattern resembling the specific pattern inside the information recording area is mis-recognized as the specific pattern of the left top corner, and FIG. 63C is an example in which a dirt or the like resembling the specific pattern outside the information recording area is mis-recognized as the specific pattern of the left top corner;

FIG. 65 is a view showing an example in which a two-digit decimal number is encoded by using a bar code technique (ITF) upon a region made up of transverse 27×longitudinal 5 meshes;

FIG. 66 is a chart showing module arrangements for encoding decimal numbers by using ITF;

FIG. 67 is a view showing an example in which the coding information of FIG. 65 is inverted between white and black and set in the marginal portion of FIG. 59 for the purpose of clarifying the boundaries between specific patterns and bar codes;

FIG. 68A shows an example in which information is represented by the number, position, and thickness of bars, and FIG. 68B shows an example in which information is represented by on which row of the marginal portion three seriated meshes appear;

FIG. 70A shows an example in which an arrow pattern is recorded in a laterally long marginal portion, and FIG. 70B shows an example in which an arrow pattern is recorded in a longitudinally long marginal portion;

FIG. 71A shows an example in which 'SHARP' is written in alphabetical capitals, and FIG. 71B shows an example in which 'SHOIN' is written in alphabetical capitals;

FIG. 73A shows an example in which a checkered pattern is set for discrimination between top and bottom, right and left, FIG. 73B shows an example in which an arrow pointed to top is set, and FIG. 73C shows an example in which readable characters 'WP' are set;

DETAILED DESCRIPTION OF THE PREFERRED EMBODIMENTS (1) Basic construction of digital information recording carrier FIG. 1 shows a digital information recording carrier according to one embodiment of the present invention, wherein two-dimensional patterns of digital information are shown in detail. FIG. 2 schematically illustrates the recording carrier wherein the two-dimensional patterns are schematically shown. The carrier is a sheet of paper in this example.

Figure 1:
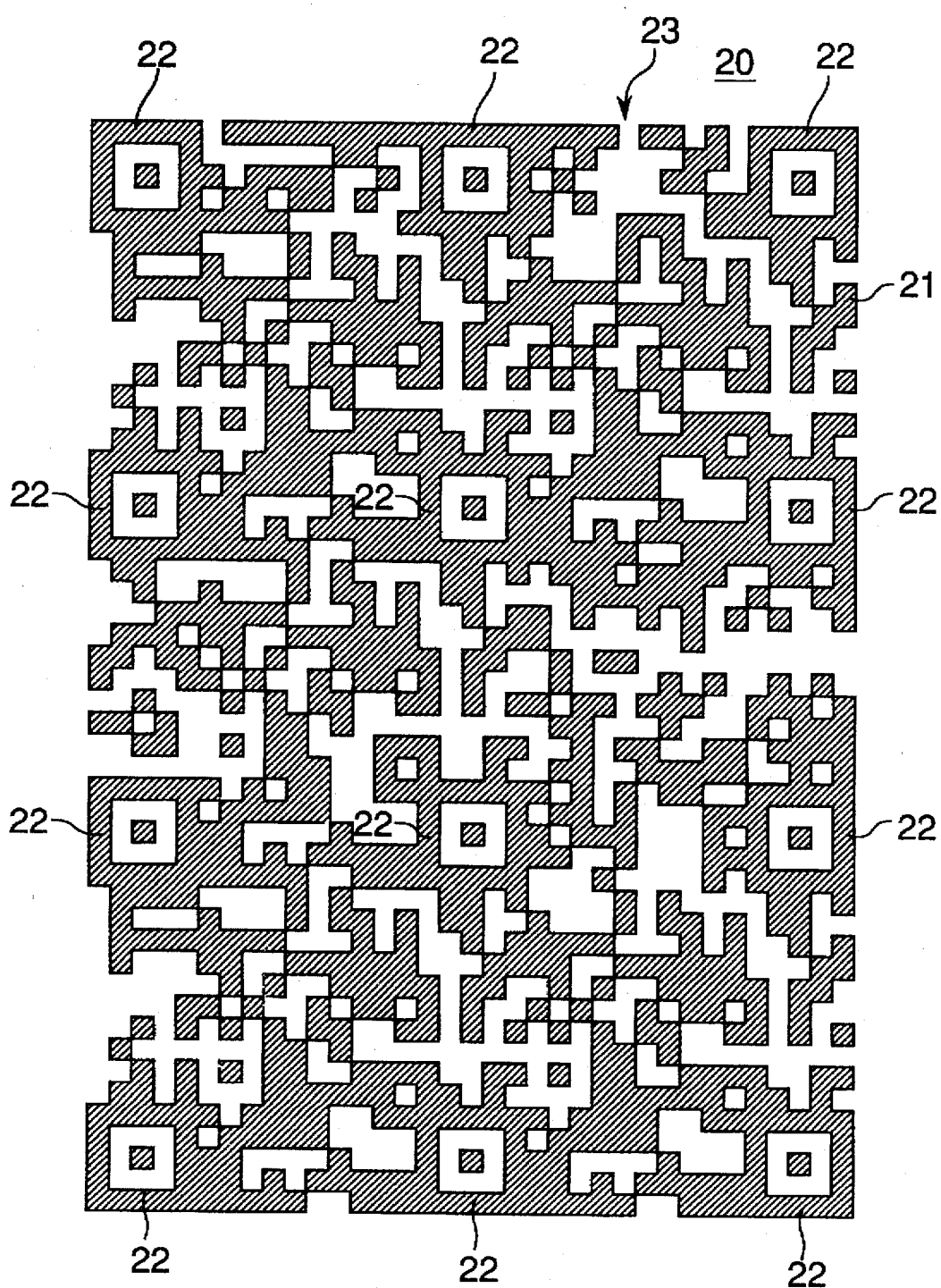
FIG. 1 is a view showing an aspect of a digital information recording carrier used in the field to which the present invention is applied.

On a recording surface 20 of this digital information recording carrier, matrix-shaped square meshes corresponding to bits of digital information are virtually set and each provided with a white (a light) representing a "0" or a black (a dark) representing a "1" as an optically recognizable mark (in the drawings, the black is expressed by hatching for the sake of convenience). With this provision, digital information is recorded as two-dimensional patterns on the recording surface 20.

Figure 2:
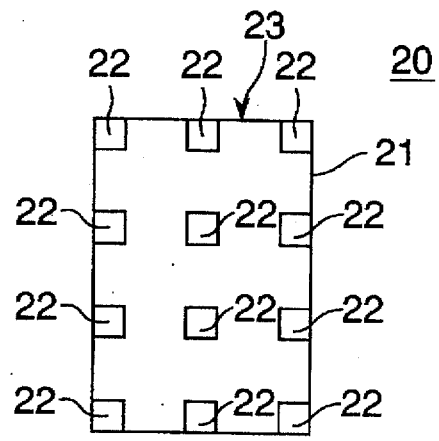
FIG. 2 is a view schematically showing the digital information recording carrier of FIG. 1.
Figure 7:
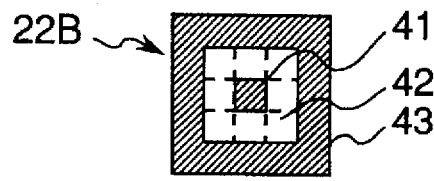
FIG. 7 is a view showing another preferred example of the specific pattern.

On the recording surface 20, within a rectangular information recording area 23 where information is actually recorded, a plurality of specific patterns 22 are placed at clearances among regions 21 representing the recorded information proper. The specific patterns 22 are each composed of a plurality of meshes provided with white and black in a specific pattern. In this example, twelve specific patterns 22 (longitudinal 4×transverse 3=12) are placed in a matrix shape at constant longitudinal and transverse spacings in the rectangular information recording area 23. As can be well understood from FIG. 2, ten specific patterns 22 belonging to the top and bottom rows and the right and left columns are placed along the perimeter of the information recording area 23, while the remaining two specific patterns 22 are placed in an internal region (near the center) separated from the perimeter of the information recording area 23. It is noted that a specific pattern 22B as shown in FIG. 7 is adopted as the specific pattern 22 in this example (the specific patterns themselves will be detailed later).

When specific patterns 22 are placed inside of the information recording area 23 apart from its perimeter, it is possible to correctly read out recorded digital information even if the recording surface 20 is distorted more or less.

Figure 3A:
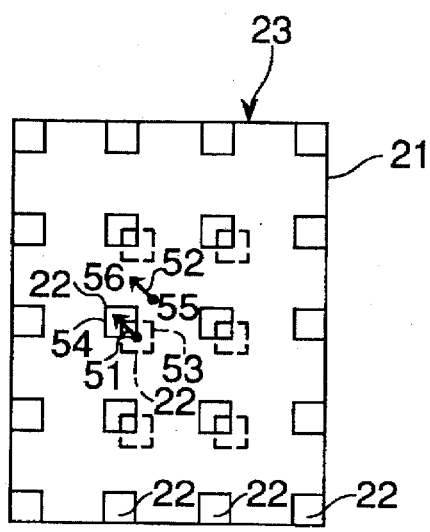
FIGS. 3A and 3B are views showing, in contrast, a state where a distortion has occurred in the recording surface of the digital information recording carrier, and a state where a distortion has occurred in the recording surface of a conventional digital information recording carrier.
Figure 3B:
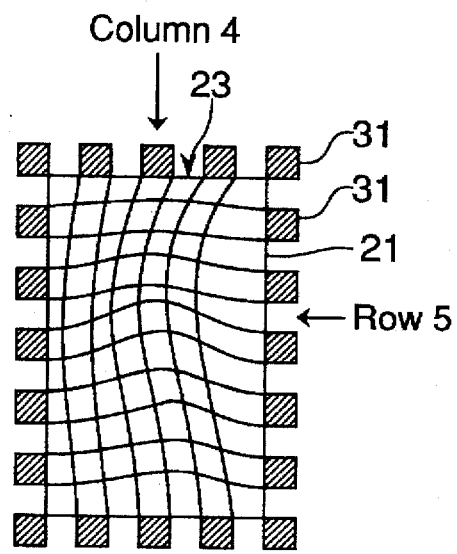

For example, as shown in FIG. 3B, with an arrangement that only clocking information 31 is provided along the perimeter of the information recording area 23 as in the prior art, there will be cases that, when the recording surface has been distorted and information recorded in the inner portion of the information recording area 23 apart from its perimeter, for example, on the mesh of row 5, column 4 is read out, information on the mesh of row 6, column 5 is erroneously read out instead of the originally intended information on the mesh of row 5, column 4. In contrast to this, when the specific patterns 22 are disposed inside of the information recording area 23 apart from its perimeter as described above, the specific pattern 22 shifts, for example, from an original position 53 to a position 54 according to a possible distortion of the recording surface 20, as shown in FIG. 3A. Accordingly, for reading information of a mesh (originally placed at a position 55), the actual position 56 of the mesh can be known based on a shift amount 51 (shown by arrow in FIG. 3A) of an adjacent specific pattern 22. Thus, the information recorded at the mesh can be read correctly.

What matters here is the difference between a shift amount 52 of a mesh to be read and the shift amount 51 of the adjacent specific pattern 22. If this difference is large (for example, in excess of the one-mesh extent), there would occur a reading error. However, by narrowing the interval between the specific patterns 22, 22 so that a mesh to be read and the specific pattern are made closer to each other, such reading errors can be reduced.

Conversely, the interval between the specific patterns 22, 22 should be set narrow to such an extent that the positional shift of the mesh to be read can be corrected based on the shift amount of the specific pattern 22. However, narrowing the interval between the specific patterns 22, 22 too much would increase the number of specific patterns 22 contained in the information recording area 23 too much, so that the amount of recorded information is lessened accordingly. Therefore, from the two viewpoints, the interval of the specific patterns 22, 22 is set to a proper value.

Figure 4:
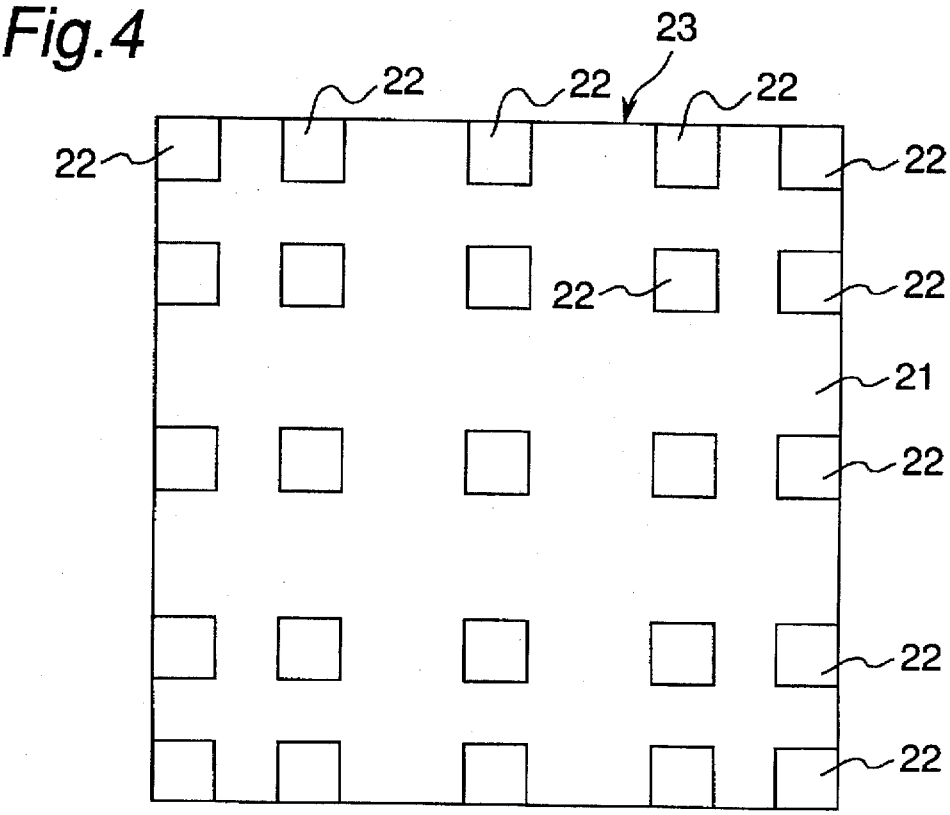
FIG. 4 is a view showing an example in which specific patterns are arranged at higher density in peripheral part of thee information recording area.

When information is read from this information recording carrier by using a line sensor or a CCD camera, distortion is more likely to occur at both ends of the line sensor or in the peripheral part of the field of view of the CCD camera. In such a case, specific patterns should be distributed with higher density in peripheral part of the information recording area 23 than in the other parts, as shown in FIG. 4. That is, depending to the characteristics of the reading device, the specific patterns 22 are distributed with higher density at places where relatively large reading distortions are likely to occur. Thus, reading errors can be reduced.

Figure 5:
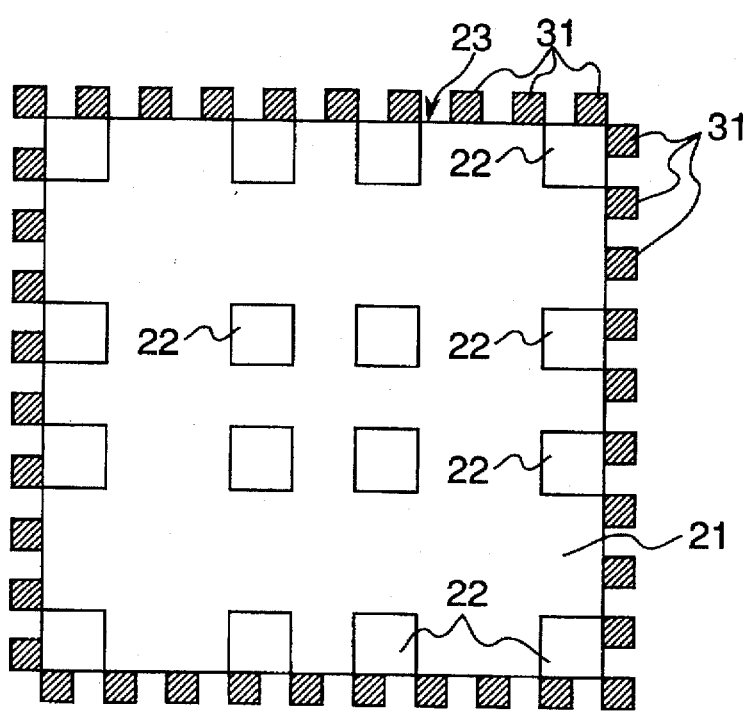
FIG 5 is a view showing an example in which specific patterns are arranged at higher density in central part of the information recording area.

When the specific patterns 22 are placed within the information recording area 23 and clocking information 31 is provided around the information recording area 23, as shown in FIG. 5, the specific patterns 22 are expected to serve as a complement of the clocking information 31. Accordingly, in this case, it is desirable to distribute the specific patterns 22 with high density in a portion where with only the clocking information 31, reading errors would be more likely to occur. Such portion is a central part of the information recording area 23.

In these cases, the longitudinal and transverse intervals between the specific patterns 22, 22 are either the same or different ones.

However, when the specific patterns 22, 22 are placed at different intervals within the information recording area 23, it is necessary in performing a read operation that locations of the specific patterns 22 are previously known or can be known at the beginning of the reading process. For the locations of the specific patterns 22 to be known at the beginning of reading process, it is enough that the locations of the specific patterns of the top row, for example, are previously determined and that the information on the locations of the other specific patterns 22 can be read out, based on information on meshes in proximity to the specific patterns of the top row which are previously determined.

If the decoding apparatus has previously learned the locations of the specific patterns 22, it is not necessary for the specific patterns 22 to be in contact with the perimeter of the information recording area 23, nor to be arranged into a lattice shape. The specific patterns 22 can be disposed freely.

(2) Preferred examples of the specific pattern

In order for the specific pattern 22 to be preferable, the specific pattern 22 should meet the following conditions (a) to (e):

(a) The specific pattern has a feature (a specific white-and-black pattern) that can be easily found within the information recording area 23;

(b) The number of meshes constituting the specific pattern is relatively small;

(c) When an identical or similar pattern has appeared nearby as the recorded information, the specific pattern will not easily overlap with the nearby pattern;

(d) The specific pattern is less affected by dirt during printing or ink blurs; and (e) The algorithm for finding the specific pattern is simple.

Figure 6:
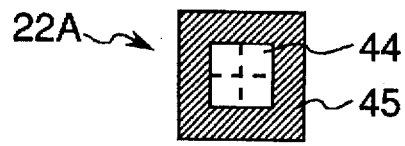
FIG 6 is a view showing a preferred example of the specific pattern.

FIG. 6 shows a preferred example 22A of the specific pattern 22. This specific pattern 22A is composed of a central closed area 44 comprising four whitened meshes of two rows×two columns, and a loop portion 45 comprising twelve blackened meshes surrounding the central closed area 44. As a whole, the specific pattern 22A forms a square block containing totally 16 meshes of four rows×four columns.

FIG. 7 shows another preferred example 22B of the specific pattern 22. This specific pattern 22B is composed of a central portion 41 consisting of one blackened mesh, a first loop portion 42 consisting of eight whitened meshes surrounding the central portion 41, and a second loop portion 43 consisting of sixteen blackened meshes further surrounding the first loop portion 42. As a whole, the specific pattern 22B forms a square block containing totally 25 meshes of 5 rows×5 columns.

FIGS. 8A to 8G show various further examples 22C to 22I of the specific pattern 22.

Figure 8A:
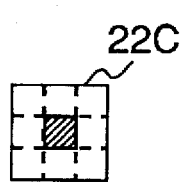
FIGS. 8A to 8G are views showing various examples of the specific pattern.

The specific pattern 22C shown in FIG. 8A is composed of a central portion consisting of one blackened mesh, and a loop portion consisting of eight whitened meshes surrounding the central portion. As a whole, the specific pattern 22C forms a square block containing totally nine meshes of 3 rows×3 columns.

Figure 8B:
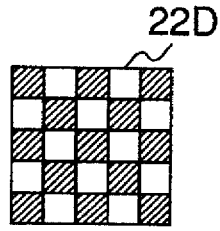

The specific pattern 22D shown in FIG. 8B is a square block containing totally 25 meshes of 5 rows×5 columns. The meshes within the block are alternately blackened and whitened into a checkered pattern.

Figure 8C:
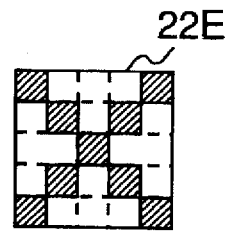

The specific pattern 22E shown in FIG. 8C is a square block containing totally 25 meshes of 5 rows×5 columns. The meshes on the diagonal lines within the block are blackened into an X-shaped pattern.

Figure 8D:
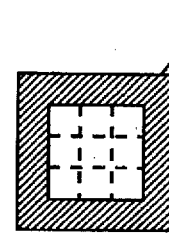

The specific pattern 22F shown in FIG. 8D is composed of a central closed area consisting of nine whitened meshes of 3 rows×3 columns, and a loop portion consisting of 16 blackened meshes surrounding the central closed area in a loop. As a whole, the specific pattern 22F forms a square block containing totally 25 meshes of 5 rows×5 columns.

Figure 8E:
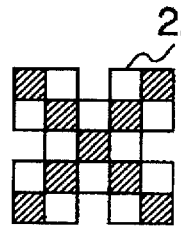

The specific pattern 22G shown in FIG. 8E is a modification of the specific pattern 22E shown in FIG. 8C, wherein the meshes in the middles of the top, bottom, right, and left sides in the specific pattern 22E have been eliminated.

Figure 8F:
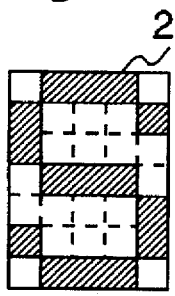

The specific pattern 22H shown in FIG. 8F is a rectangular block containing totally 35 meshes of 7 rows×5 columns. The blackened meshes within the block form a generally S-shaped pattern.

Figure 8G:
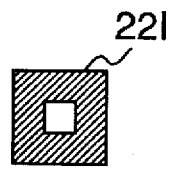

Finally, the specific pattern 22I shown in FIG. 8G is composed of a central portion consisting of one whitened mesh, and a loop portion comprising eight blackened meshes surrounding the central portion in a loop. As a whole, the specific pattern 22I forms a square block containing totally nine meshes of 3 rows×3 columns.

As shown above, various types of patterns can be adopted as the specific pattern 22, whereas the specific patterns 22A, 22B shown in FIGS. 6, 7 are preferable to the other specific patterns 22C to 22I. The reasons (i) to (v) of this are described below in conjunction with the above conditions (a) to (e).

(i) First, advantageously, the specific patterns 22A, 22B can be extracted from within the information recording area 23 relatively easily. The specific pattern 22D of checkered pattern as shown in FIG. 8B would be buried in the information recording area 23 so as not to be found out, whereas the specific patterns 22A, 22B can be discerned even by the naked eye. In particular, when the specific patterns 22A, 22B are previously known to have been placed into a lattice shape, they can be found out even more easily.

(ii) Second, the specific patterns 22A, 22B each are composed of a relatively small number of meshes, as small as 16 meshes for the specific pattern 22A and 25 meshes for the specific pattern 22B. It is another advantage.

(iii) Third, when an identical pattern has appeared nearby the specific patterns 22A, 22B as the recorded information, the specific patterns 22A and 22B will not easily overlap with the nearby pattern. It is a further advantage.

Figure 9:
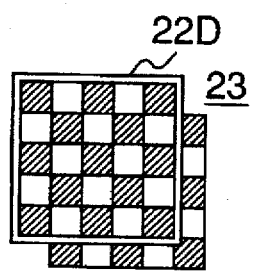
FIG. 9 is a view showing a state in which the specific pattern of checkered pattern as shown in FIG. 8B has overlapped another identical pattern that has appeared in its adjacency.

FIG. 9 shows an example in which, with the use of the specific pattern 22D of checkered pattern as shown in FIG. 8B, an identical pattern has appeared nearby as the recorded information. In the case of the specific pattern 22D, there is a possibility that an identical pattern will appear at a location shifted longitudinally by one mesh and also transversely by one mesh. If the length of one mesh side is assumed to be a one (1), the minimum distance between the specific pattern 22D and the identical pattern is $2^{1/2}$.

Figure 10:
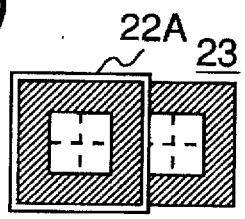
FIG. 10 is a view showing a state in which the specific pattern of FIG. 6 has overlapped another identical pattern that has appeared in its adjacency.
Figure 11:
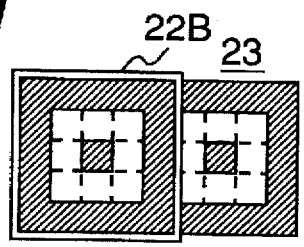
FIG. 11 is a view showing a state in which the specific pattern of FIG. 7 has overlapped another identical pattern that has appeared in its adjacency.

FIG. 10 shows an example in which, with the use of the specific pattern 22A, an identical pattern has appeared nearby as the recorded information. In the case of this specific pattern 22A, an identical pattern could appear only at locations shifted by three meshes longitudinally or transversely from the specific pattern. Also, FIG. 11 shows an example in which, with the use of the specific pattern 22B, an identical pattern has appeared nearby as the recorded information. In the case of this specific pattern 22B, an identical pattern could appear only at locations shifted by four meshes longitudinally or transversely from the specific pattern. Like this, either of the specific patterns 22A and 22B, even if an identical or similar pattern has appeared nearby as the recorded information, overlaps with the pattern to relatively small extent, so that the specific pattern and the pattern representative of the recorded information will be shifted from each other to some extent. From this characteristic, the specific patterns 22A, 22B can be said to be patterns that can be relatively easily discriminated from the recorded information by the reading device.

Measures to be taken when the specific pattern 22 and an identical pattern overlap with each other will be described later in detail in the paragraphs describing a decoding method.

(iv) Fourth, the specific patterns 22A, 22B are less affected by dirt, ink blurs or the like. This feature is a further advantage.

Figure 12:
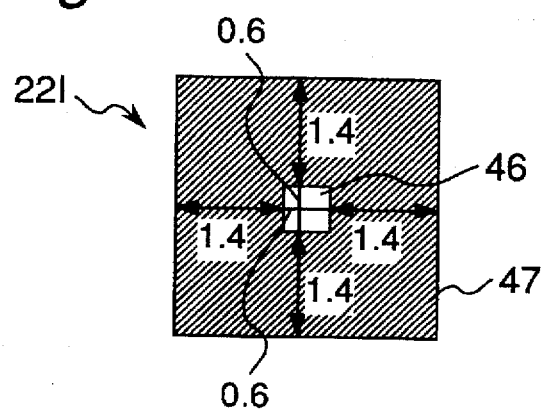
FIG. 12 is a view showing an aspect of the specific pattern as shown in FIG. WP, where a black mesh has blurred such that each side is expanded to 1.4 times.

Generally, in printing onto paper, black meshes tend to spread due to the ink blurs, invading white meshes. In the specific pattern 22I as shown in FIG. 8G, as an example, one white mesh is surrounded by black meshes, in which case the white mesh tends to be crushed. If ink blurs eventually expand a black mesh 47 to 1.4 times the length of each side as shown in FIG. 12, the resulting area size of the white mesh 46 at the center of the specific pattern 22I will be as small as 36% of the normal one.

Figure 13:
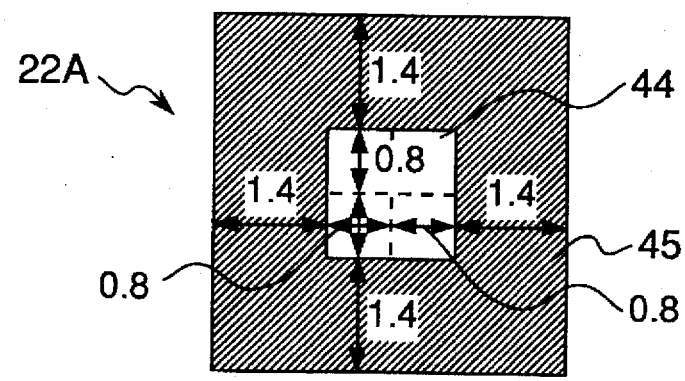
FIG. 13 is a view showing an aspect of the specific pattern as shown in FIG. 6, where a black mesh has blurred such that each side is expanded to 1.4 times.
Figure 14:
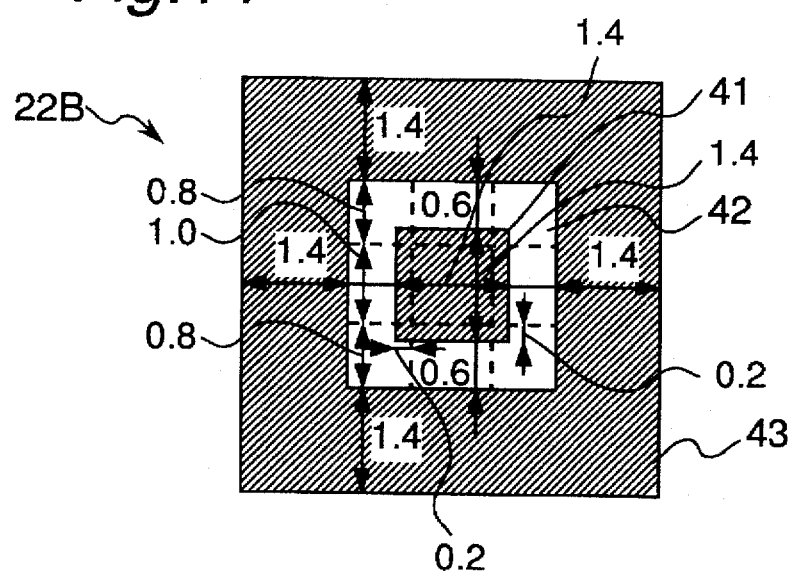
FIG. 14 is a view showing an aspect of the specific pattern as shown in FIG. 7, where a black mesh has blurred such that each side is expanded to 1.4 times.
Figure 15:
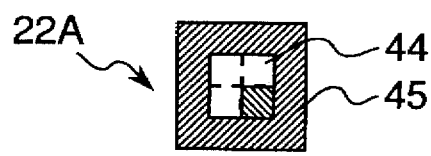
FIG. 15 is a view showing an aspect of the specific pattern as shown in FIG. 6, where one of the white meshes constituting the central closed area has changed to a black one.

In contrast to this, the specific pattern 22A ensures 64% of the normal size of the central closed area (four white meshes) 44, as shown in FIG. 13. Also, the specific pattern 22B ensures 60% of the normal size of the first loop portion (eight white meshes) 42, as shown in FIG. 14. Besides, with the specific pattern 22A, even when one of the four white meshes constituting the central closed area 44 has been thoroughly crushed (i.e., changed to a black mesh) due to dirt or the like as shown in FIG. 15, the feature, 'a white closed area surrounded by a black frame,' is maintained, so that adopting a reading method utilizing this feature allows the avoidance of effects of dirt.

(v) Fifth, advantageously, either of the specific patterns 22A, 22B needs a simple reading algorithm.

As the reading algorithm, commonly used is a method by which meshes are cut out from the recording surface with a set size thereof and then the values (white or black in this example) of the cut-out meshes are examined. Therefore, a similar method is conceivable for the recognition of the specific pattern 22, that is, the meshes constituting the specific pattern 22 are cut out and then the values of all the meshes contained in the specific pattern 22 are examined.

Another conceivable method for the recognition of the specific pattern 22 examine the pattern without performing the cut-out in the unit of meshes. For example, the specific pattern 22B shown in FIG. 7 will be found out by determining, first, whether or not the central portion (black mesh) 41 forms a closed area surrounded by white meshes, and then whether or not the first loop portion (white meshes) 42 forms a closed area surrounded by black meshes. Also, the specific pattern 22A shown in FIG. 6 will be found by determining whether or not the central closed area 44 has an area size corresponding to four meshes. In either case, it is required only to see whether or not features of a read portion are coincident with the features of the specific pattern 22A, 22B, that is, whether or not the read portion meets the required conditions for the specific pattern. Values of the meshes are not examined. However, this method will do enough for practical use, where even if another pattern is misrecognized as the specific pattern, such misrecognized patterns can be neglected by, for example, checking, after all specific patterns are extracted, whether or not the extracted specific patterns are arranged into a lattice shape. In such a case, higher precision check is optionally performed only to such specific patterns that are considered to be more likely to have been misrecognized. In this way, the specific patterns 22A, 22B are recognized by a simple algorithm.

As shown above, the specific patterns 22A, 22B have many advantages over the other specific patterns, hence preferable patterns.

(3) Recognition of specific patterns

Figure 16:
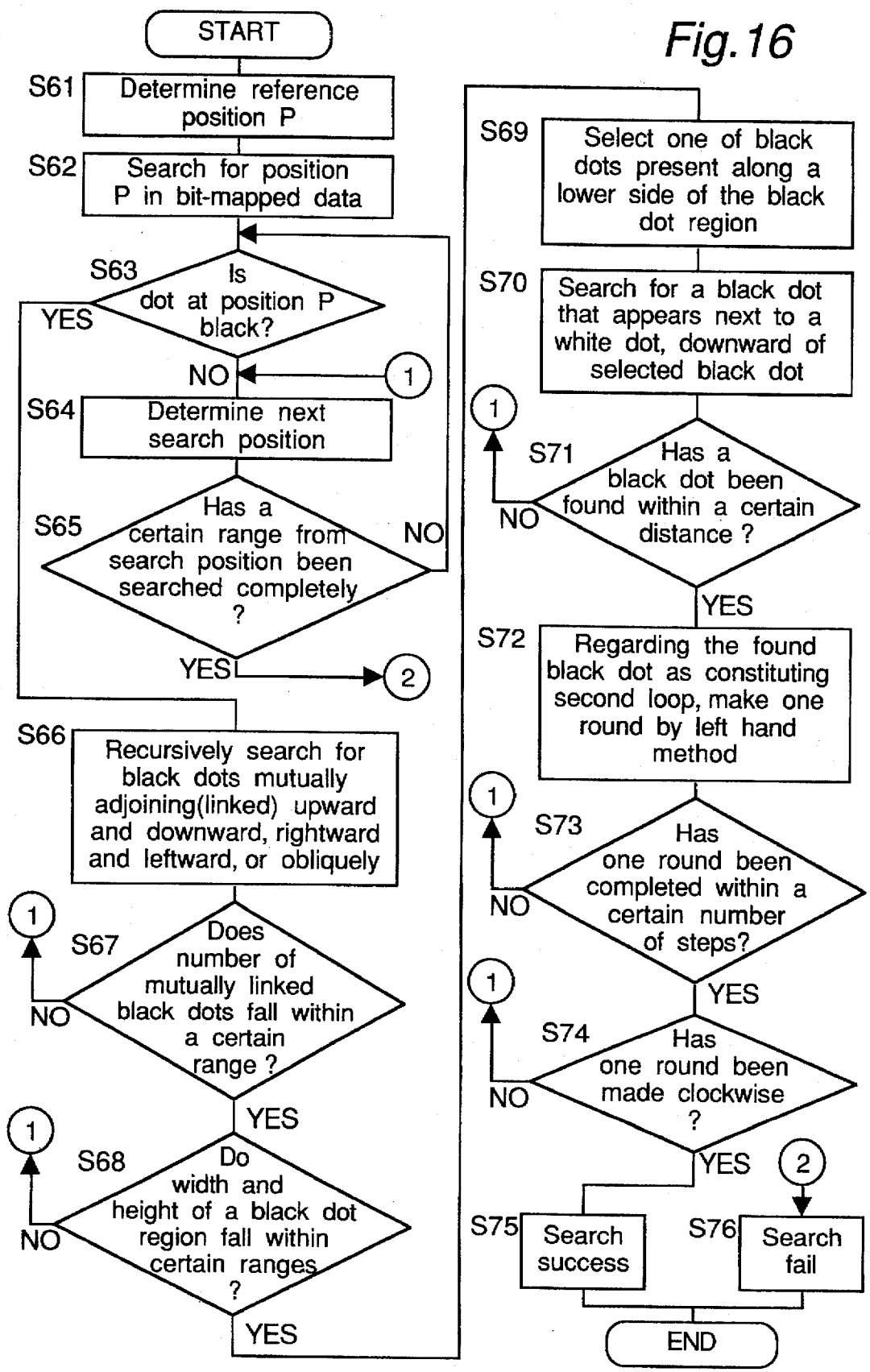
FIG. 16 is a chart showing an example of processing flow for recognizing the specific pattern of FIG. 7.

FIG. 16 shows an example of the processing flow for recognizing the specific pattern 22B shown in FIG. 7.

It is assumed that the recognition process is applied to bit-mapped data read by a reading device.

First, when the specific patterns 22B are placed within the information recording area 23 according to a predetermined arrangement, a position where a specific pattern 22B will appear in the bit-mapped data is predicted, whereby a reference position P serving as a search reference in the bit-mapped data is determined (S61). Then, the reference position P is searched for in the bit-mapped data (S62). Then, it is examined whether or not a dot at the reference position P is black (S63). If the dot is black, the dot is assumed to constitute the central portion 41, and the processing flow goes to step S66.

On the other hand, if the dot of the reference position P is decided not to be black at step S63, the next search position is determined within a certain range from the reference position P (S64), and it is again examined whether or not the dot of the search position is black. If as a result of searching all the certain range from the reference position P, a black dot corresponding to the central portion 41 of the specific pattern 22B is not found (S65), then the search is decided to have failed (S76), and the processing is ended.

At step S66, black dots adjoining (in other words, linked) to each other in a longitudinal direction (upward or downward), in a transverse direction (rightward or leftward), or in an oblique direction, are recursively searched for, starting with a dot next to the dot of the search position at which search for a black dot has been successful. Then, it is decided whether or not the number of the adjoining black dots searched for is within a certain range (S67). If the number of the adjoining black dots exceeds an upper limit of the range, it is decided that the region (referred to "black dot region" below) occupied by the adjoining black dots is not closed, or that the black dot region, even if closed, has too large an area for the central portion 41. Also, if the number of the adjoining black dots is less than a lower limit of the range, it is decided that the black dot region is not the central portion 41 but merely noise. In these cases where the number of the adjoining black dots is out of the certain range, the processing flow returns to S64 to redo processing.

Then, if the number of the adjoining black dots is within the certain range (S67), then the processing flow goes to S68, where it is examined whether or not the width and height of the black dot region are within respective certain ranges, whereby the shape of the black dot region is checked. The width of the black dot region is expressed in the form of a difference between maximum and minimum X-coordinates of the region, while the height of the black dot region is similarly expressed in the form of a difference between maximum and minimum Y-coordinates of the region. If the width or the height of the black dot region is out of the certain range, then the processing flow returns to S64 to redo processing.

Further, if the width and height of the black dot region are within the certain ranges (S68), then the region is decided to be the central portion 41, where the flow proceeds to S69.

Figure 17:
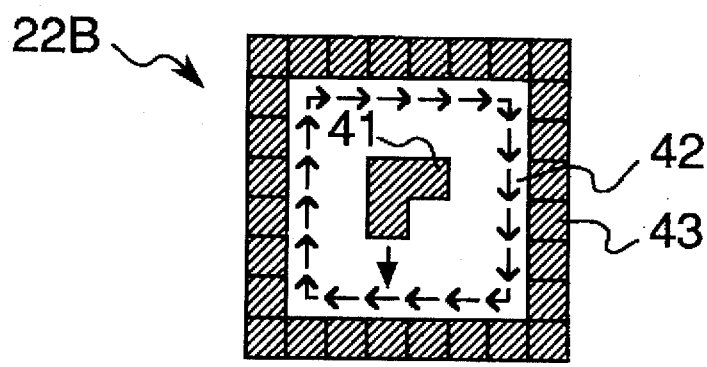
FIG. 17 is a view schematically showing a way of verifying a second loop portion by tracing the boundary between first and second loop portions to one round by the left hand method, for the recognition of the specific pattern of FIG. 7.
Figure 18:
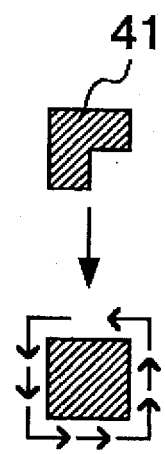
FIG. 18 is a view schematically showing how the closed region of black dots is traced to one round by the left hand method of FIG. 17.

Next, at step S69, the first loop portion 42 starts to be checked. One of the black dots located along a lower side of the black dot region is selected (S69), the black dot region having been decided to be the central portion 41. The black dots located along the lower side have a Y-coordinate having a smallest value. Then, as indicated by arrow in FIG. 17, a search is made downward of the region 41 for a black dot (regarded as a black dot constituting part of the second loop portion 43) that appears next to a white dot (regarded as a white dot constituting part of the first loop portion 42) (S70). If the next black dot has not been found within a certain distance from a first white dot of a white dot region, the white dot region is decided to be other than the first loop portion 42 of the specific pattern 22B (S71), where the processing flow returns to S64 to redo processing. Meanwhile, if the next black dot has been found within the certain distance from the first white dot (S71), the black dot is regarded as constituting part of the second loop portion 43 of the specific pattern 22B. Then, as indicated by arrow in FIG. 17, the inner perimeter of the region regarded as the second loop portion 43, i.e., the boundary between black and white dots is traced to one round by the left-hand method (a method of tracking a wall of a maze with the left hand on the wall) (S72). If the one round has not been completed within a certain number of steps, it is decided that the white dot region is not closed or that the region, even if closed, is too large (S73). Also, if the one-round tracing by the left hand method has been made counterclockwise, it can be considered not that the white dot region is closed but that some closed region of black dots is being searched for, as shown in FIG. 18 (S74). In these cases, the processing flow returns to S64, where the processing is redone. When the processing successfully proceeds to step S74 and it is decided there that the one-round tracing by the left hand method has been made clockwise, the search for the specific pattern 22B is considered to be successful, which means that the specific pattern 22B has been recognized (S75).

In this way, the specific pattern 22B is recognized by a simple algorithm.

Figure 19:
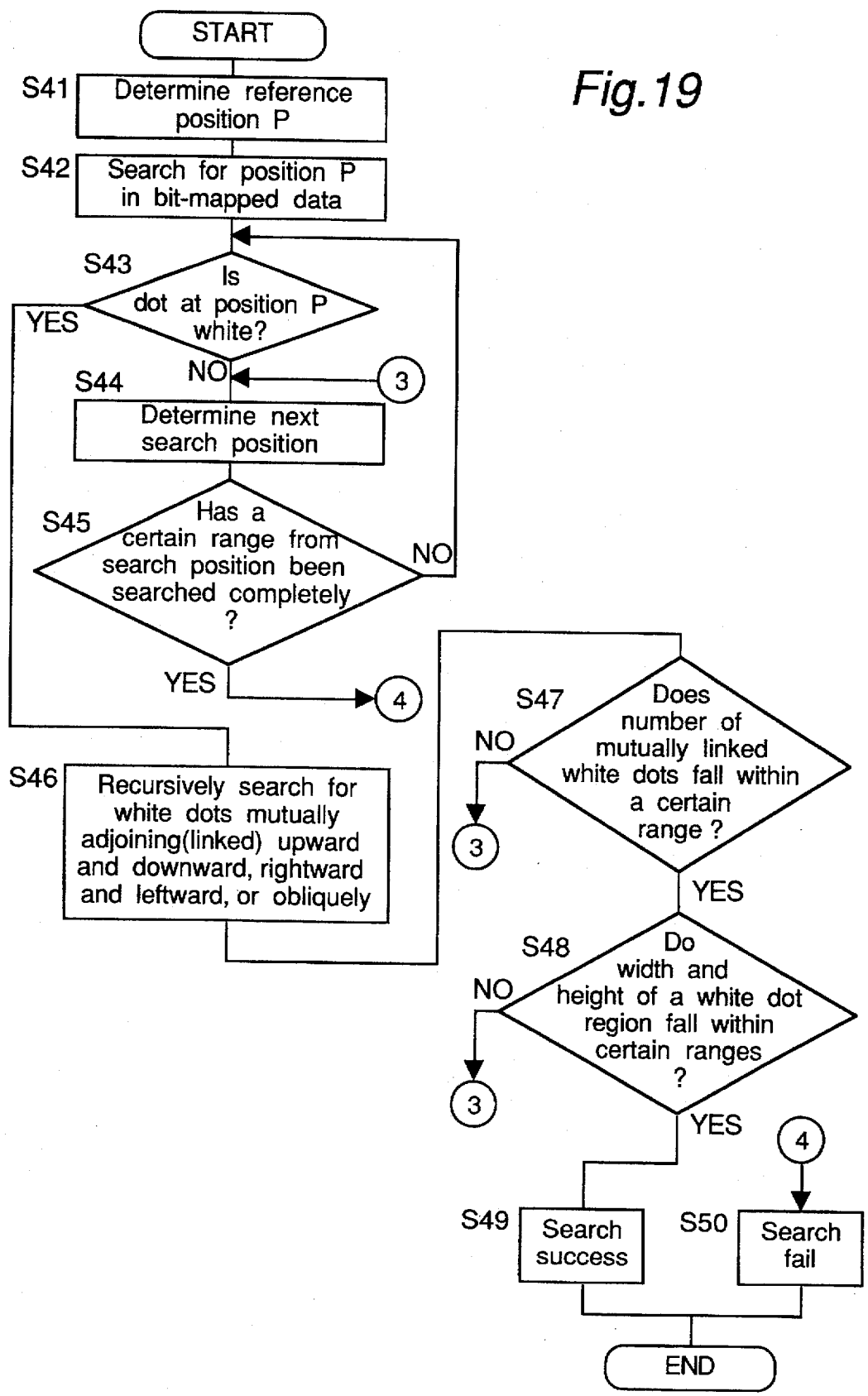
FIG. 19 is a chart showing an example of the processing flow for recognizing the specific pattern of FIG. 6.

FIG. 19 shows an example of the processing flow for recognizing the specific pattern 22A shown in FIG. 6.

First, when the specific patterns 22A are placed within the information recording area 23 according to a predetermined arrangement, a position where a specific pattern 22A will appear in the bit-mapped data is predicted whereby a reference portion P serving as a search reference in the bit-mapped data is determined (S41). Then, the reference position P is searched for in the bit-mapped data (S42). Then, it is examined whether or not a dot at the reference position P is white (S43). If the dot is white, the dot is assumed to constitute part of the central closed area 44, and the processing flow goes to step S46.

On the other hand, if the dot of the reference position P is decided not to be white at step S43, the next search position is determined within a certain range from the reference position P (S44), and it is again examined whether or not a dot at the search position is white. If as a result of searching all the certain range from the reference position P, a white dot corresponding to part of the central closed area 44 of the specific pattern 22A has not been found (S45), then the search is decided to have failed (S50), and the processing is ended.

At step S46, white dots adjoining (that is, linked) with each other in a longitudinal direction (upward or downward), in a transverse direction (rightward or leftward), or in an oblique direction, are recursively searched for, starting with a dot next to the dot of the search position at which search for a white dot has been successful. Then, it is decided whether or not the number of mutually linked white dots found falls within a certain range (S47). If the number of the linked white dots exceeds an upper limit of the range, it is decided that the region (referred to "white dot region" below) occupied by the adjoining white dots is not closed, or that the white dot region, even if closed, has too large an area for the central closed area 44. Also, if the number of the mutually linked white dots is less than a lower limit of the certain range, the white dot area is decided to be not the central closed area 44 but merely noise. In these cases where the number of the linked white dots found is out of the certain range, the processing flow returns to S44 to redo processing. Further, the region where the white dots are adjoining to one another is checked for its shape, by examining whether or not the width and height of the region are within respective certain ranges. If the width or height of the region where white dots are adjoining is out of the certain range, the processing flow returns to S44 to redo processing (S48).

Further, if the width and height of the white dot region are within the certain ranges, then the region is decided to be the central portion 44, and the flow proceeds to S49 at which the search for the specific pattern 22A is decided to be successful, which means that the specific pattern 22A is regarded as having been successfully recognized.

In this way, the specific pattern 22A is recognized by a simple algorithm.

The processing flows shown in FIGS. 16 and 19 are merely to check about some of the requirements for makeup of the specific patterns 22A and 22B, but allow the specific pattern 22A and 22B to be recognized with almost no problem for practical use. Still, they are efficient.

(4) Shape of meshes

The description has been made hereinabove on a case where the meshes constituting the information recording area 23 are of a square shape. However, the shape of the meshes is not limited to square.

As will be described later, when using a reading method in which recorded information is read by a reading device so as to form bit-mapped data and the resulting bit-mapped data is analyzed, it is necessary for one mesh to have a size of about 4×4 dots or 3×3 dots or more on the bit map. In such a case, by making each mesh shaped into a square, the mesh is given a minimum area necessary for the analysis of the bit map. Therefore, square meshes are advantageous.

However, this applies only to the bit-mapped data. Otherwise, for example, with the use of a scanner having line sensors with 200 dpi for the primary scan direction and 400 dpi for the sub-scan direction (the 400 dpi is realized through adjustment of the speed of the paper feed motor), it is advantageous to employ such a rectangular mesh that the ratio of longitudinal to transverse length is 1 : 2 on the recording carrier in order that the mesh can be read as a square on the bit map.

Figure 20:
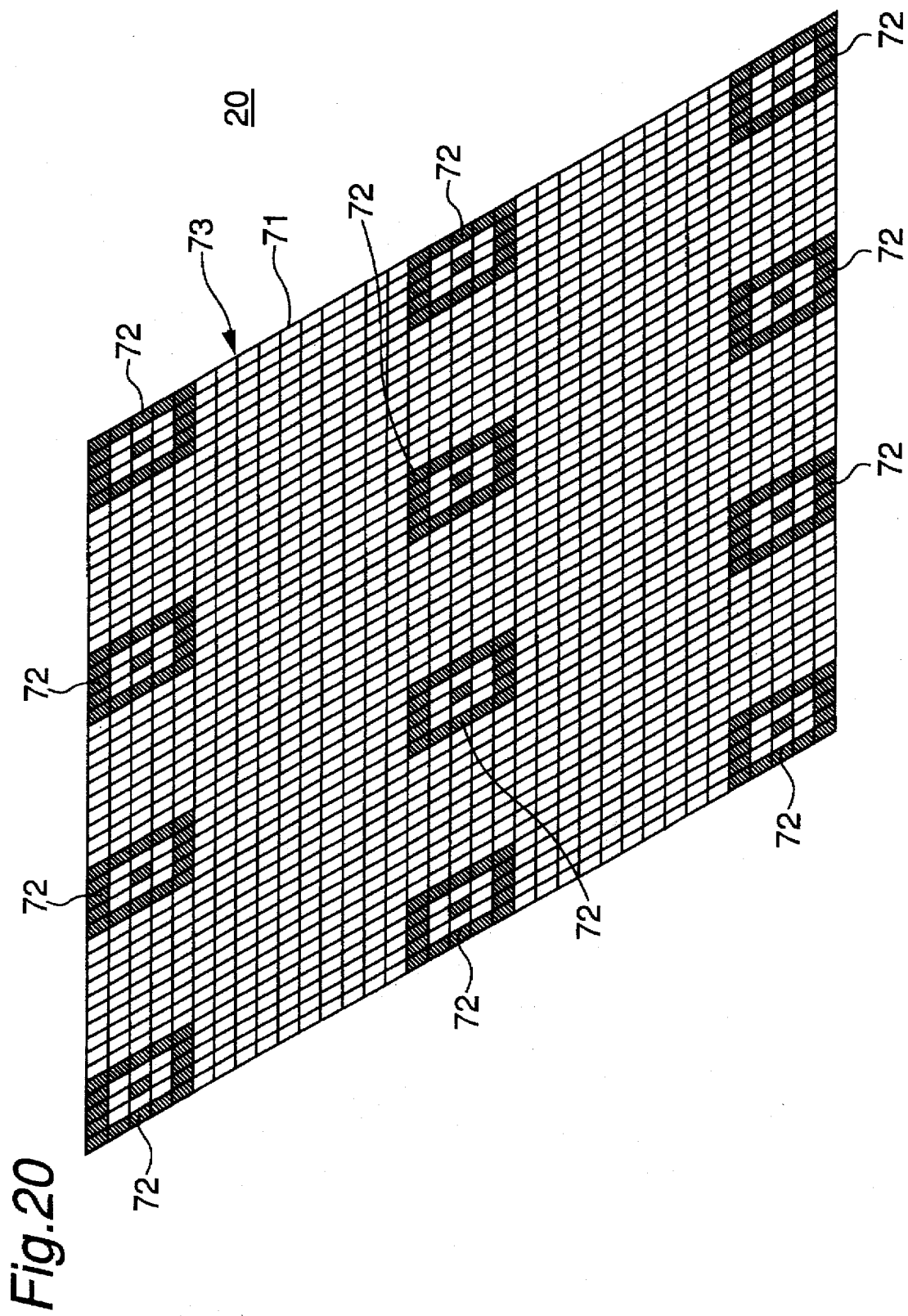
FIG. 20 is a view showing an example in which specific patterns are arranged in an information recording area composed of WP meshes.

Also, the mesh can be formed into a parallelogrammic or other shape whose sides do not cross orthogonally. FIG. 20 shows an example in which an information recording area 73 is made up with meshes of parallelogram on the recording surface 20, and in which specific patterns 72 are arranged at regular intervals in this information recording area 73. The specific pattern 72 used in this example is a parallelogram formed by deforming the specific pattern 22B of FIG. 7 in one direction. Reference Numeral 71 denotes meshes representing the recorded information.

(5) Mapping of recording-object information

With the digital information recording carrier shown in FIG. 1 taken as an example, the way of mapping recording-object information (i.e., information to be recorded) to the information recording area 23 is now explained in conjunction with the placement of the specific patterns 22.

In the digital information recording carrier of FIG. 1, the information recording area 23 is provided with transverse 35×longitudinal 50=1750 meshes that are virtually set. Within the information recording area 23, twelve (transverse 3×longitudinal 4) specific patterns 22, 22, . . . are placed at a pitch corresponding to 15 meshes in both a transverse and longitudinal directions. As described before, of all the specific patterns 22, ten specific patterns 22 belonging to the top and bottom rows and the right and left columns are placed along the perimeter of the information recording area 23, and the remaining two specific patterns 22 are placed inside (near the center) of the information recording area 23 apart from its perimeter. In particular, the specific patterns 22 located at the four corners of their arrangement are placed at the four corners of the information recording area 23. Each specific pattern 22 is composed of 25 (transverse 5×longitudinal 5) meshes, so that 300 meshes are used for the specific patterns out of the 1750 meshes of the entire information recording area 23. Therefore, the remaining 1450 meshes 21 are used to represent the recording-object information, permitting 1450-bit information ($2^{1450}$ pieces of information) to be represented.

Figure 22:
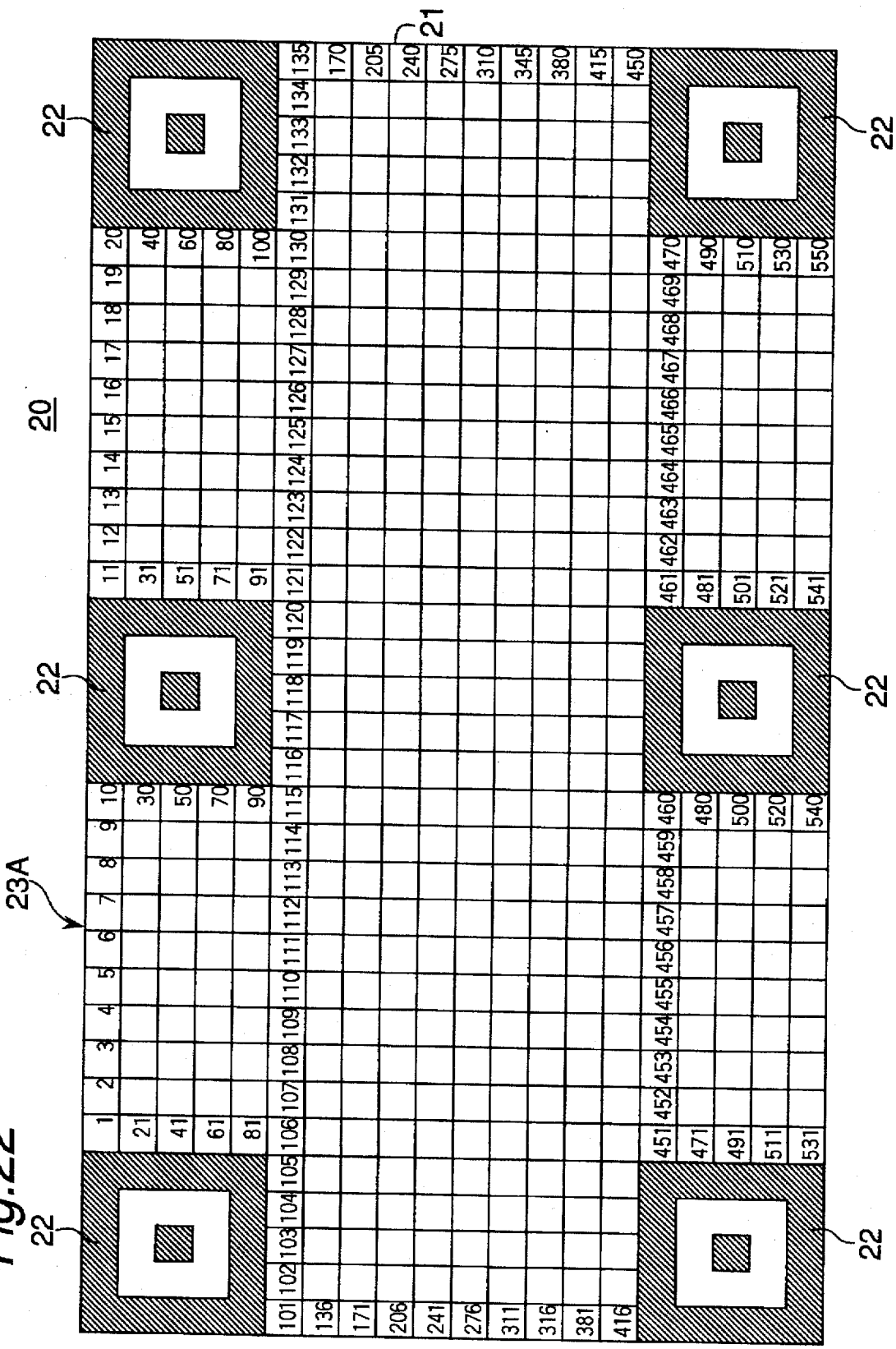
FIG. 22 is a view for explaining a way of mapping by which bit information originally intended to be recorded is allocated to meshes of regions other than the regions where specific patterns are to be arranged in the information recording area.

FIG. 22 shows a portion 23A of transverse 35×longitudinal 20 meshes corresponding to part (an upper part) of the information recording area 23 shown in FIG. 1. In this information recording area 23A, six (transverse 3×longitudinal 2) specific patterns 22 are placed every 15 transverse meshes and every 15 longitudinal meshes. Out of 700 meshes of the information recording area 23A, meshes are used for the specific patterns 22, and the remaining 550 meshes 21 are used to represent the recording-object information. The meshes 21 representing the recording-object information are given addresses 1, 2, . . . 550 (only partly shown for simplicity). Those addresses are numbered in such a manner that the first row is addressed 1 to 10, starting with a leftmost mesh of the first row next to the upper left corner specific pattern 22, and increasing rightward of the mesh, and further beyond the specific pattern 22 in the middle of the top row, similarly addressed 11 to 20. The second to fifth rows are addressed in the same manner, until a mesh of the fifth row adjacent to the rightmost specific pattern is addressed 100. The sixth to fifteenth rows are numbered so that the address increases one by one rightward from the leftmost mesh of each row. The sixteenth to twentieth rows are numbered in the same manner as the first to fifth rows with the middle specific pattern 22 jumped over. In this way, when a specific pattern 22 is placed at the middle of a row, the addressing is done with the specific pattern 22 jumped over. The first bit information of the recording-object information corresponds to the mesh of address 1, where if the value of the bit information is a one ("1"), the mesh is blackened; if it is a zero ("0"), the mesh is whitened. From this on, recording-object information is recorded likewise, whereby the digital information of 550 bits can be mapped to 550 meshes 21 of the information recording area 23A.

Although the bit information is arrayed from left to right for each row in the example of FIG. 22, the way of mapping bit information to the meshes 21 is not restricted to this example.

(6) Construction and basic operation of digital information recording apparatus

Figure 21:
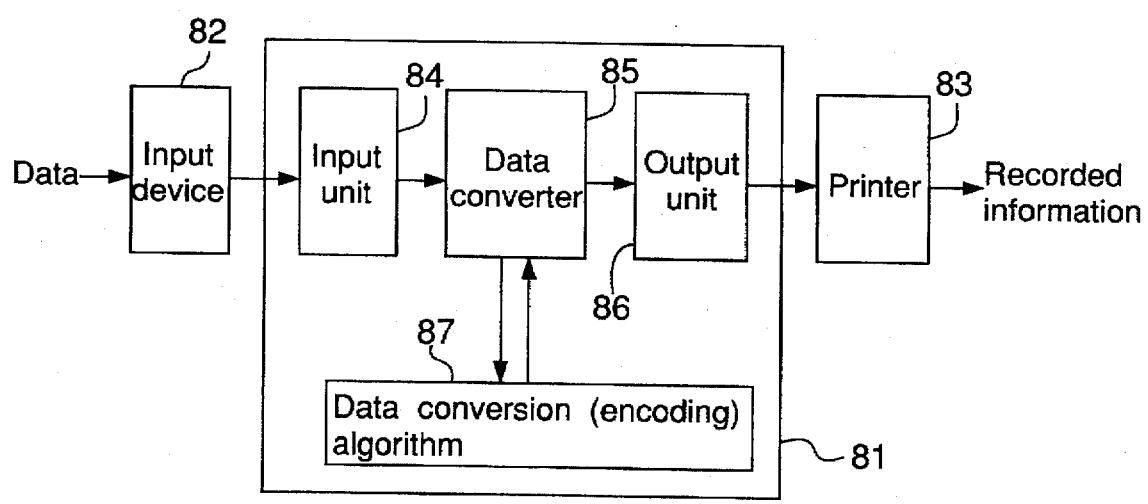
FIG. 21 is a diagram showing a block configuration of the information recording apparatus used to carry out the digital information recording method.

FIG. 21 outlines the construction of a digital information recording apparatus according to an embodiment of the present invention. This apparatus has an input device 82, a pattern generator 81 which serves as an information recording device, and a printer 83. The input device 82 is constructed by a keyboard, data base, etc., and can read various types of data. The pattern generator 81 has an input unit 84, a data converter 85, an output unit 86, and a data conversion (encoding) algorithm 87. The input unit 84 receives input data from the input device 82, and transfers it to the data converter 85. The data converter 85 converts the input data received from the input unit 84 according to the data conversion (encoding) algorithm 87, as described later, and transfers the conversion result to the output unit 86 as output information.

The output unit 86 sends the output information received from the data converter 85 to the printer i.e. printing device 83. It is noted that the output information sent to the printing device 83 is, in general, bit image. The printing device 83 is exemplified by a dot printer, laser printer, or the like, which is selected depending on the required printing precision.

Figure 23:
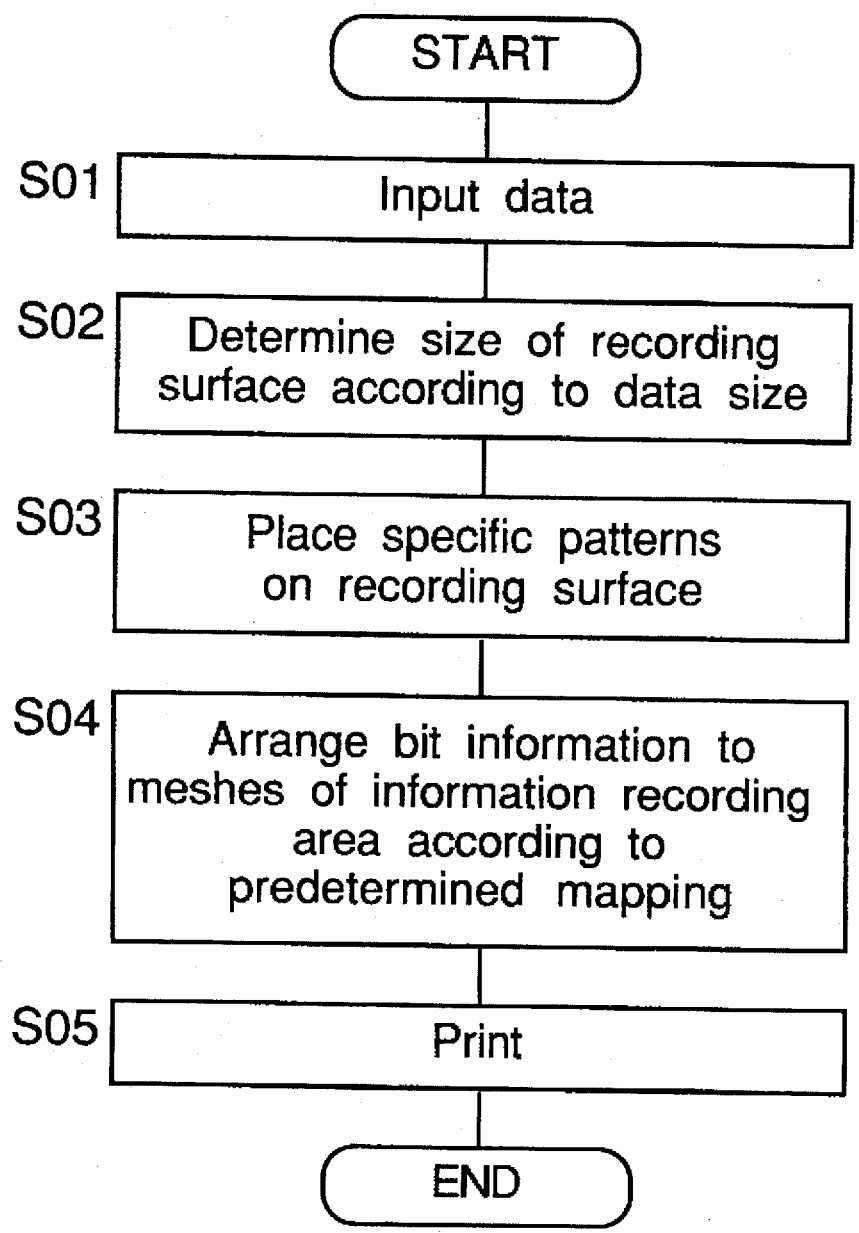
FIG. 23 is a chart schematically showing processing flow or carrying out the digital information recording method.

This information recording apparatus records various types of data to be recorded, onto a recording surface 20 of a recording carrier, according to the flow shown in FIG. 23.

First, the input device 82 reads various types of data (S01), and sends the read data to the input unit 84 of the pattern generator 81.

In the pattern generator 81, the data converter 85 that has received the data via the input unit 84 performs the following process based on the data conversion (encoding) algorithm 87.

First, the data converter 85 determines the size of the information recording area 23 according to the size of the data (S02). The size of the information recording area 23 depends on the information to be recorded (i.e., recording-object information) and the number of specific patterns 22 to be added. In some cases, such restrictions are imposed as giving the information recording area 23 a constant transverse width or forming the information recording area 23 into a square. It is noted that the information recording area size determination process is not required if the size of the recording-object information is previously determined.

Then, the specific patterns 22 are placed at predetermined positions within the information recording area 23 (S03). For this placement, adopted is such a lattice-shaped placement that the specific patterns 22 appear, for example, every ten longitudinal meshes and every fifteen transverse meshes.

Bit information of data is distributed to the meshes 21 for representing the recording-object information within the information recording area 23, according to a predetermined mapping (S04). This mapping is, for example, the one described before with reference to FIG. 22.

Then, the printing device 83 prints the recording-object information delivered from the output unit 86 of the pattern generator 81 onto the recording surface 20 (S05).

In this way, with this digital information recording apparatus, digital information is recorded onto the recording surface 20 of the recording carrier.

(7) Searching for specific patterns and reading information by making use of the specific patterns The method for decoding information recorded on a digital information recording carrier as shown in FIG. 1 is now explained.

Figure 24:
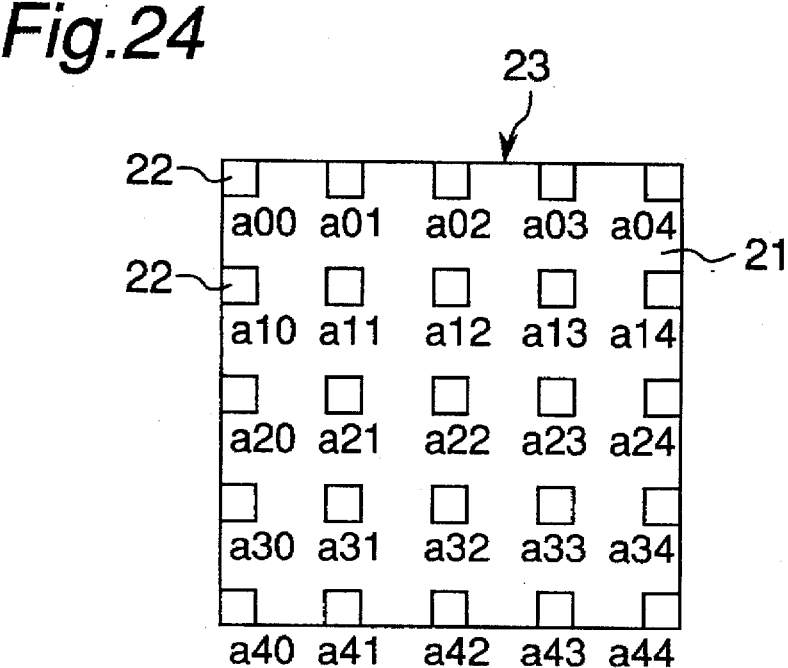
FIG. 24 is a view showing bit map data obtained by reading a digital information recording carrier with a reading device.

Recorded information is read by the reading device and, as shown in FIG. 24, bit-mapped data composed of white and black pixels corresponding to the recorded information is obtained. In FIG. 24, components corresponding to those on the recording surface 20 of FIG. 1 are designated by the same reference numerals for simplicity, and numbers of a00 to a44 are further used to discriminate the individual specific patterns 22 from each other. It is assumed that the decoding is effected to this bit-mapped data.

(i) First, search for specific patterns is carried out in the following way:

A rectangular region corresponding to the information recording area 23 is discriminated out of the bit-mapped data and its four corners are checked. In this example, the specific patterns a00, a04, a40, and a44 are placed at the four corners, and therefore the four-corner specific patterns a00, a04, a40, and a44 are detected.

It is previously known that each specific pattern 22 is a specific pattern 22B shown in FIG. 7 and composed of five (transverse) by five (longitudinal) meshes. Therefore, an approximate size of the mesh virtually set to the information recording area 23 becomes available by analyzing the four-corner specific patterns a00, a04, a40, and a44.

Subsequently, the specific patterns 22 placed along the four sides of the information recording area 23 are searched for. Taking an example of the specific patterns 22 placed along the upper side of the information recording area 23, a search for the specific pattern a01 next to the specific pattern a00 of the top left corner is first made, followed by searches for a02, a03 in the rightward direction one by one. For example, in searching for the specific pattern a01, since it is known that specific patterns will appear at a pitch of 15 transverse meshes within the information recording area 23, the specific pattern a01 is predicted to appear at a position advanced by 15 meshes from a00 toward a04. Thus, by looking into the neighborhood of the predicted position, a pattern coincident with the specific pattern 22 is searched for. By repeating this operation, the specific patterns 22 placed along the upper side of the information recording area 23 are found out one after another. In the same way, the specific patterns 22 placed along the other three sides of the information recording area 23 are found out one after another.

The specific patterns a11 to a13, a21 to a23, and a31 to a33 other than the specific patterns along on the four sides of the information recording area 23 are placed in proximity to the center of the area 23. These specific patterns are found through the steps of predicting their positions by taking advantage of the fact that the specific patterns are arranged in a lattice shape in the information recording area 23, and then looking into the proximity to the predicted positions to search for patterns coincident with the specific pattern.

In this connection, the following two are available as the method of searching for the specific patterns a11 to a13, a21 to a23, and a31 to a33 positioned in proximity to the center.

Figure 25:
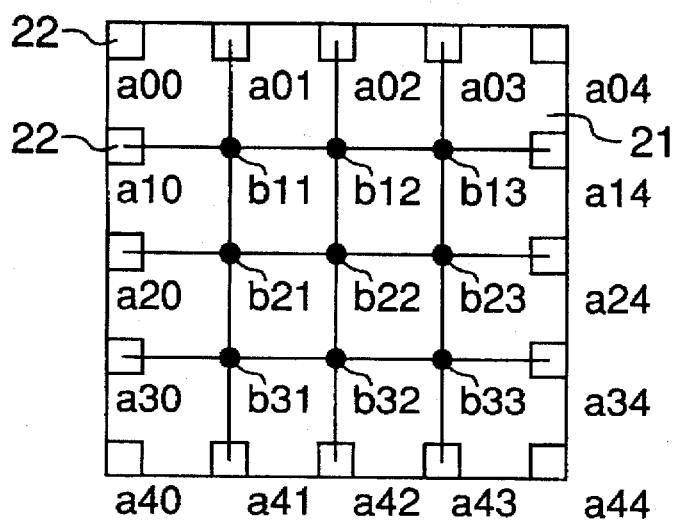
FIG. 25 is a view for explaining a first search method for searching for specific patterns in adjacency to the center of the information recording area based on the positions of specific patterns placed along the perimeter of the information recording area.

The first search method determines intersecting points between lines that connect right and left corresponding specific patterns 22 to each other and lines that connect top and bottom specific patterns 22 to each other, as shown in FIG. 25, and searches for the specific patterns 22 in the proximity of the center based on the positions of the intersecting points. In more detail, the specific patterns a10, a20, a30 placed along the left side are connected with the corresponding specific patterns a14, a24, a34 placed along the right side by straight lines, and also, the specific patterns a01, a02, a03 placed along the top side are connected with the corresponding specific patterns a41, a42, a43 placed along the bottom side by straight lines. Then, the resulting intersecting points b11 to b13, b21 to b23, and b31 to b33 are determined. It is predicted that the specific patterns a11 to a13, a21 to a23, and a31 to a33 will appear in proximity to the intersecting points b11 to b13, b21 to b23, and b31 to b33, respectively. Thus, patterns coincident with the specific pattern 22 are searched for by looking into the proximities to the predicted positions. For example, for a search for a specific pattern a12, an intersection b12 between the line that connects a10 and a14 to each other and the line that connects a02 and a42 to each other is set as the predicted position. Then, by looking into the proximity to the position, the specific pattern a12 is searched for.

Figure 26:
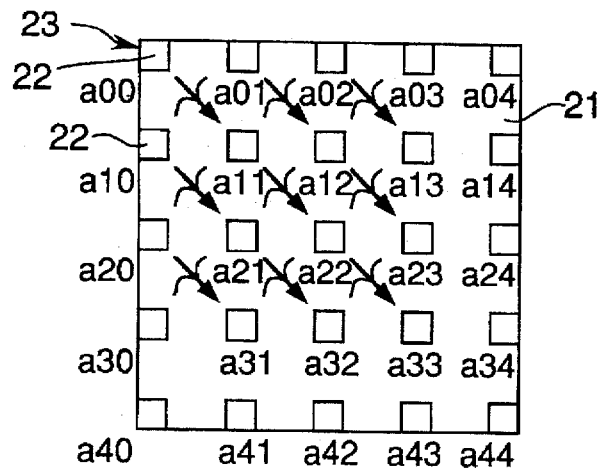
FIG. 26 is a view for explaining a second search method for searching for specific patterns in adjacency to the center of the information recording area based on the positions of specific patterns placed along the perimeter of the information recording area.
Figure 27:
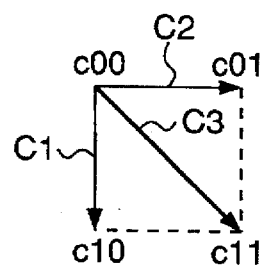
FIG. 27 is a view for explaining the way of determining the remaining one of coordinates constituting a parallelogram by using known three coordinates through the synthesis of vectors.

The second search method, as shown in FIG. 26, is a method in which, by using three known adjacent specific patterns 22, the position of a nearby specific pattern 22 is predicted. In general, as shown in FIG. 27, if coordinates of three points c00, c01, c10 are known, then coordinates of the remaining one point c11 that constitutes a parallelogram with the three known points can be determined from the known coordinates of the three points c00, c01, c10 by using vector synthesis (the synthesis of a vector C1 (c00→c10) and another vector C2 (c00→c01) is equal to a vector C3 (c00→c11)). Therefore, the position of the specific pattern a11 is predicted by using the known coordinates of the specific patterns a00, a01, a10, and a pattern coincident with the specific pattern is searched for by looking into the proximity to the predicted position. Then, a search for the specific pattern a12 is made by using the newly obtained coordinates of the specific pattern a11 and the coordinates of the specific patterns a01 and a02. In this way, the specific patterns a11 to a13, a21 to a23, and a31 to a33 in proximity to the center of the information recording area 23 are found out sequentially.

A distortion of the recording surface 20 continuously varies within the recording surface 20 as shown in FIG. 3B. Accordingly, with respect to the predicted positions, the second search method, in which the positions of a nearby specific pattern is determined by using positional information on adjacent specific patterns 22, could be considered higher in precision than the first search method, in which an overall search for specific patterns is made. However, in the second search method, once the position of a specific pattern is misdetermined, the error would be reflected on calculation of the predicted position of the next adjacent specific pattern. Conversely, the first search method is free from such problems. Therefore, it is difficult to say which of the search methods is more preferable and advantageous.

Figure 28:
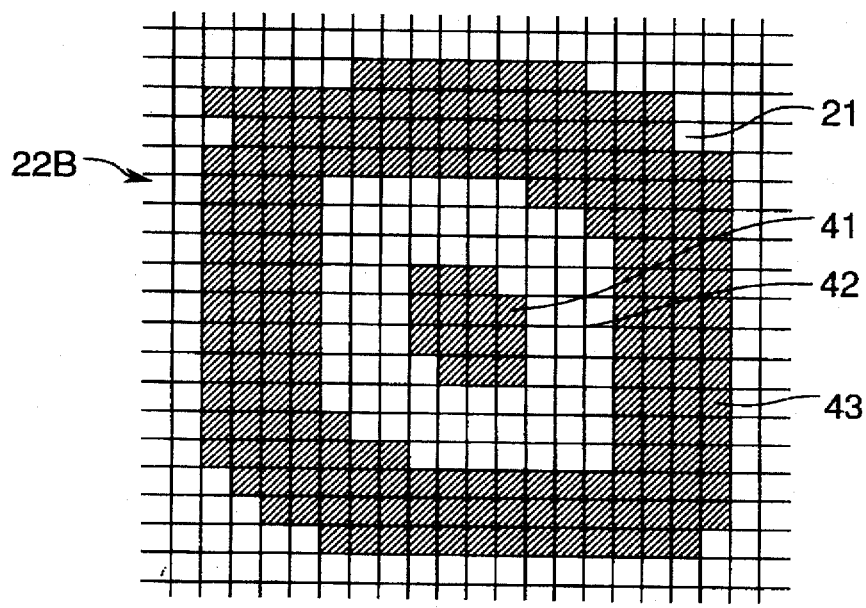
FIG. 28 is a view showing bit map data obtained by reading the specific pattern of FIG. 7 with a reading device.

(ii) Next, the position (positional information) of a found specific pattern 22 is determined in the following way:

FIG. 28 illustrates bit-mapped data obtained by reading a specific pattern 22B shown in FIG. 7. The position of this specific pattern 22B can be represented by the position of the central portion 41, and the position of the central portion 41 is desirably represented by the position of its center of gravity.

The position of the center of gravity of the central portion 41 in the bit-mapped data of FIG. 28 is determined by examining the positions of all the black bits that constitute the central portion 41 and then averaging the positions of the black dots. When the averaging technique is used to determine the position of the center of gravity, the more the number of samples to be used for the averaging, the higher the precision in determining the correct position of the center of gravity. Since the specific pattern 22B is symmetrical with respect to vertical and horizontal directions, the position of the center of gravity of the first loop portion 42 is supposed to be also coincident with the position of the center of gravity of the central portion 41. Therefore, in the bit-mapped data of FIG. 28, by averaging the positions of all the black bits that constitute the central portion 41 and also by averaging the positions of all the white bits that constitute the first loop portion 42, the position of the center of gravity of the central portion 41 is determined with high precision. In addition, it might also be possible to further use the information on the second loop portion 43. However, using the information on the second loop portion 43 is not so Practical because it is difficult to recognize the boundary between the meshes of the second loop portion 43 and meshes 21 representing the recorded information when the values of the meshes representing the recorded information immediately adjacent to the outer edge of the second loop portion 43 are black.

Also for the specific pattern 22A shown in FIG. 6, the position of its center of gravity can be determined by averaging the positions of all the white bits that constitute the central closed area 44. However, note that the position of the center of gravity represents the position of the center of the four meshes that constitute the central closed area 44, and is not a point that represents any one of the meshes.

Figure 29:
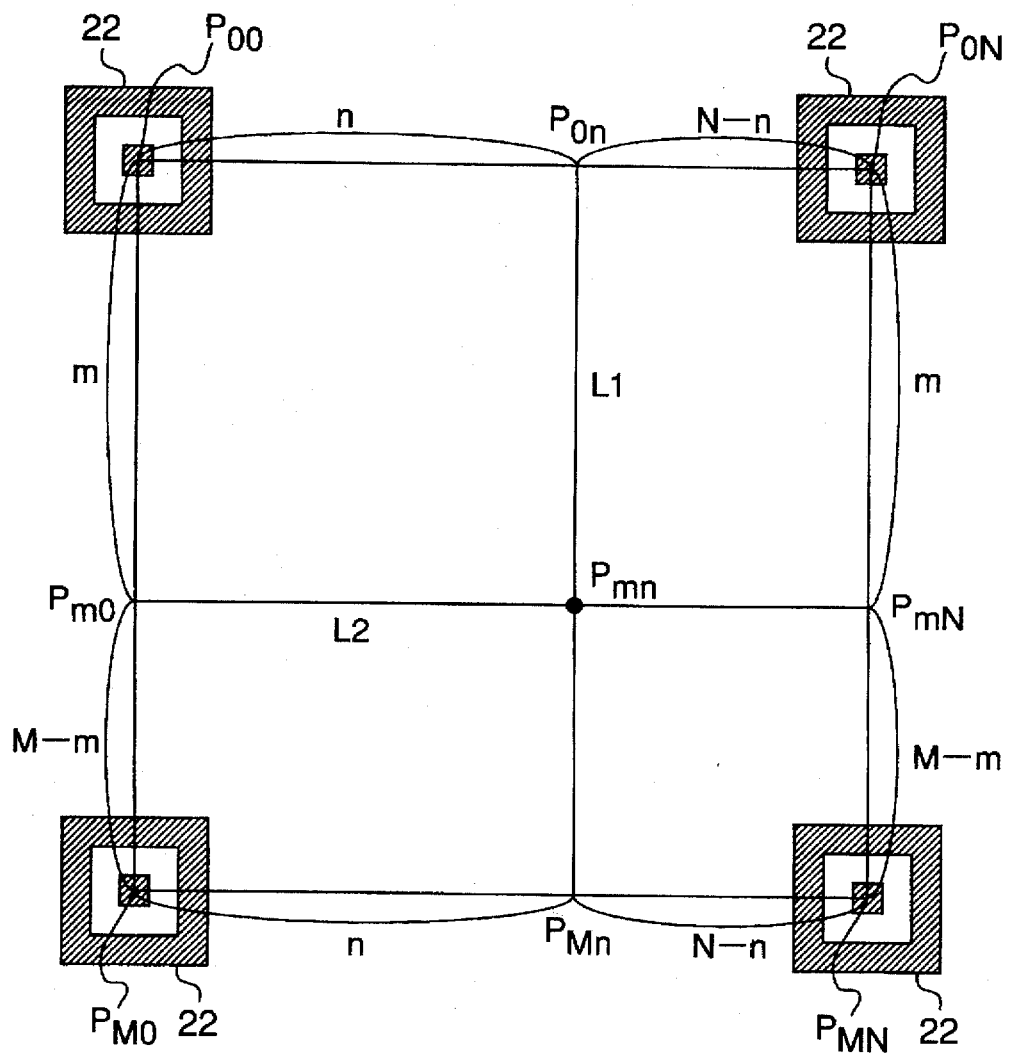
FIG. 29 is a view for explaining the way of calculating the position of any given mesh within the information recording area based on the positions of four specific patterns.

(iii) Next, the values of the meshes 21 representing the recorded information are obtained:

The method therefor is explained with reference to FIG. 29. FIG. 29 schematically shows a region in the information recording area 23, the region containing four adjacent specific patterns 22 (a region containing meshes of M rows by N columns). Even if an irregular distortion as shown in FIG. 3B has occurred over the whole recording surface 20, the distortion occurring to such a small region surrounded by four adjacent specific patterns can be approximated to an almost proportional distortion.

Referring to FIG. 29, assume that the position of the upper left (row 0, column 0) specific pattern 22 is $P_{00}$, the position of the upper right (row 0, column N) specific pattern 22 is $P_{0N}$, the position of the lower left (row M, column 0) specific pattern 22 is $P_{M0}$, and the position of the lower right (row M, column N) is $P_{MN}$, and that the position of a mesh of the mth row and the nth column (where m, n are arbitrary integers) in the region surrounded by these four specific patterns 22 is $P_{mn}$.

If a point that internally divides a line segment connecting $P_{00}$ and $P_{0N}$ at a ratio of n:(N-n) is $P_{0n}$, if a point that internally divides a line segment connecting $P_{M0}$ and $P_{MN}$ at a ratio of n:(N-n) is $P_{Mn}$, if a point that internally divides a line segment connecting $P_{00}$ and $P_{M0}$ at a ratio of m:(M-m) is $P_{m0}$, and if a point that internally divides a line segment connecting $P_{0N}$ and $P_{MN}$ at a ratio of m:(M-m) is $P_{mN}$, then the position of the mesh $P_{mn}$ to be determined can be expressed as the intersecting point between a line L1 connecting $P_{0n}$ and $P_{Mn}$ and another line L2 connecting $P_{m0}$ and $P_{mN}$. The intersecting point $P_{mn}$ of the lines L1 and L2 is expressed also as a point that internally divides the line L1 at a ratio of m:(M-m) or a point that internally divides the line L2 at a ratio of n:(N-n). By using the positions $P_{00}$, $P_{0N}$, $P_{M0}$, $P_{MN}$ of the four specific patterns 22, the position $P_{mn}$ of a mesh within the region surrounded by these four specific patterns 22 is expressed as:

$$P_{mn} = \frac{(M-m)(N-n)P_{00} + (M-m)n \cdot P_{0N} + m(N-n)P_{M0} + m \cdot n \cdot P_{MN}}{M \cdot N} \quad (1)$$

Figure 30:
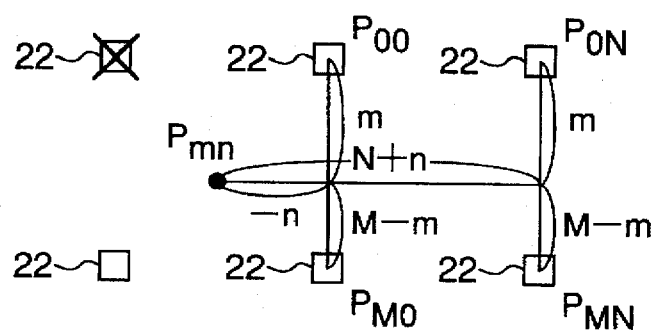
FIG. 30 is a view for explaining a variation of the way of calculating the position of any given mesh within the information, recording area on the based positions of four specific patterns.

In addition, from the viewpoint of determining the position $P_{mn}$ of a mesh representing recorded information by a proportional division method using the positions $P_{00}$, $P_{0N}$, $P_{M0}$, $P_{MN}$ of the four adjacent specific patterns 22, it is also possible to use the points that externally divides the individual line segments, instead of the points that internally divide the line segments. Therefore, as shown in FIG. 30, even if either one (marked by x) of the four specific patterns surrounding the target mesh $P_{mn}$ cannot be found, it is possible to determine the position $P_{mn}$ of the target mesh by a proportional division (external division) method by using, for example, a set of another four specific patterns 22 on the immediately right side.

Figure 31:
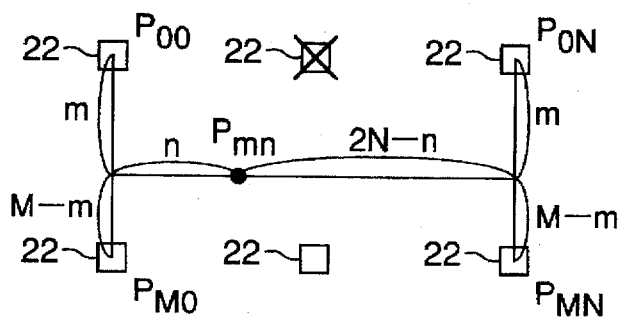
FIG. 31 is a view for explaining a further variation of the way of calculating the position of any given mesh within the information recording area based on the positions of four specific patterns.

Also, the four specific patterns 22 do not necessarily need to be adjacent ones. As shown in FIG. 31, if either one (marked x) of the adjacent four specific patterns is not found, similar proportional divisional process is achieved even by using, for example, a set of four specific patterns 22, which are adjacent to each other in the longitudinal direction but are not adjacent in the transverse direction.

Further, this method of determining the position of an arbitrary mesh from four specific patterns is applied to not only cases where the information recording area is rectangular, but also cases where it is, for example, a parallelogram (FIG. 20).

In this way, by determining the position $P_{mn}$ of the target mesh, the value of the position-determined mesh can be obtained.

Figure 32:
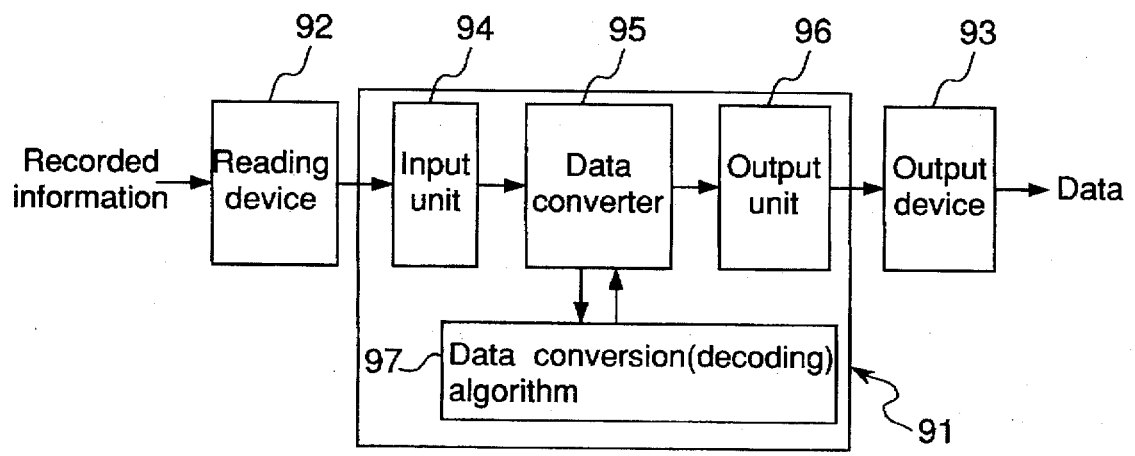
FIG. 32 is a diagram showing the block configuration of a digital information decoding apparatus.

(8) Construction and basic operation of the digital information decoding apparatus FIG. 32 outlines the construction of a digital information decoding apparatus according to an embodiment of the present invention. This apparatus has a reading device 92, an information decoder 91, and an output device 93. The reading device 92 is exemplified by an image scanner, CCD (Charge-Coupled Device) camera, or the like, and an appropriate type is selected depending on the required reading precision. The reading device 92 reads recorded information printed on the recording surface 20 such as paper.

The information decoder 91 has an input unit 94, a data converter 95, an output unit 96, and a data conversion (decoding) algorithm 97. The input unit 94 receives data from the reading device 92 as input information, and delivers it to the data converter 95. It is noted that the input information delivered from the reading device 92 to the input unit 94 is, in general, bit image. The data converter 95 decodes the input information received from the input unit 94 with the data conversion (decoding) algorithm 97, and delivers the conversion result to the output unit 96 as output information. The output unit 96 sends the output information received from the data converter 95 to the output device 93. The output device 93 is exemplified by a display, data base, etc., and displays or stores the read information.

In this arrangement, conversion performed by the data conversion (encoding) algorithm 87 of FIG. 21 and conversion performed by the data conversion (decoding) algorithm 97 of FIG. 32 are inverse to each other. Therefore, the recorded information printed on the recording surface 20 by the recording device of FIG. 21 is read by the decoding apparatus of FIG. 32, so that the same data as the original is obtained.

Figure 33:
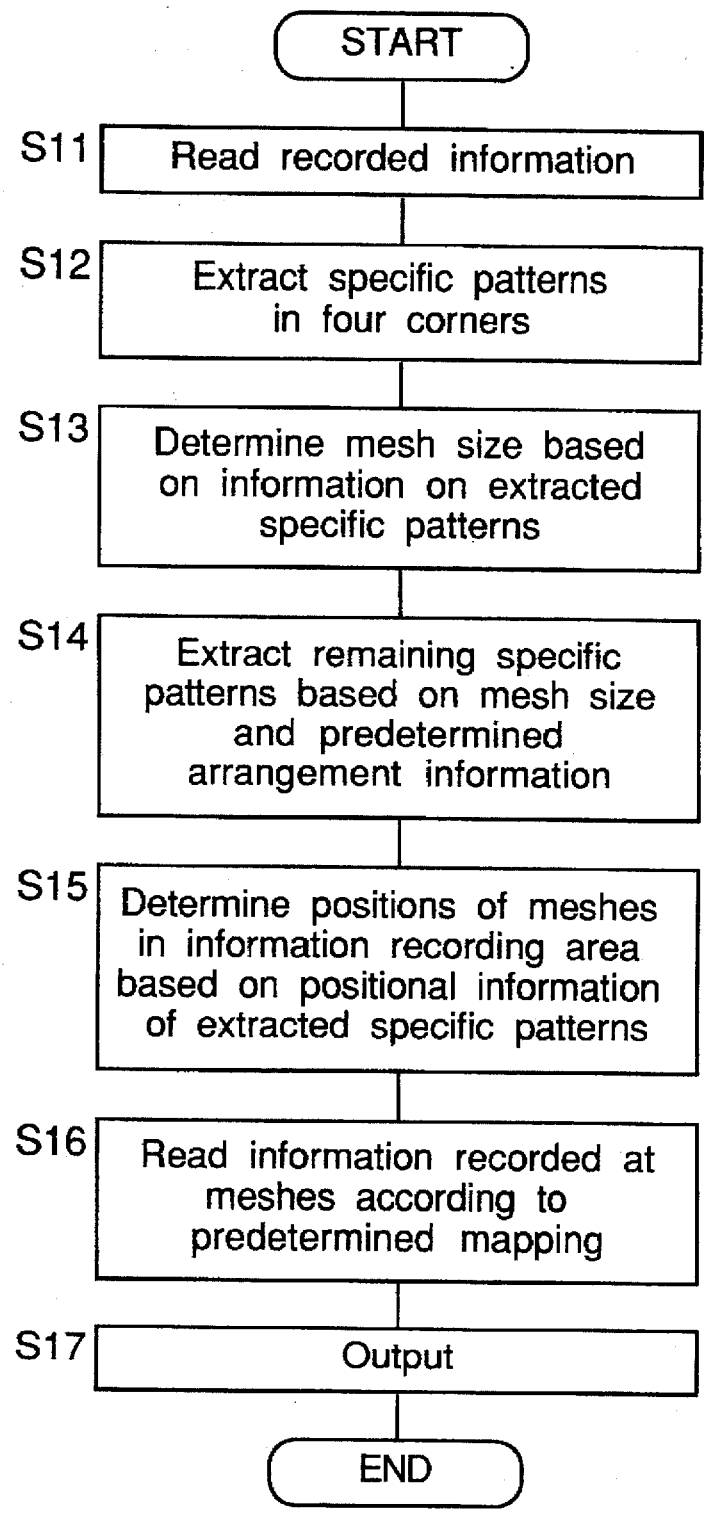
FIG. 33 is a chart schematically showing the processing flow for explaining the operation of the digital information decoding apparatus.

This information decoding apparatus reads information recorded on the recording surface 20 of a recording carrier, according to the flow shown in FIG. 33. It is assumed here that, as shown in FIG. 1, the specific patterns 22 are placed within the information recording area 23 in the lattice form at regular intervals and that recorded information with four specific patterns 22 placed at the four corners of the information recording area 23 will be decoded.

(i) First, the reading device 92 reads information recorded on the recording surface 20 of the recording carrier (S11), and delivers it to the input unit 94 of the information decoder 91.

(ii) In the information decoder 91, the data converter 95, which has received data via the input unit 94, performs the following processes according to the data conversion (decoding) algorithm 97:

First, the data converter 95 extracts specific patterns 22 placed at the four corners within the information recording area 23 (S12).

Next, the size of one mesh is determined based on the information on the four-corner specific patterns 22 (S13).

Next, the remaining specific patterns are extracted based on predetermined placement information (S14). The predetermined placement information is information on the placement of the specific patterns 22 such as, for example, that the specific patterns are so placed into a lattice shape as to appear every ten longitudinal meshes and every fifteen transverse meshes.

Next, based on the information on the positions of the extracted specific patterns (positional information), the data converter 95 determines the positions of the meshes representing the recorded information (S15).

Next, according to a predetermined mapping, the data converter 95 reads the information recorded at such meshes 21 (S16). It is noted that the predetermined mapping refers to a correspondence between the meshes 21 and the bit information such as described before with reference to FIG. 22. (iii) Then, the output device 93 outputs the output information delivered from the output unit 96 of the information decoder 91 (S17).

In this way, with this digital information decoding apparatus, digital information recorded on the recording surface 20 of a recording carrier is decoded.

(9) Specific patterns at the four corners of the information recording area

In the present invention, a plurality of specific patterns 22 are placed within the information recording area 23. Among the specific patterns 22 those placed at the four corners of the information recording area 23 are of greater importance than the others.

(i) In the information decoding method, as is obvious from the processing flow of FIG. 33 (step S12), the specific patterns 22 at the four corners of the information recording area 23 are searched for preferentially to the other specific patterns. This is not only because the four-corner specific patterns are easier to find than the others, but also because finding first the four-corner specific patterns 22 makes it possible to determine the range occupied by the information recording area 23 within the recording surface 20.

That is, the presence of the specific patterns 22 at the four corners of the information recording area 23 allows the range occupied by the information recording area 23 within the information recording area 23 to be easily recognized (that is, what is called, cut out) during a read operation. For example, referring to the example of FIG. 1, even if the meshes constituting the information recording area 23 are all white, the presence of the specific patterns 22 at the four corners allows the range occupied by the information recording area 23 to be easily determined. It is also true when the meshes constituting the information recording area 23 are all black. It is noted that cases where the specific pattern is composed of white meshes only are not considered. Oppositely, with the specific patterns 22 absent at the four corners of the information recording area 23, it would be impossible to discriminate whites within the information recording area 23 from whites outside the information recording area 23. This is because the meshes placed along the perimeter of the information recording area 23 are sometimes all whitened.

Figure 34:
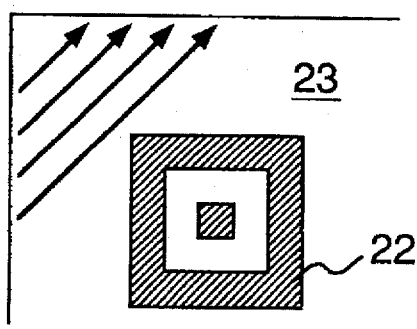
FIG. 34 is a view for explaining a way of searching for specific patterns of the four corners of the information recording area.

(ii) FIG. 34 schematically shows the method of searching for the specific patterns 22 of the four corners of the information recording area 23 from the bit-mapped data constituting the recorded information. For a search for a specific pattern 22 placed at the top left corner, the bit-mapped data is scanned obliquely from its top left corner in skew directions (indicated by arrows in the figure). If the peripheral portion of the information recording area 23 is made up of white bits, then a black bit that is a constituent bit of the top left specific pattern 22 appears first in the skew scan. Thus, the specific pattern 22 of the top left corner is found out. It is natural that the specific patterns of the top right corner, bottom left corner, and bottom right corner in the information recording area 23 can be found similarly by the skew scanning of the bit-mapped data from the top right corner, bottom left corner, and bottom right corner, respectively.

(10) Segmentation

It is more often advantageous that with the information recording area divided into segments, information is recorded in the units of segments.

Figure 35:
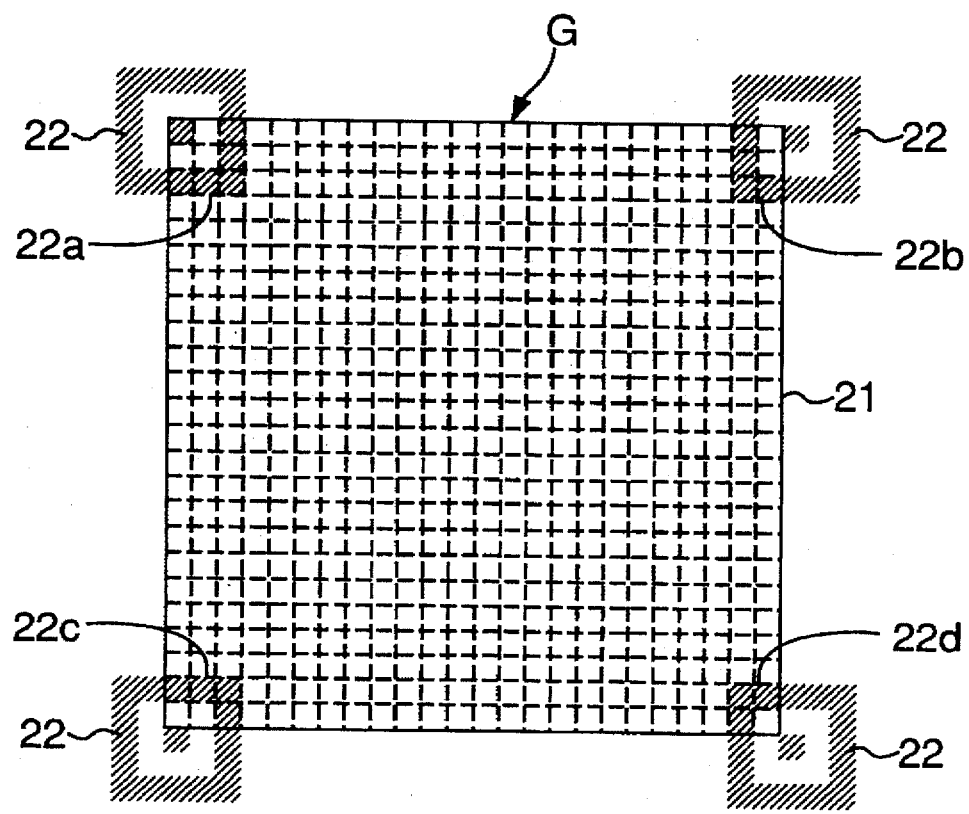
FIG. 35 is a view showing a segment set by a digital information recording method which is an embodiment of the present invention.

FIG. 35 shows a segment G set by a digital information recording method which is an embodiment of the present invention. The segment G has specific patterns 22 (which are assumed here to mean the specific pattern 22B as shown in FIG. 7) overlaid on a rectangular block 21 in the units of meshes. In more detail, the rectangular block 21 is sized larger than the specific pattern 22 in both longitudinal and transverse dimensions, and consists of longitudinal 25 meshes×transverse 25 meshes=625 meshes. The specific pattern 22 is divided into two divisions in each of the longitudinal and transverse directions, totally four divisions, and is placed so that the four divisional patterns 22a, 22b, 22c, 22d are inscribed at the four corners of the rectangular block 21. Since the specific patterns 22 occupy 25 meshes (9 meshes at the left top corner, 6 meshes at the right top corner, 6 meshes at the left bottom corner, and 4 meshes at the right bottom corner), the original recording-object information can be recorded to 600 meshes. It is noted that the dotted lines and solid lines that partition the meshes are virtual. Also, FIG. 35 shows an aspect of synthesizing the specific patterns 22 by adding complements of the divisional patterns 22a, 22b, 22c, 22d to outside of the rectangular block 21 for convenience of understanding.

Figure 36:
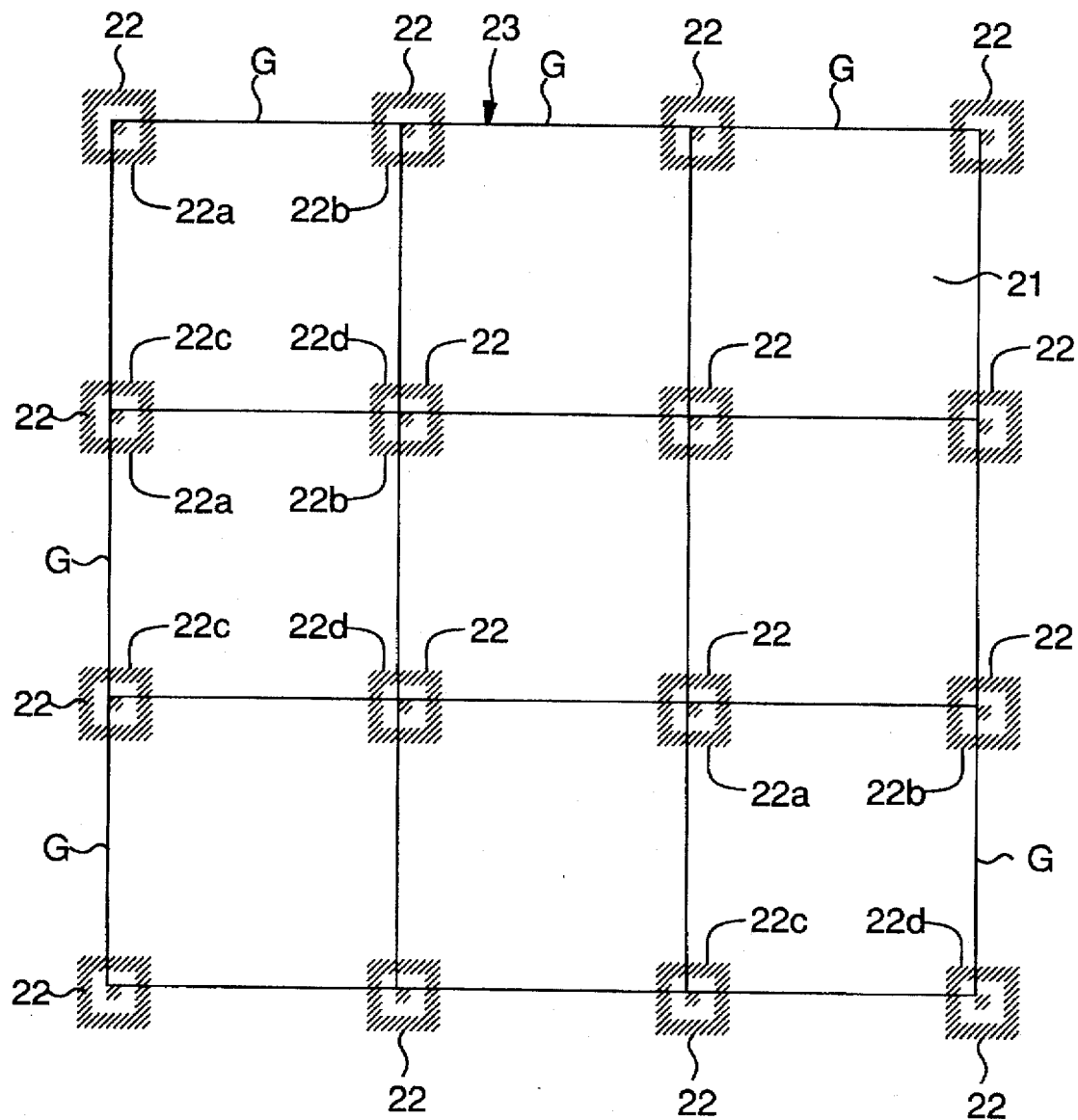
FIG. 36 is a view showing an example of the information recording area in which the segments of FIG. 35 are arrayed.

As shown in FIG. 36, the information recording area 23 is set by arraying a plurality of the segments G on the recording surface 20 without clearances. In this example, totally 9 segments G of longitudinal 3×transverse 3 are arrayed to make up the information recording area 23. Since the individual divisional patterns are placed at the four corners of the rectangular block 21, arraying the segments G in this way results in a synthesis of the specific patterns 22 each composed of the divisional patterns placed at adjoining rectangular blocks 21 (segments G) at each boundary point where four rectangular blocks 21 are adjoining one another with their vertices abutting together. Also, pattern portions serving as the complements of the divisional patterns 22a, 22b, 22c, 22d are added so as to be circumscribed about the segments G present along the perimeter of the information recording area 23 so that the specific patterns 22 are synthesized outside the segments G.

In this way, when the specific patterns 22 are placed at the four corners of the segments G, the specific patterns 22 are placed at the four corners of the information recording area 23, so that the range of the information recording area 23 can be easily recognized in reading operations, advantageously.

Figure 37:
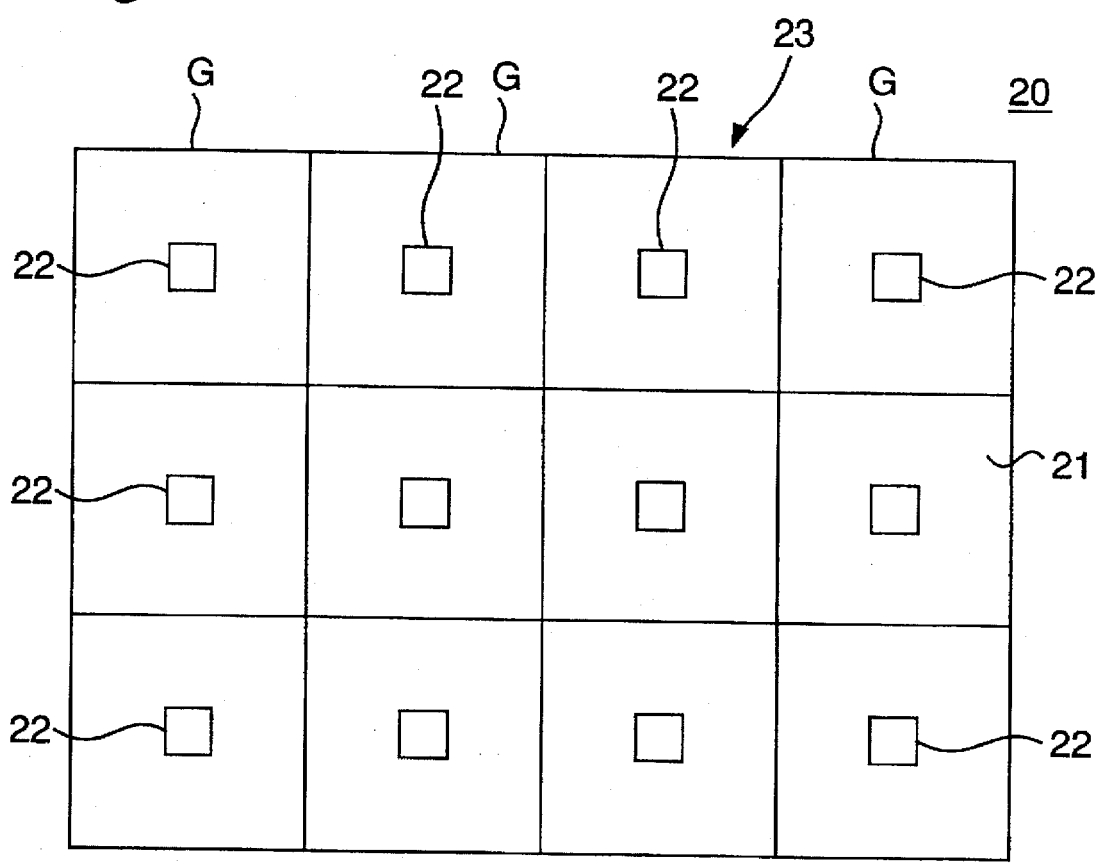
FIG. 37 is a view showing an example in which each specific pattern is placed at the center of each segment.

However, it is not necessarily required that the specific patterns 22 be present at the four corners of the information recording area 23. As shown in FIG. 37, the specific patterns 22 may also be placed at the individual centers of the segments G. If the array of the segments G is synchronized with the arrangement of the specific patterns 22, then the information recording in the units of segments G is enabled.

The advantages of the segmentation can be listed as follows: (1) Since the processing can be carried out in the units of segments G, an efficient reading can be achieved. Also, if the reading device has a small amount of memory buffer capacity, repeating the reading to decoding processes sequentially will do. This means that the memory buffer can be saved.

(2) The processing of detecting and/or correcting reading errors can be implemented in the units of segments G. When this is done, an excess bit such as a checksum or CRC (cyclic redundancy check) is added for each segment G. It is also possible to implement the shuffling process for each segment G, which process is purposed to distribute burst errors.

(3) In case of a reading error, it is possible to read again only the target segment G. For reading again the target segment G, it is also possible to apply a method other than a method that has been first applied, to such processes in the reading device as magnifying the power of a CCD camera, or to such processes in analysis as employing a higher precision method for analyzing a read image. For such processes, if a method that allows fast processing to be expected is used for the first reading operation and if another method that requires longer time but provides higher precision is used for the second reading, then a fast, reliable reading can be achieved as a whole.

Figure 38:
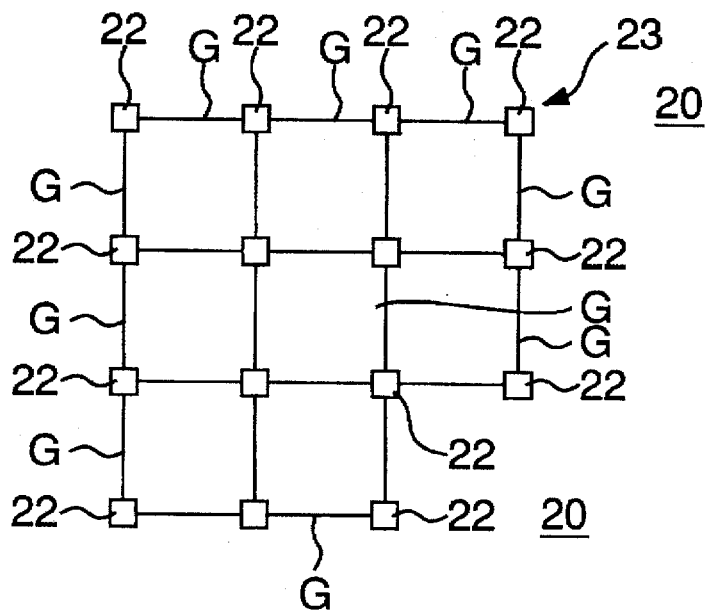
FIG. 38 is a view showing another example of the information recording area in which the segments of FIG. 35 are arrayed.

(4) The shape of the information recording area 23 can be set freely. That is, as far as segments G are arrayed without clearances, it can be set freely how many segments G are arrayed in the longitudinal and transverse directions, respectively. The segments G may be arrayed not only into longitudinally longer or transversely longer oblong shapes, but also into such corner-lacking rectangular shapes as shown in FIG. 38 or, more extremely, such a complex array as shown in FIG. 39.

Figure 39:
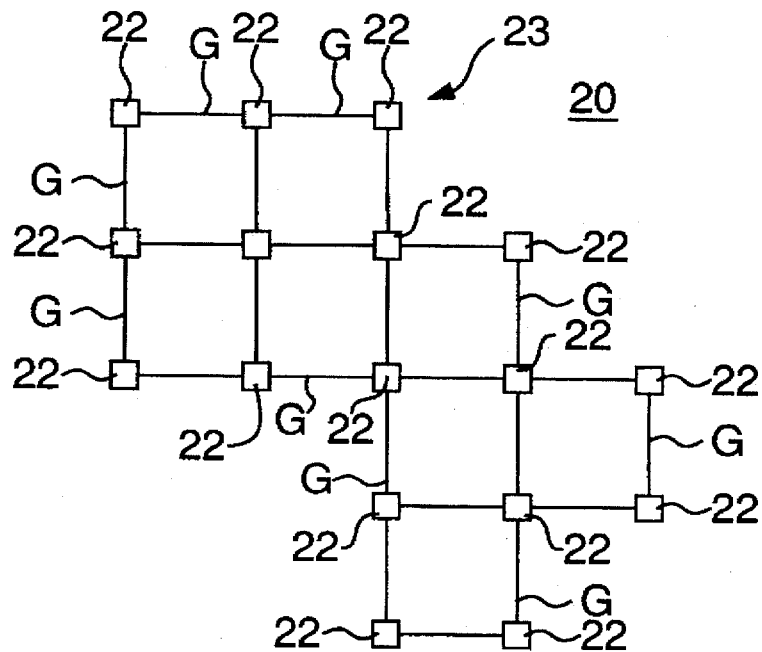
FIG. 39 is a view showing still another example of the information recording area in which the segments of FIG. 35 are arrayed.
Figures 40, 41:
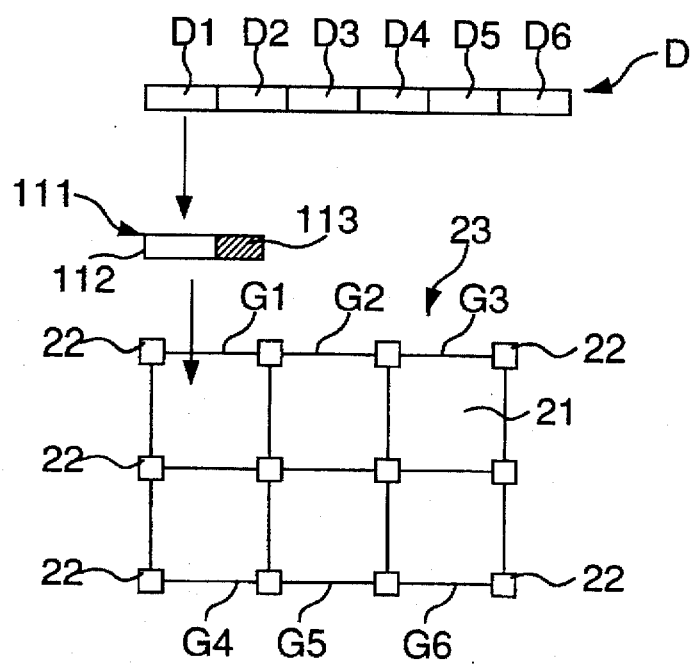
FIG. 40 is a view showing an aspect in which information on adjoining segments and information on their numbering are recorded in the segments within the information recording area constructed as shown in FIG. 39.
FIG. 41 is a view for explaining the method of recording digital information to the segments by dividing the information into pieces of unitary information.

In particular, when a complex array as shown in FIG. 39 is adopted, it is convenient for reading operations to record adjacency information that represents whether or not segments G adjoining up and down, right and left are present for each segment G, and number information that represents the sequence of the unitary information assigned to each segment G. For example, FIG. 40 shows a state in which an "arrangement" as the adjacency information and a "number" as the number information are recorded to each of the segments G arrayed as shown in FIG. 39. The item "arrangement" represents, as four-bit information, whether or not adjoining segments G are present "right, down, left, and up" of a segment G. The four bits correspond to the "right, down, left, and up", respectively, in descending order of bits, where a bit value 1 represents "present" and value 0 represents "absent". The item "number" shows how the pieces of unitary information assigned to the eight segments G within the information recording area 23 are sequenced in the original digital information. In such a case, in a reading process, the pieces of unitary information can be read from the segments G in the same sequence as the pieces of unitary information have been recorded in the recording stage while it is being confirmed whether segments G adjoining one segment G are present or absent, based on the "arrangement" and "number".

FIG. 41 shows the way how recording-object digital information is recorded to the information recording area 23 in the units of segments G.

In this example, it is assumed that the information recording area 23 is made up of longitudinal 2×transverse 3 segments G1, . . . , G6.

First, recording-object digital information D is divided into regular lengths according to the number of the segments G, whereby unit data 112 (D1 . . . , D6) are prepared as unitary information. Additional information data 113 is added to each piece of unit data 112 as required. The additional information data may be data of error detection or error correction such as a checksum or CRC, data representing the "arrangement" and "number" of segments G, or the like.

Next, the addition result 111 made up from the unit data 112 and the additional information data 113 added thereto (the result 111 also referred to as "unit data") is allocated (mapped) to the segments G, and recorded to meshes other than the meshes occupied by the specific patterns 22 within the segments G.

Figure 43:
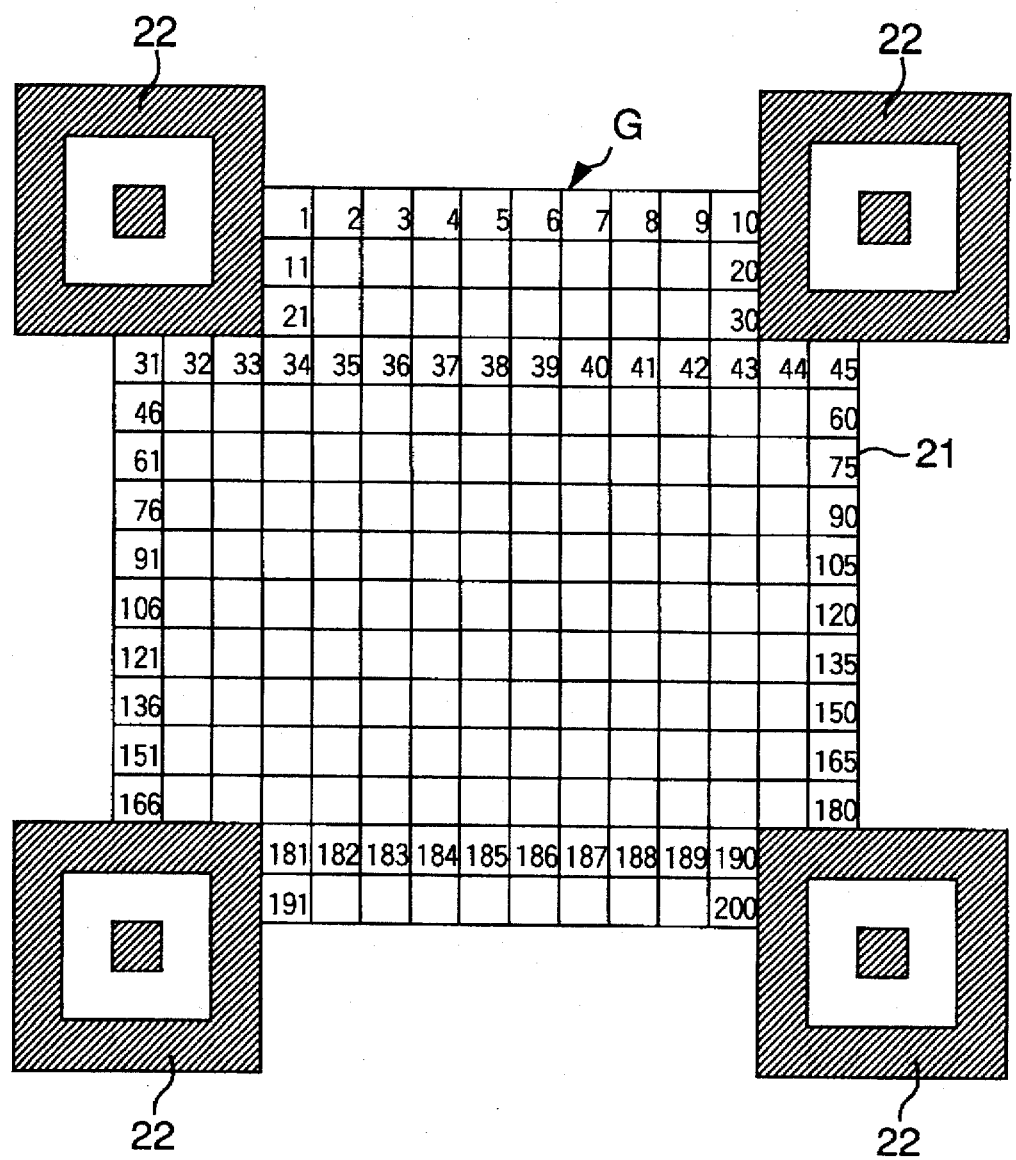
FIG. 43 is a view for explaining a way how bit information to be recorded is allocated to the meshes in the segment.

In this example, the first unit data 111 containing D1 is assigned to a segment G1 of the left top corner. Similarly, the second, . . . , sixth unit data containing D2, . . . , D6 are assigned to segments G2, . . . , G6, respectively. In each segment G, as shown in FIG. 43, the unit data 111 is assigned to meshes other than the meshes occupied by the specific patterns 22 out of the rectangular block 21. In this example, the data is mapped in the order from left to right of the first row, then from left to right of the second row, and so on.

For reading the information recorded in the information recording area 23, it can be read in the units of segments by the process reverse to that of recording.

(11) Layout of segments G

When the segments G are arrayed on the recording surface 20, it is desirable to array the segments G according to specified array rules including the direction and number with which the segments G should be arrayed.

The array rules specify not merely to a way how each segment G is placed into an array, but to an upper-order concept including the direction and number of segments G with which they should be arrayed.

Figure 44A:
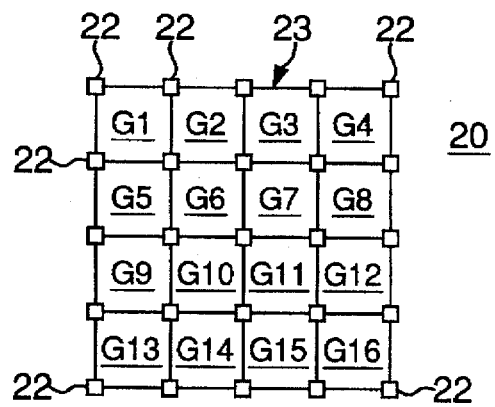
FIGS. 44A to 44C are views showing examples in which the information recording area is made up by arranging 16 segments according to specified array rules, where
Figure 44B:
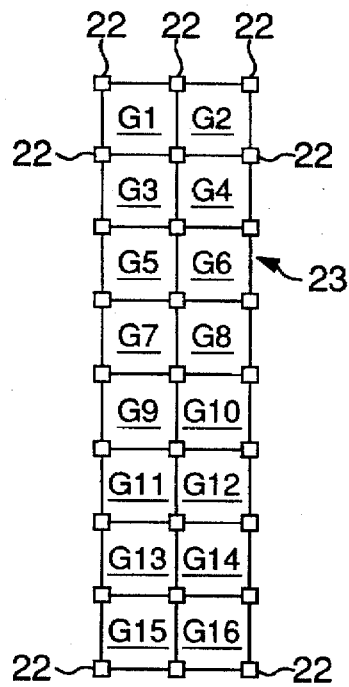
Figure 44C:
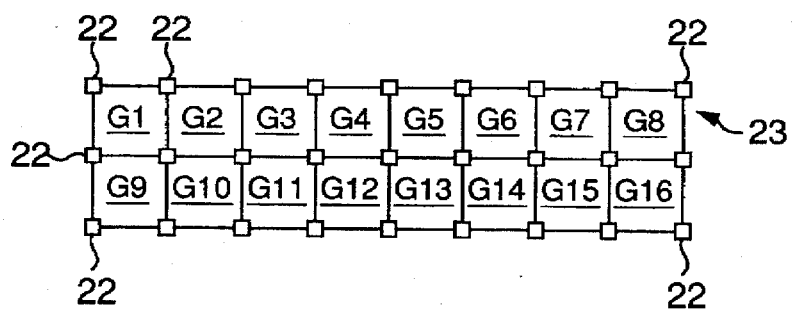

For example, when 16 segments G1, . . . , G16 are arrayed, they may be laid out into a square as shown in FIG. 44A, a rectangle with two segments transverse as shown in FIG. 44B, or a transversely long rectangle with two segments longitudinal as shown in FIG. 44C. In any case of FIGS. 44A, 44B, and 44C, the segments G are first arrayed from right to left, and such groups of right-to-left arrayed segments are arrayed from top to bottom. Unless such arrangement rules are kept unchanged even with the layout changed, the pieces of unitary information can be read from the individual segments G in the same sequence as they have been recorded in the recording stage, according to the array rules in reading operations, without the above-mentioned "number" information contained in the segments G. Accordingly, the original digital information can be easily restored.

Figure 45:
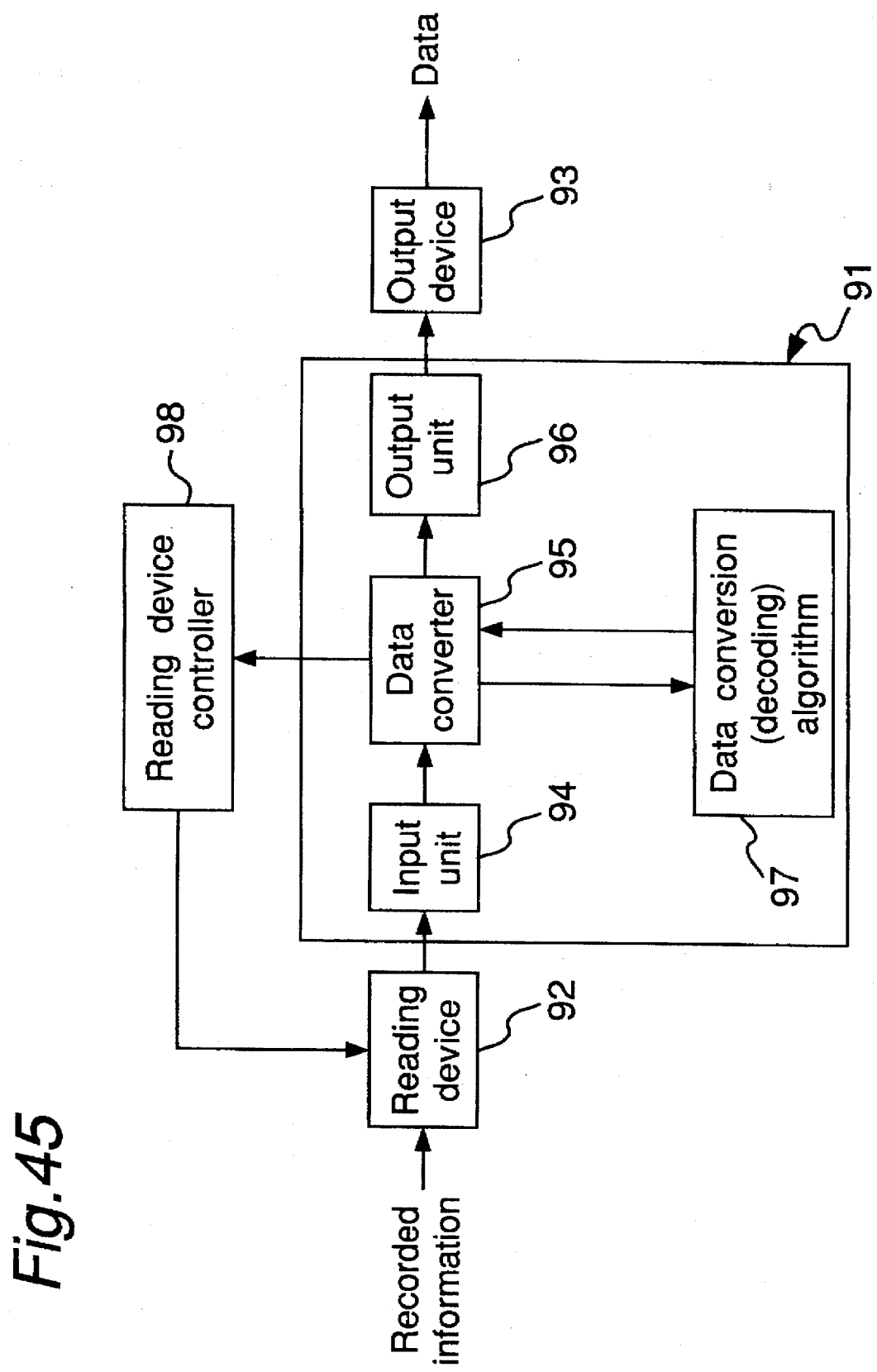
FIG. 45 is a diagram showing a block configuration of a digital information decoding apparatus which is an embodiment of the present invention.

(12) Decoding apparatus for performing reading operations in the units of segments FIG. 45 outlines the construction of a digital information decoding apparatus which is an embodiment of the present invention. This information decoding apparatus comprises a reading device controller 98 which forms part of a control means, in addition to the components of the information decoding apparatus as shown in FIG. 32. This reading device controller 98 changes the relative positions of the reading device 92 and the recording surface 20, in order to obtain appropriate image information from the recording surface 20 based on the information obtained by a data converter 95.

Figure 46:
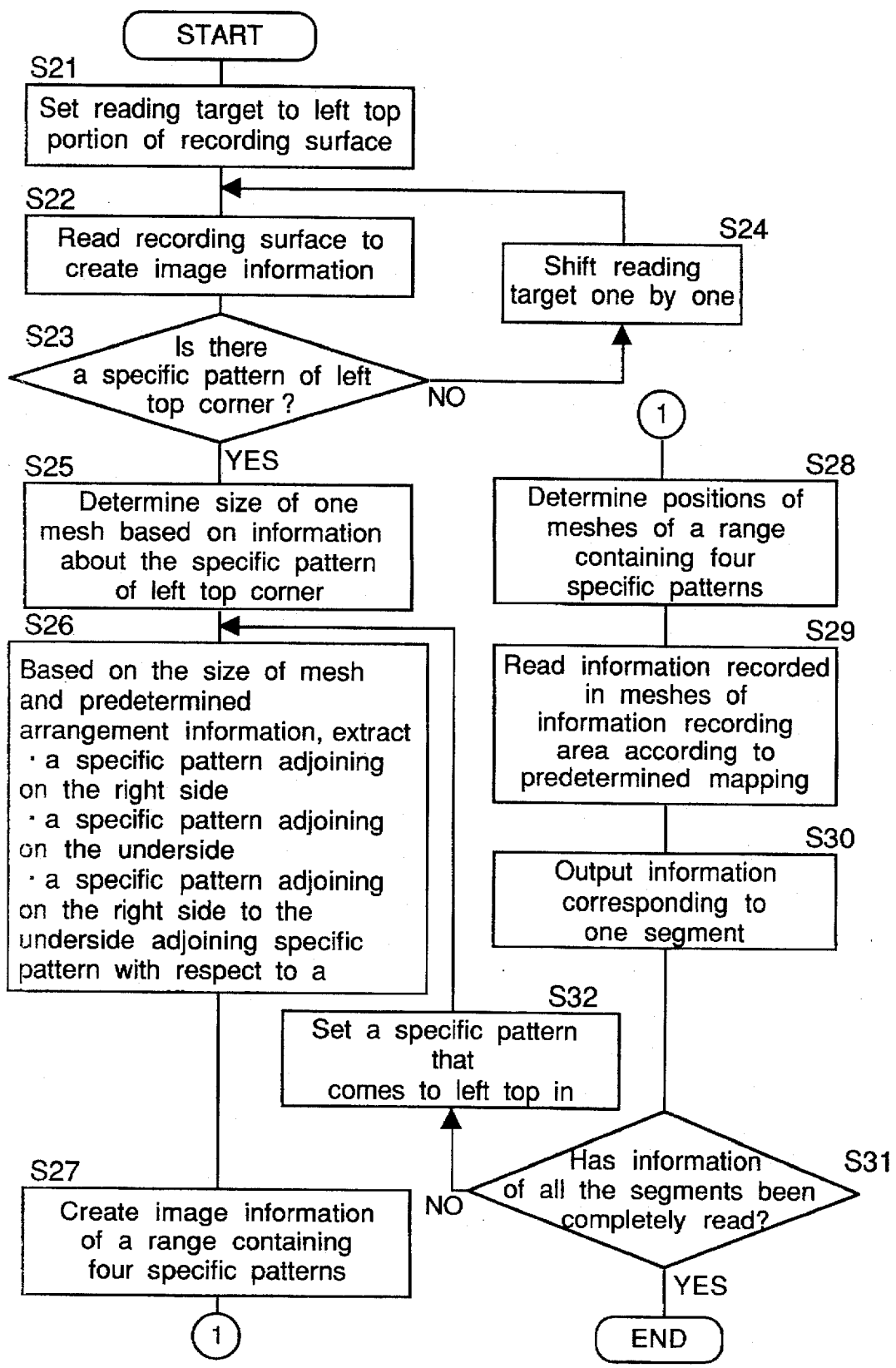
FIG. 46 is a chart schematically showing a processing flow for carrying out a digital information decoding method which is an embodiment of the present invention.

The information decoding apparatus is able to read out information recorded in the information recording area 23 of the recording surface, according to the flow shown in FIG. 46 and in the units of segments.

Figure 42:
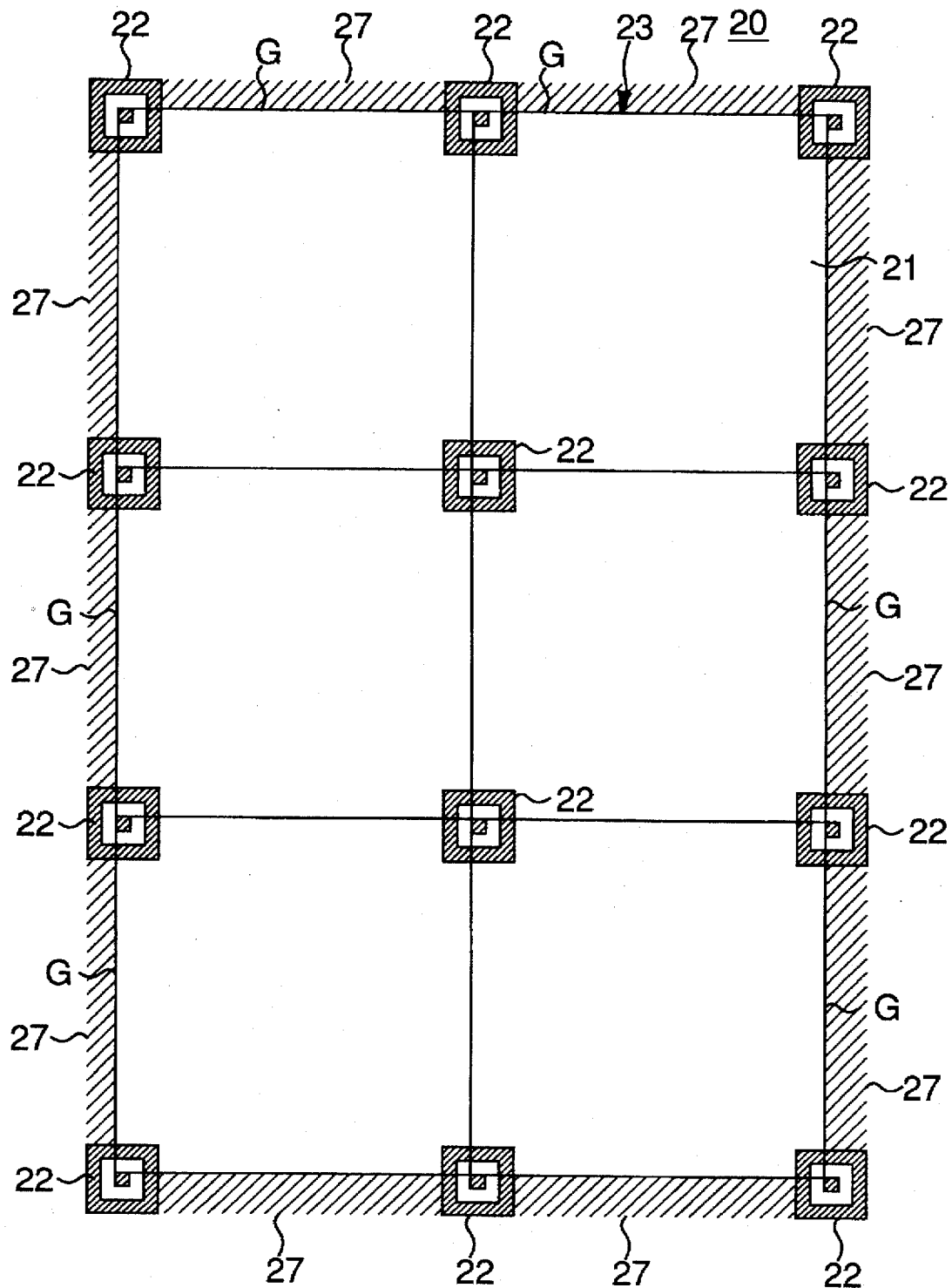
FIG. 42 is a view showing an example of the information recording area in which the segments of FIG. 35 are arrayed with marginal portions on the periphery.

In this example, a case is described below in which longitudinal 3×transverse 2 segments G are arrayed in the information recording area 23 as shown in FIG. 42.

(1) First, a reading target is set at a left top portion of the recording surface 20 (S21). The recording surface 20 is read, whereby image information is created (S22). This process is carried out by the reading device controller 98 controlling the operation of the reading device 92 according to the instruction given from the data converter 95. Subsequently, it is examined whether or not the created image information contains a specific pattern 22 placed at the left top corner of the information recording area 23 (S23). If the read image information contains no specific pattern 22 of the left top corner, then the search is continued with the reading target changed one by one until the specific pattern 22 of the left top corner is found (S24). The reading target may be changed, for example, according to the move of the scan line as shown in FIG. 34.

(2) Next, the size of one mesh is determined based on the information on the found specific pattern 22 of the left top corner (S25). With the size of one mesh known, four specific patterns 22 placed at positions corresponding to vertices of the segment G present at the left top corner of the information recording area 23 are searched for according to predetermined arrangement information, for example, that specific patterns 22 appear longitudinally every twenty meshes and transversely every twenty meshes (S26). That is, with respect to a known specific pattern 22, extracted are "a specific pattern 22 adjoining on the right side", "a specific pattern 22 adjoining on the underside", and "a specific pattern 22 adjoining on the right side to the underside adjoining specific pattern 22" Thus, the segment G of the left top corner can be defined. Then, image information of a range containing the four specific patterns 22 is created (S27). This process is carried out by the reading device controller 98 controlling the operation of the reading device 92 according to the instruction from the data converter 95.

(3) Next, within the segment G of the left top corner defined by the four specific patterns 22, the pattern represented by the meshes other than the meshes occupied by the specific patterns 22 is decoded, whereby the unitary information assigned to the segment G is read.

In more detail, based on the positional information on the four specific patterns 22, the positions of the meshes within the segment G are determined (S28). Subsequently, according to a predetermined mapping as shown in FIG. 43, information recorded at the individual meshes is read (S29). Then, the read information corresponding to one segment G is outputted (S30).

Figure 47:
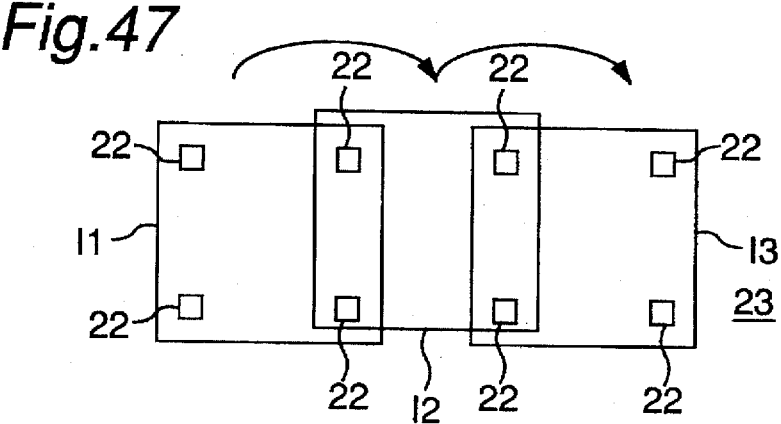
FIG. 47 is a view for explaining how to capture image information sequentially in the units of segments.

(4) Next, a specific pattern 22 that comes to the left top corner in a segment G adjoining the foregoing left top corner segment G is set (S32). In this example, the specific pattern 22 of the right top corner of the left top corner segment G is set as a specific pattern 22 of the left top corner of a segment G adjoining on the right side. Then, the four specific patterns 22 located at positions corresponding to the vertices of the adjoining segment G are detected (S26), and a range I1 for capturing image information is changed to another I2 containing the four specific patterns 22 as shown in FIG. 47 (S27). Thereafter, as in the reading operation for the left top corner segment G, a reading operation is carried out for the segment G (S28, S29), and the read information is outputted (S30). This information is linked with the information that has already been read.

(5) In this way, while the range for capturing image information is changed to another containing the four adjoining specific patterns 22, one by one, from I1 to I2, further to I3, and so on as shown in FIG. 47, reading operation is done for each segment G from left to right of the first row. Upon completion of the first row, reading operation is carried out for each segment G again from left to right of the second row. Then, at a time point when all the segments G constituting the information recording area 23 have been completely read (S31), the reading process is ended.

In this case, since the reading is done in the units of segments G, the reading precision can be enhanced as compared with the case where information is read from the entire information recording area 23 and decoded. It is a further advantage that only a memory capacity corresponding to one segment G is required for image information to be stored in the decoding process. This is because, upon completion of the decoding for one segment G, the result is outputted so that the image memory is now required only to store (overwrite) image information on the next segment G. It can conversely be said that even with the image memory capacity constant, digital information recorded over a wide-range information recording area 23 can be read.

Figure 48:
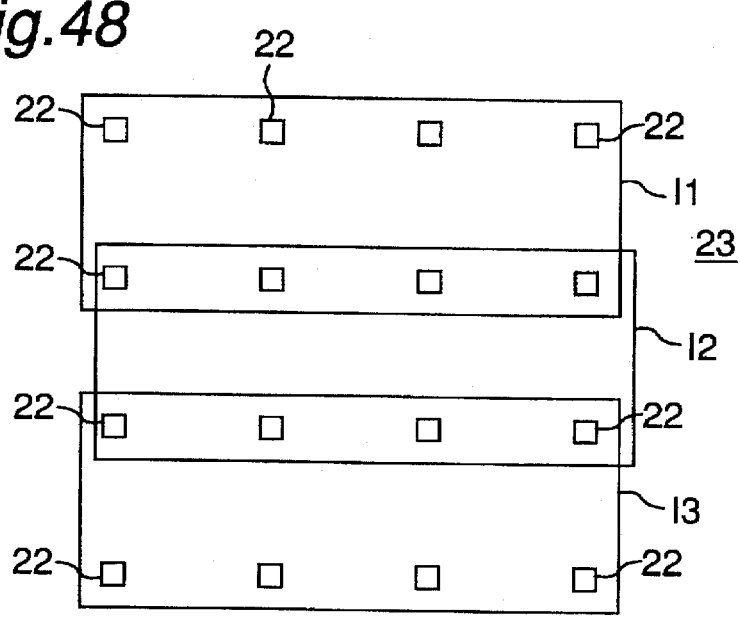
FIG. 48 is a view for explaining how to capture image information in the units of rows of segments.

In addition, the way of changing the range for capturing image information is not limited to the one shown in FIG. 47. For example, the way may be such one, as shown in FIG. 48, that image information I1 of the segments G corresponding to the first row is first captured at a time, then image information I2 corresponding to the second row, image information I3 corresponding to the third row, and so on are captured row by row. This technique may be applied when a line scanner is used as the reading device 92 (image sensor). With the line scanner used, no matter how long the information recording area 23 is longitudinally or transversely, the decoding can be achieved in the units of rows in which segments G are arrayed. However, since the ranges for capturing image information partly overlap each other, there is a need of storing image information upon the overlapping portion in an information decoding apparatus 91, or of turning back the information recording area 23 by using the reading device controller 98. This is intended to adjust the portion at which one piece of image information and its succeeding piece of image information overlap each other.

Also, when the recording surface and the reading means are moved relative to each other for the purpose of changing the range for capturing image information, it is not necessarily required to apply physical movement by using a motor, but the relative movement may also be achieved by an optical means of changing the range for capturing image information with the angle of mirror changed, or by a software-dependent means such as carrying out the decoding process while storing only image information from necessary ranges, one after another.

Actually, the precision of image information needed to find the left top corner of the information recording area 23 is not required to match the precision needed to read the information of the meshes within each segment G. For example, even if the image information is such coarse that one mesh corresponds to one dot, it is possible to find the left top corner of the information recording area 23. Rather, setting to such coarse image information gives an advantage that the entire information recording area 23 can be grasped so as to allow an easy finding of the left top corner of the information recording area 23.

Figure 49A:
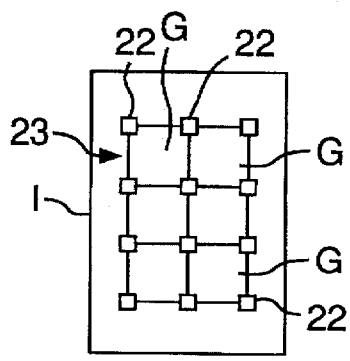
FIGS. 49A and 49B are views showing a precision of image inflation for finding the left top corner of the information recording area, and a precision of image information for reading information recorded in the individual meshes within the segment.
Figure 49B:
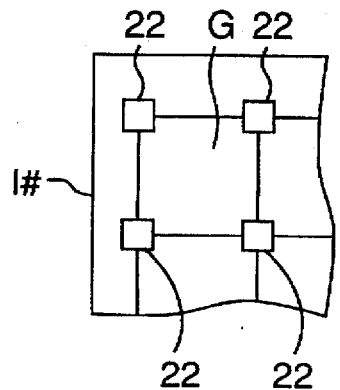
Figure 50:
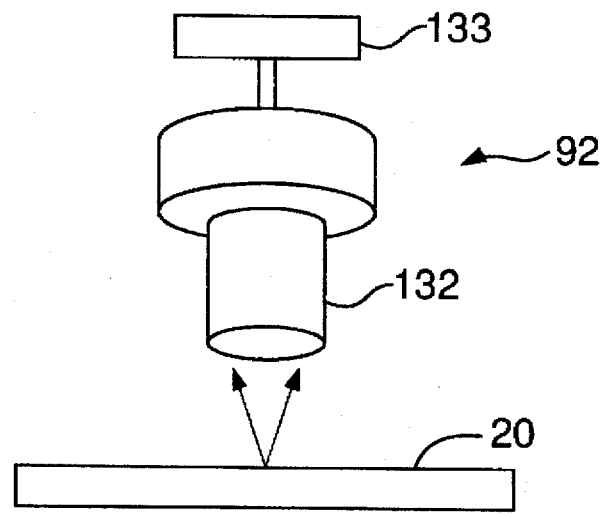
FIG. 50 is a view showing the appearance of the zoom-up device as an optical system.

Thus, as shown in FIG. 50, the reading device 92 is desirably equipped with a zoom-up device 132 which is variable in the scaling factor with which a two-dimensional pattern recorded on the recording surface 20 is converted into image information, as an optical system in addition to the image sensor 133. This arrangement makes it possible to change the precision of image information for finding the left top corner of the information recording area 23 as well as the precision of image information for reading the information of the meshes of the information recording area 23, as shown in FIGS. 49A and 49B. That is, for finding the left top corner of the information recording area 23, a range I containing the entire information recording area 23 is obtained as shown in FIG. 49A. As a result, the left top corner of the information recording area 23 can be easily found by grasping the entire information recording area 23. On the other hand, when the information of the meshes of the information recording area 23 is read by finding four specific patterns 22 located at the vertices of the segment G, a range I#with the left top corner of the information recording area 23 magnified is obtained as shown in FIG. 49B. Thus, the segment G is determined by obtaining the information on the size of the meshes from the specific patterns 22, whereby the information of the meshes within the segment G can be read.

In addition, in the process of finding the four specific patterns 22 located at the vertices of the segment G, the scaling factor of the zoom-up device 132 may be set separately. The reason is that when specific patterns are searched for by a method as shown in FIG. 17, it is required only to verify the features of specific patterns, so that the specific patterns can be detected without as high a precision as that for evaluating the values of marks of the individual meshes. Thus, the four specific patterns 22 located at the vertices of the segment G can be easily found.

Further, it is a commonly adopted method to examine the captured image information with the precision varied in a software-dependent manner. For example, making a search by setting scan lines shown in FIG. 34 every other line corresponds to lowering the precision of image information in the process of finding the four corners of the information recording area 23 in a software-dependent manner. Reducing the number of scan lines like this allows a reduction in processing time for finding the four corners.

(13) Marginal portions generated when segments are combined together

When the specific patterns 22 are protruding out of the sides of the information recording area 23 as shown in FIG. 42, marginal portions (hatched in the figure) 27 each defined by a side of the information recording area 23 and opposing sides of two adjacent protruding specific patterns 22 are generated along the four sides of the information recording area 23. It matters how to utilize these marginal portions 27.

It is described below that the marginal portions 27 are generated also when the information recording area 23 is embodied as follows.

Figure 51:
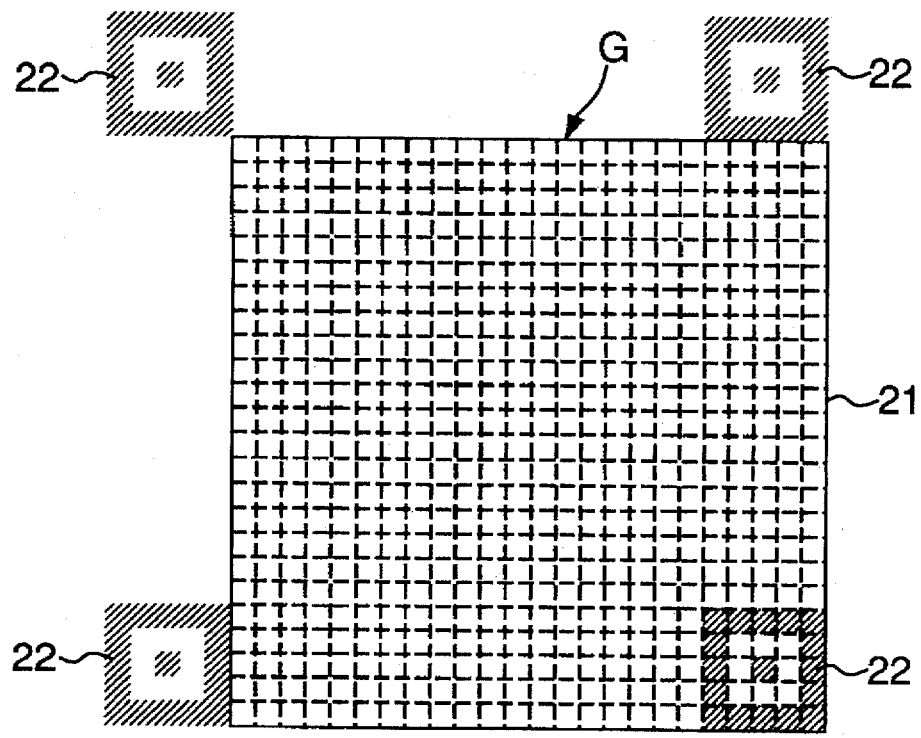
FIG. 51 is a view showing an example in which segments are set by arranging a specific pattern at the right bottom corner of a rectangular block.
Figure 52:
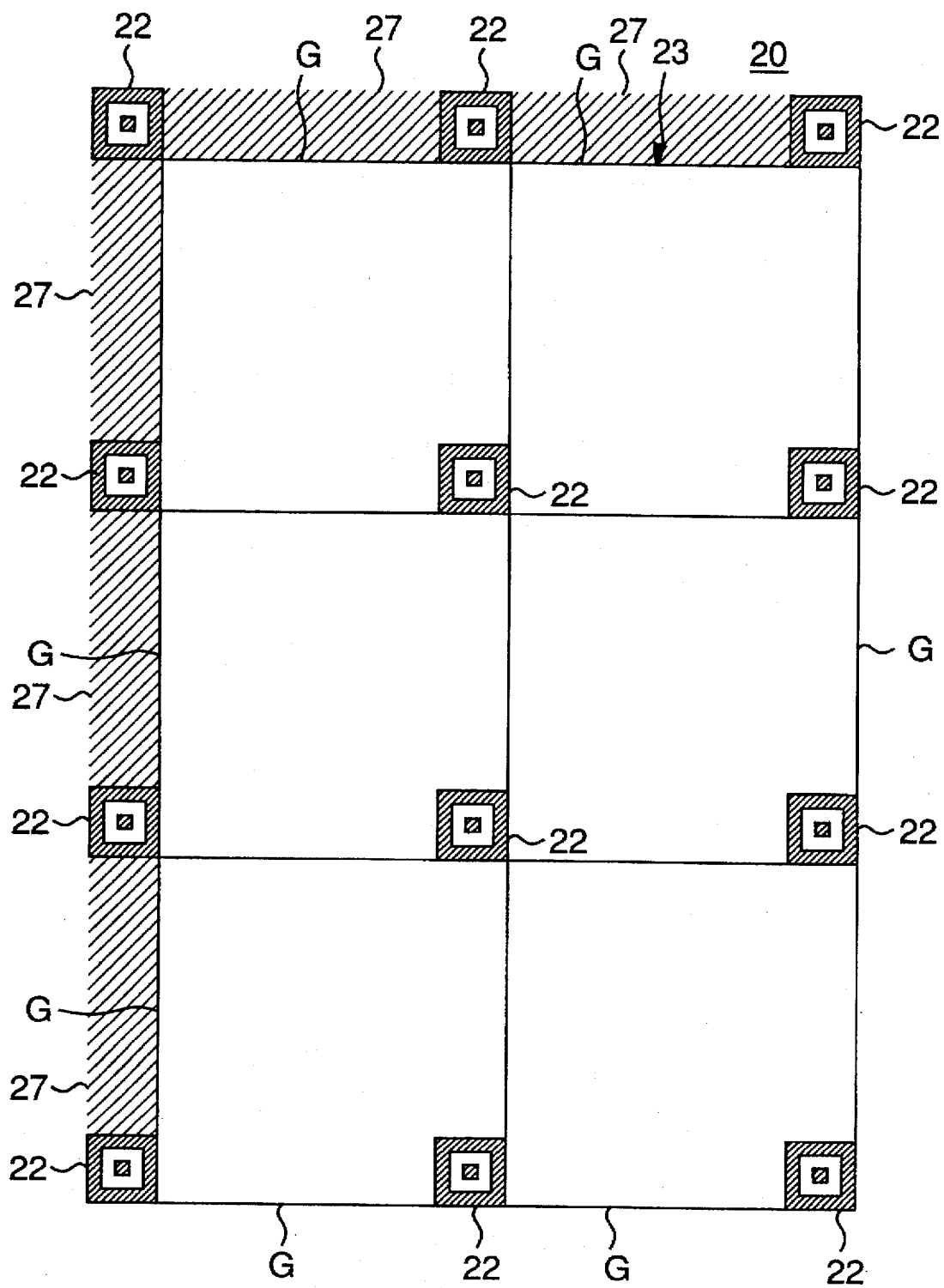
FIG. 52 is view showing an example in which the segments of FIG. 51 are arrayed with marginal portions generated along the top and left sides.

For example, the segment G is set by placing a specific pattern 22 at the right bottom corner of the rectangular block 21 in such a way that the specific pattern 22 is inscribed without being divided as shown in FIG. 51, and the information recording area 23 is made up by arraying the segments G into a rectangular shape as shown FIG. 52. Then, specific patterns 22 are added in outer contact with and along the top and left sides of the information recording area 23 so that the specific patterns 22 are placed at the four corners of the segments G present along the top and left sides of the information recording area 23. This is intended for convenience of reading operations. In addition, the segment G in FIG. 51 is shown together with the added specific patterns 22. In such a case, marginal portions 27 are generated along the top and left sides of the information recording area 23.

Figure 53:
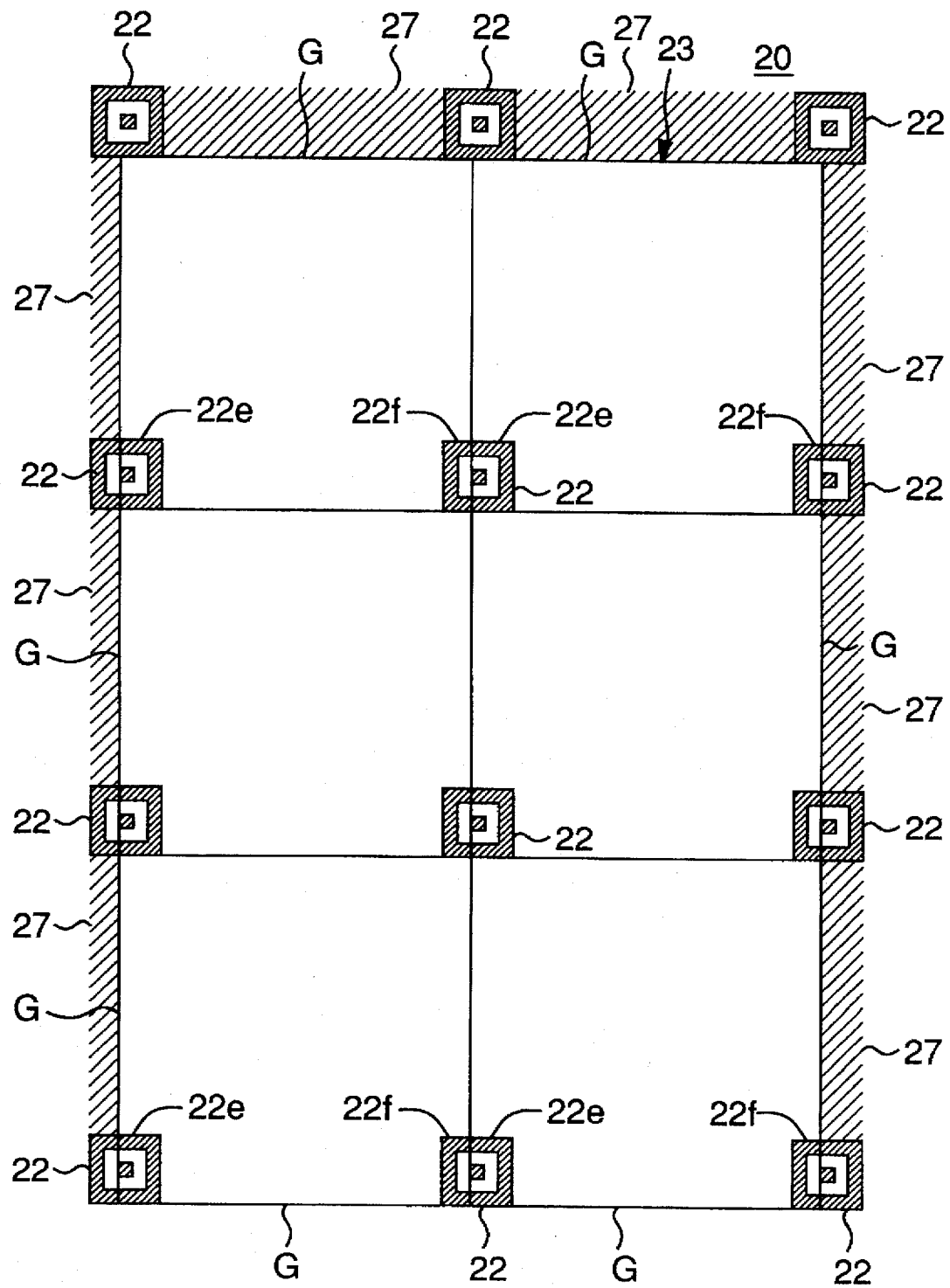
FIG. 53 is a view showing an information recording area in which different segments are arrayed with marginal portions generated along the top, left, and right

Also, as shown in FIG. 53, the specific patterns 22 are divided into two and, as divisional patterns 22e, 22f, placed at the left bottom corner and right bottom corner of the rectangular block 21, whereby the segments G are set. These segments G are arrayed into a rectangular shape to form an information recording area 23. Then, the specific patterns 22 are added in outer contact with and along the top side of the information recording area 23 so that the specific patterns 22 are placed at the four corners of the individual segments G present along the top side of the information recording area 23. As a result, the specific patterns 22 are placed at locations where they make contact with the vertices of the individual segments G. In such a case, marginal portions 27 are generated along the top, left, and right sides of the information recording area 23.

With the use of a method of calculating externally dividing points based on the positions of the specific patterns 22 (as has been described before), it is also possible to accommodate the data, which is to be recorded in the information recording area 23, into meshes of the marginal portions 27. However, since most of the data is recorded within the segments G, there arises a need of special processing for accommodating data into the marginal portions 27.

When data is not accommodated into the marginal portions 27 conversely, the marginal portions 27 may lend themselves to other utilities. Next, it is described how the marginal portions 27 can be utilized.

(1) Marginal portions are left as silent regions.

The silent regions refer to regions composed only of white meshes (black meshes in some cases).

The advantage of setting silent regions in the marginal portions 27 exists in that, in the process of searching for specific patterns 22 placed along the sides of the information recording area 23 (hereinafter, referred to as "peripheral specific patterns"), the peripheral specific patterns can be easily found.

Figure 54:
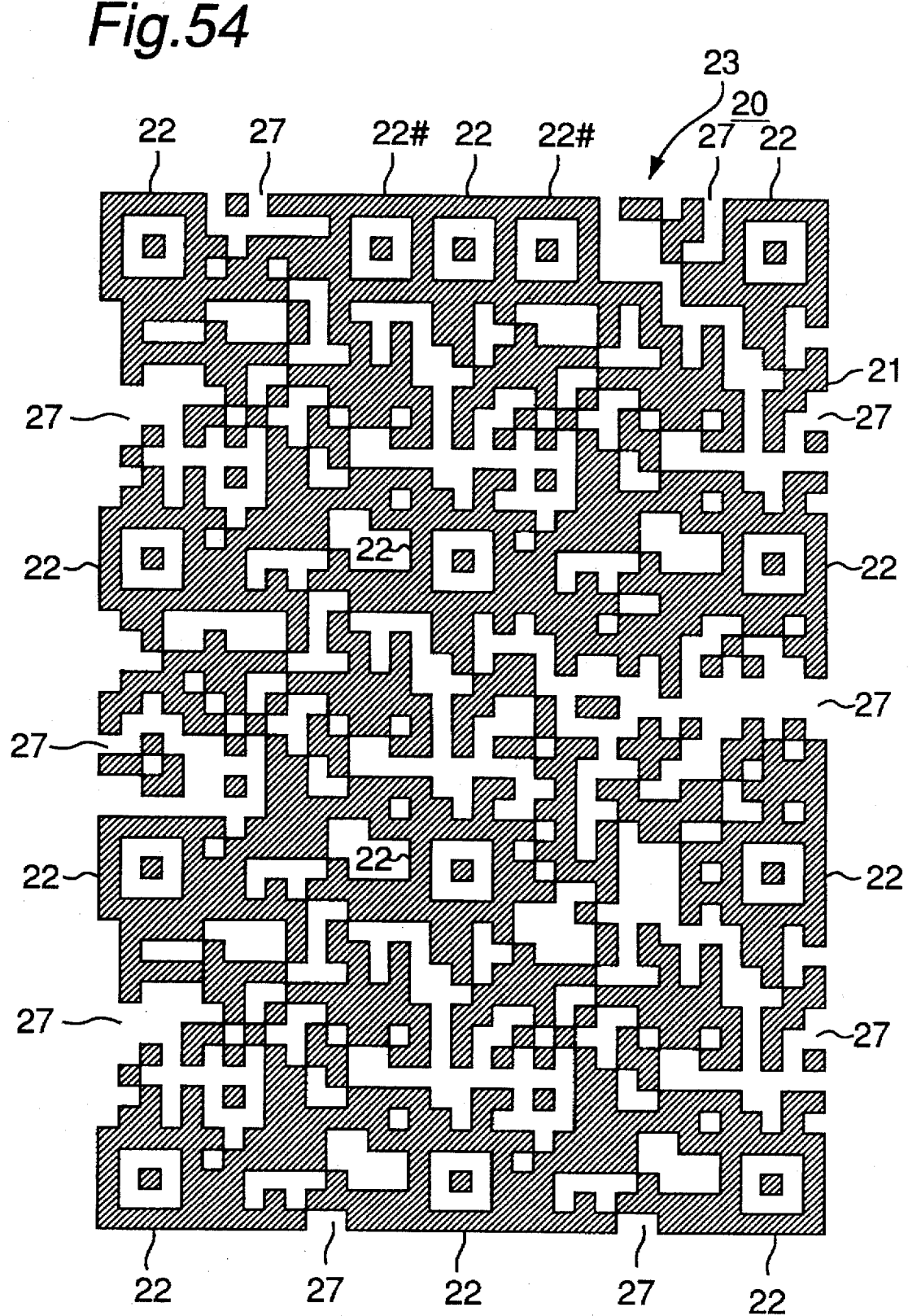
FIG. 54 is a view showing an example in which an identical pattern has appeared near the peripheral specific patterns in proximity to the center of the top side of the information recording area.

The risk that identical or similar patterns may appear in proximity to the specific patterns 22 has already been described with reference to FIG. 11. If data is accommodated, as shown in FIG. 54, into the marginal portions 27 which are embodied as shown in FIG. 42 (where the marginal portions 27 are generated along the four sides of the information recording area 23), there are some cases where identical or similar patterns 22# may appear in proximity to the peripheral specific patterns 22, as seen around the top center of the information recording area 23. For this reason, there is a possibility that these patterns 22# may be mis-recognized as the original peripheral specific patterns 22 in reading operations. Just as described above on the reading method, the search for peripheral specific patterns 22 is made prior to the search for the specific patterns 22 located inside the information recording area 23, so that such mis-recognition would produce a significant effect.

Figure 55:
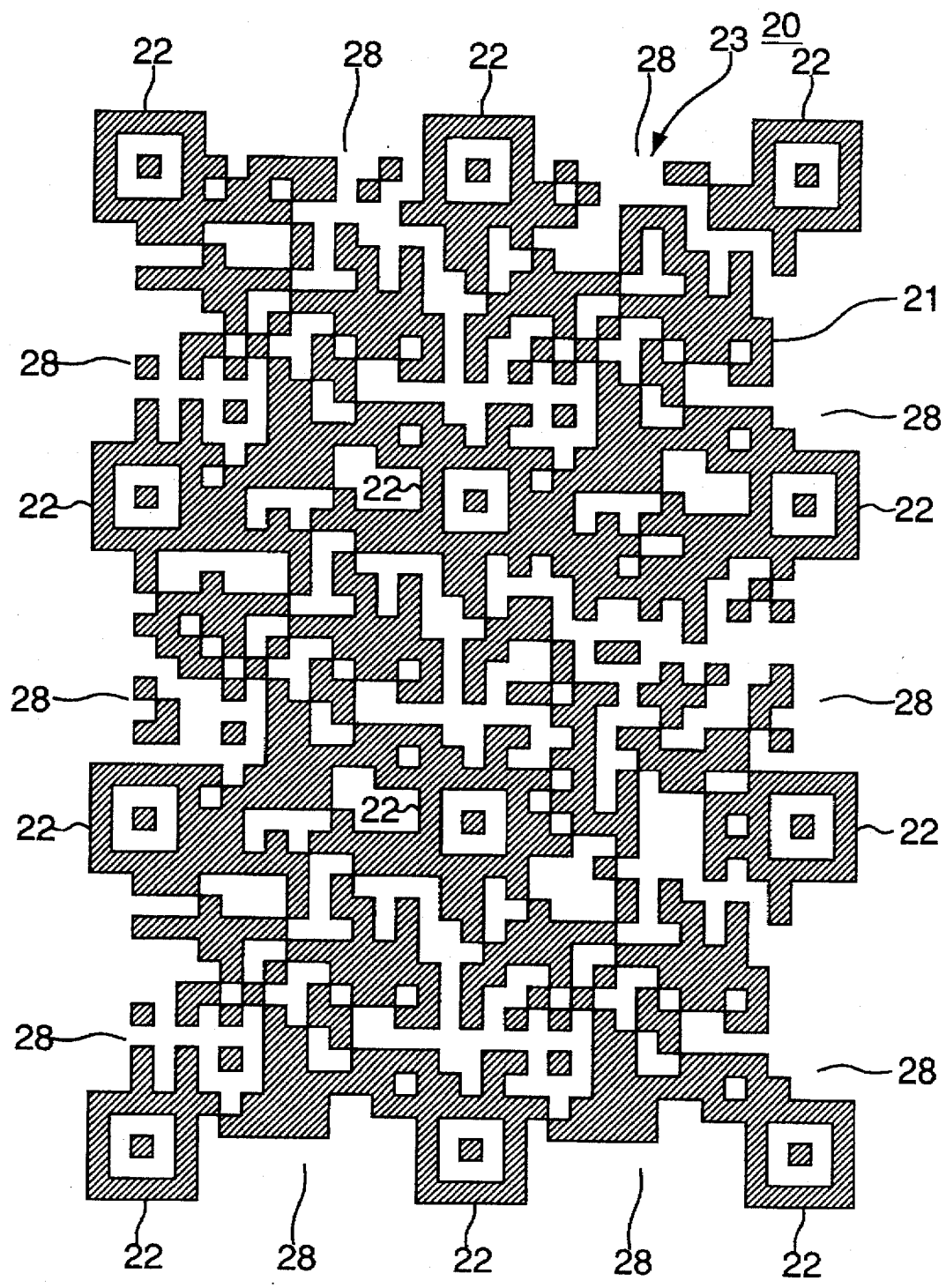
FIG. 55 is a view showing an example in which marginal portions generated along the four sides of the information recording area of FIG. 42 are assumed as silent regions.
Figure 56:
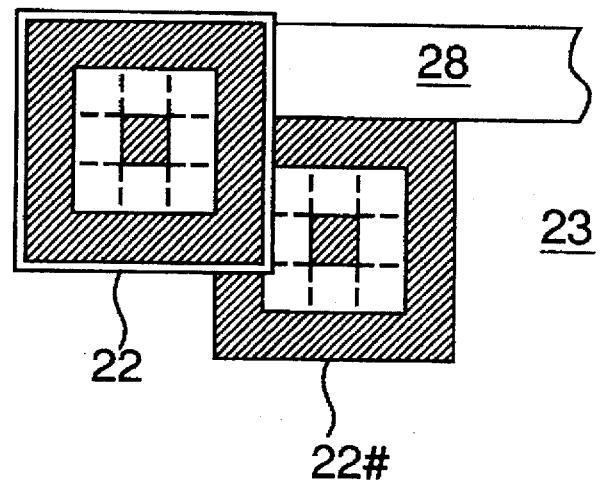
FIG. 56 is a view showing an example in which an identical pattern has appeared near the peripheral specific patterns in the center of the top side of the information recording area as shown in FIG. 42.

In contrast to this, if silent regions 28 are provided, as shown in FIG. 55, to the marginal portions 27 which are embodied as shown in FIG. 42 (where the marginal portions 27 are generated along the four sides of the information recording area 23), then the peripheral specific patterns 22 can be easily found at each side of the information recording area 23. That is, as shown in FIG. 56, even if an identical pattern 22# has appeared in most proximity to a peripheral specific pattern 22 along a side of the information recording area 23, the identical pattern could appear only at a location where they are overlapped by an extent of three meshes obliquely below, so that the pattern 22# is less likely to be mis-recognized as a peripheral specific pattern 22. Accordingly, a search for peripheral specific patterns 22 can be easily achieved.

Figure 57:
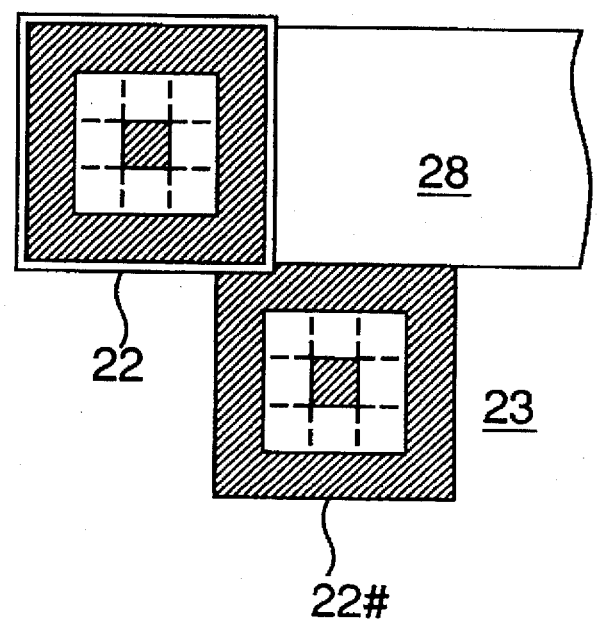
FIG. 57 is a view showing an example in which an identical paten has appeared near the peripheral specific patterns in the center of the top side of the information recording area as shown in FIG. 52.
Figure 58:
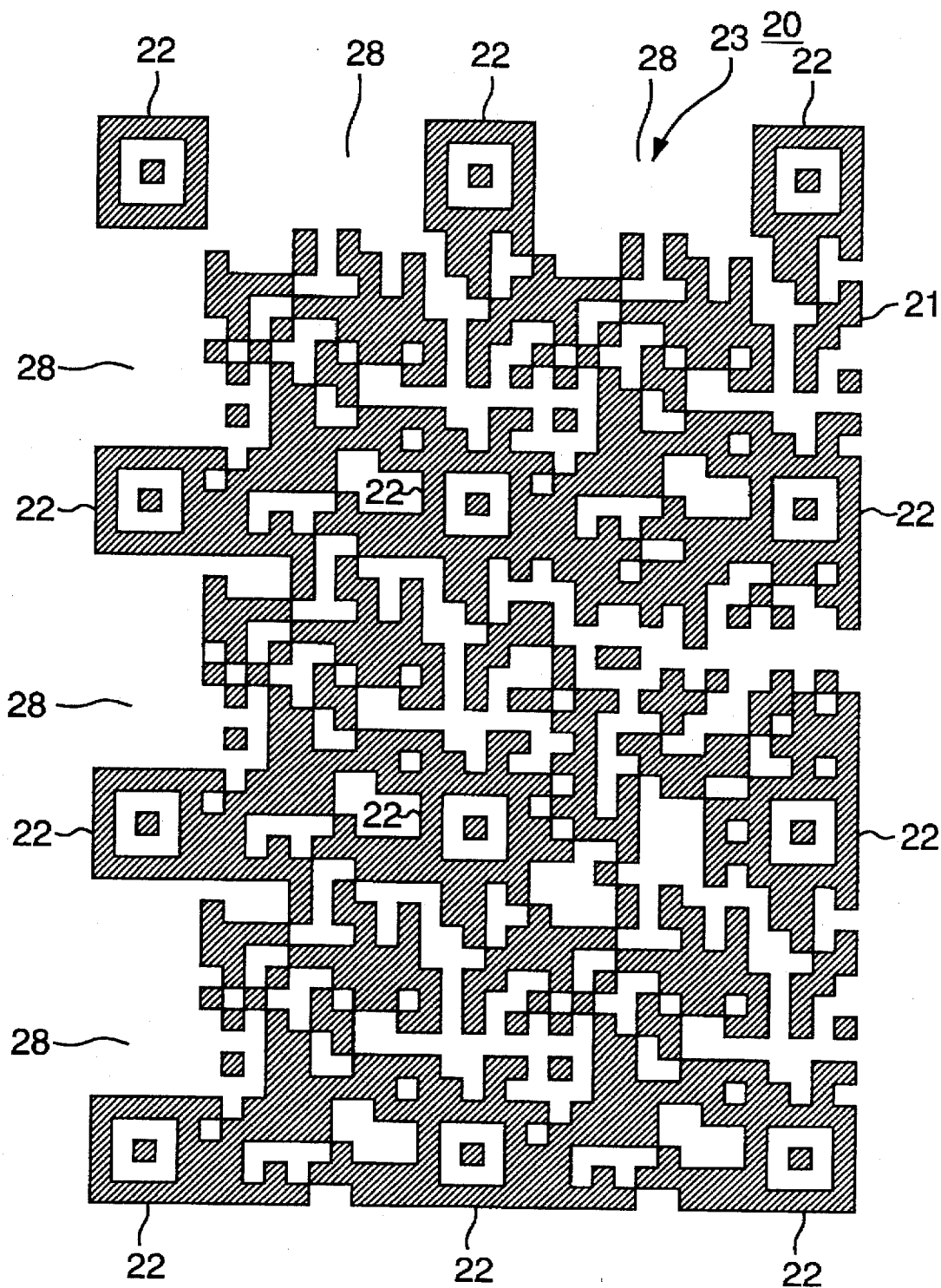
FIG. 58 is a view showing an example in which marginal portions generated along the top and left sides of the information recording area as shown in FIG. 52 are assumed as silent regions.

Further, when silent regions 28 are set, as shown in FIG. 58, to the marginal portions 27 which are embodied as shown in FIG. 52 (where the marginal portions 27 are generated intensively to the top and left sides of the information recording area 23), the peripheral specific patterns 22 can be found more easily than in FIG. 55, with respect to the top and left sides of the information recording area 23. The reason is that even if an identical pattern 22# has appeared in most proximity to a peripheral specific pattern 22 along a side of the information recording area 23 as shown in FIG. 57, the identical pattern could appear only at a location where meshes will not overlap obliquely below. There is neither a possibility that a pattern identical to the peripheral specific pattern 22 may be arrayed along the side as shown in FIG. 11, nor a possibility that a pattern 22# identical or similar to the peripheral specific pattern 22 may appear at the location shown in FIG. 56. Therefore, as far as the top and left sides of the information recording area 23 are concerned, the peripheral specific patterns 22 can be searched for even more easily than when silent regions 28 are provided along the four sides of the information recording area 23 (FIG. 55). However, as in the case where data is accommodated in the marginal portions (FIG. 54), the problem of mis-recognition may occur at the bottom and right sides of the information recording area 23.

It cannot be determined in principle which is more advantageous, the method of setting the silent regions 28 evenly to the top and bottom, right and left sides of the information recording area 23 as shown in FIG. 55, or the method of setting the silent regions 28 intensively only to the top and left (or bottom and right) sides of the information recording area 23 as shown in FIG. 58. This should be evaluated from the standpoint of the whole search method.

(2) Clocking information is contained.

Clocking information is set as a clocking pattern with whites and blacks alternately added with respect to a direction along each side of the information recording area 23.

Figure 59:
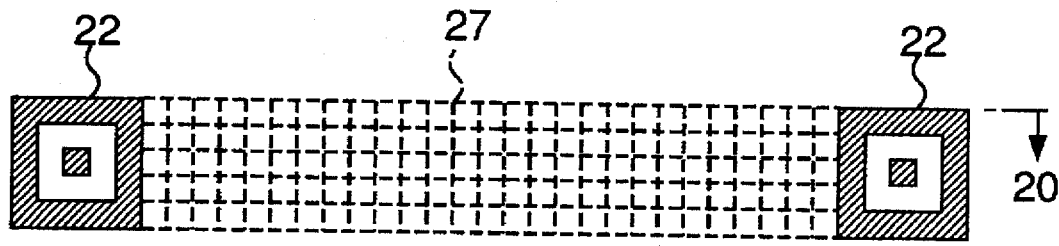
FIG. 59 is a view showing a marginal portion generated along the top side of the information recording area as shown in FIG. 52.
Figure 60A:
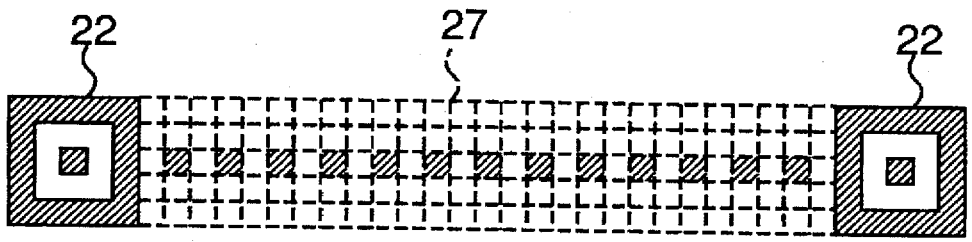
FIGS. 60A, 60B, 60C are views showing examples in which clocking patterns are provided in the marginal portion of FIG. 59.

For example, it is assumed, as shown in FIG. 59, that a marginal portion 27 is composed of transverse 27 meshes× longitudinal 5 meshes, with its bottom side in contact with the information recording area. Into this marginal portion 27, black meshes and white meshes are alternately arrayed in the middle row, whereby a clocking pattern is set, as shown in FIG. 60A.

A search method for the peripheral specific patterns 22 has already been described in which, based on a known peripheral specific pattern 22, the next peripheral specific pattern 22 is predicted to appear at a location leading to a certain number of meshes. When this search method is adopted, containing clocking information in the marginal portion 27 makes it easy to search for the peripheral specific patterns 22. That is, even when predicting the position where the next specific pattern 22 would appear directly based on a known specific pattern 22 would result in an error, searching for the next peripheral specific pattern 22 with any errors corrected by tracing the clocking pattern makes it possible to find the next specific pattern 22 correctly.

It has already been described that when the information recording area 23 contains large capacity data, a reading process using the specific patterns 22 is less susceptible to distortion than a reading process using clocking information around the information recording area 23. However, for reading around peripheral portions of the information recording area 23, the way using clocking information is more advantageous. Therefore, a higher-precision reading can be achieved by using the specific patterns 22 and the clocking information in combination.

Figure 60B:
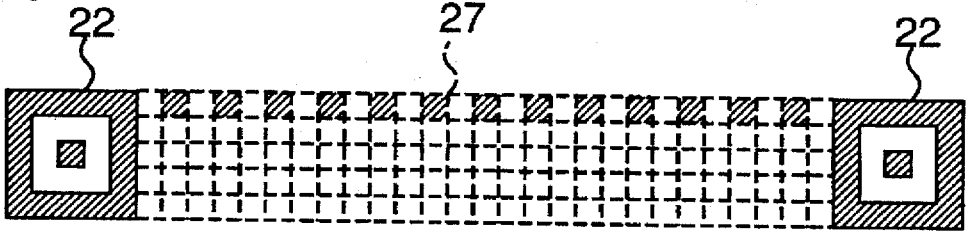
Figure 60C:
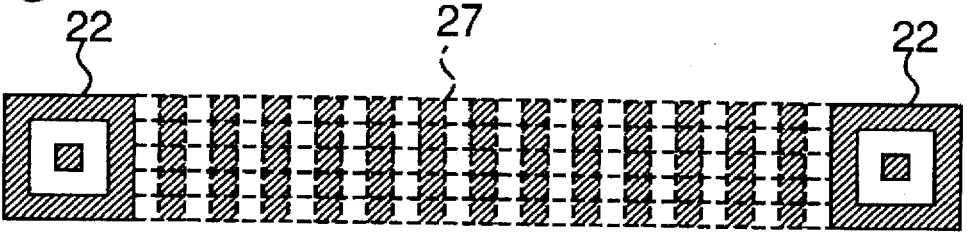

In addition, as shown in FIG. 60B, the clocking pattern may be located along an edge of the marginal portion 27, other than at the middle row of the marginal portion 27. Also, the size and shape of the clocking pattern are not limited to any method taking one mesh as the unit, but may be given by a method taking a plurality of meshes as the unit. For example, as shown in FIG. 60C, the clocking pattern may be made up from bars which are formed from a plurality of meshes adjoining one another in a direction perpendicular to the side of the information recording area 23.

(3) Frame information is contained.

Figure 62:
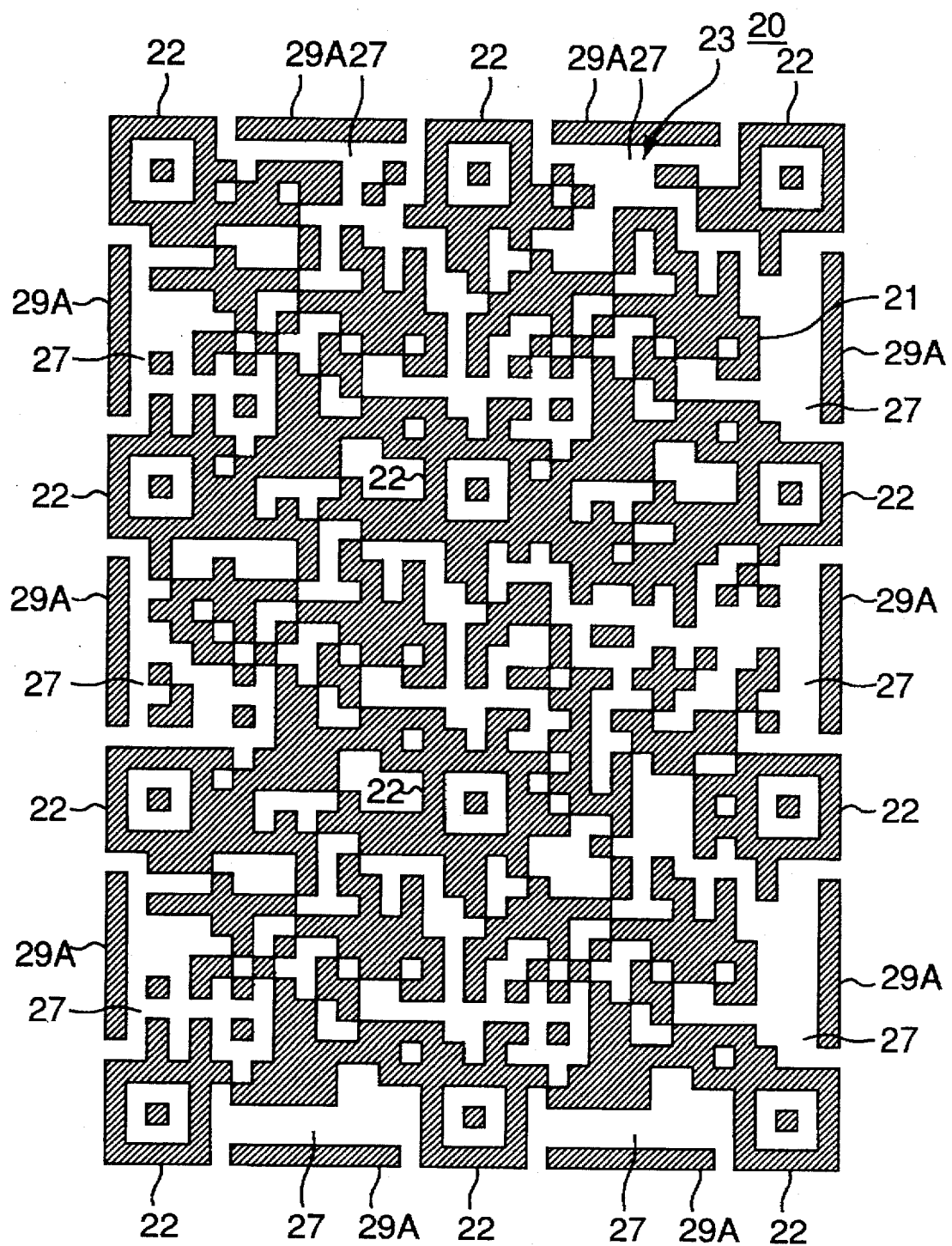
FIG. 62 is a view showing an example in which a frame pattern is set in the marginal portions generated along the four sides of the information recording area as shown in FIG. 55, by an information recording method which is an embodiment of the present invention.

As shown in FIG. 62, frame information is set as a frame pattern 29A which extends along an extension line (not shown) of the outermost side of the peripheral specific patterns 22 protruding outward of each side of the information recording area 23. The frame pattern 29A in this example is formed into a rod shape made up of adjoining black meshes, and placed with a clearance of one mesh size with respect to opposing sides of its adjacent peripheral specific patterns 22.

Figure 61:
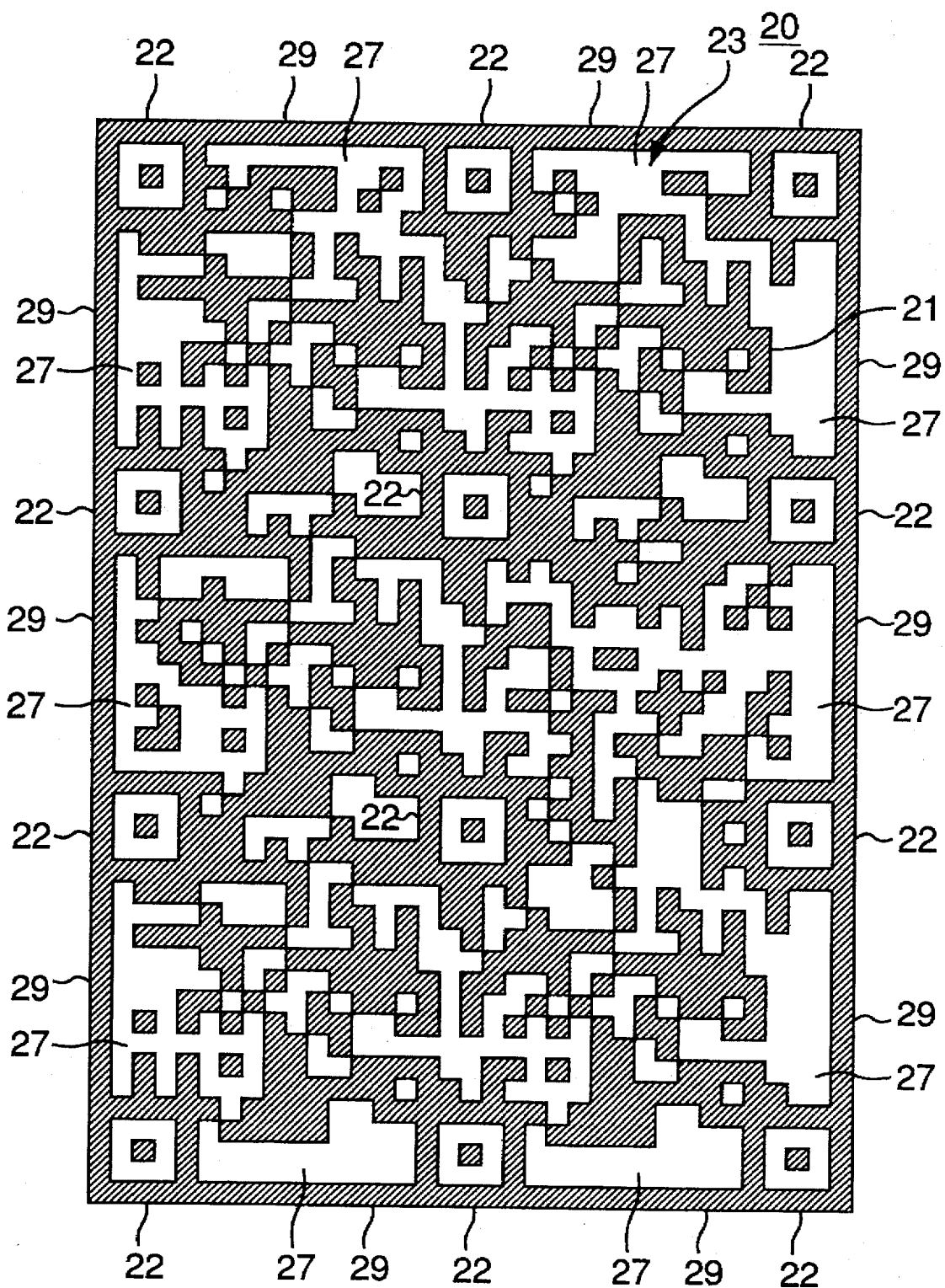
FIG. 61 is a view showing an example in which a frame pattern connecting to the peripheral specific patterns is set in the marginal portions generated along the four sides of the information recording area as shown in FIG. 55.

In this case, the range of the information recording area 23 in the recording surface can be easily detected in reading operations. Further, since the frame patterns 29A are arranged with the clearance of one mesh size with respect to the opposing sides of the peripheral specific patterns 22, the search for the peripheral specific patterns 22 will never be obstructed. That is, when a search is made along a side of the information recording area 23, a switch between black and white, each time it occurs, can be considered that a peripheral specific pattern 22, a one-mesh-size clearance, a frame pattern 29A, a one-mesh-size clearance, a peripheral specific pattern 22 have occurred one after another. Thus, the peripheral specific patterns 22 can be easily found. In contrast to this, such advantage would no longer be obtained if the frame patterns 29A are adjoined to the peripheral specific patterns 22 as shown in FIG. 61.

In addition, the clocking pattern shown in FIG. 60B is positioned along and in contact with the extension of the outermost side of the peripheral specific patterns 22, it is effective as a frame pattern.

Figure 63A:
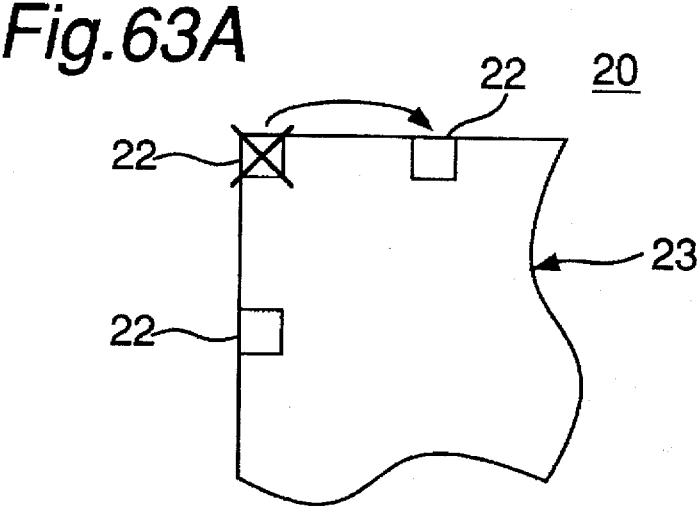
FIGS. 63A, 63B, 63C are views showing examples in which the specific pattern of the left top corner is tried to be found and mis-recognized, where
Figure 63B:
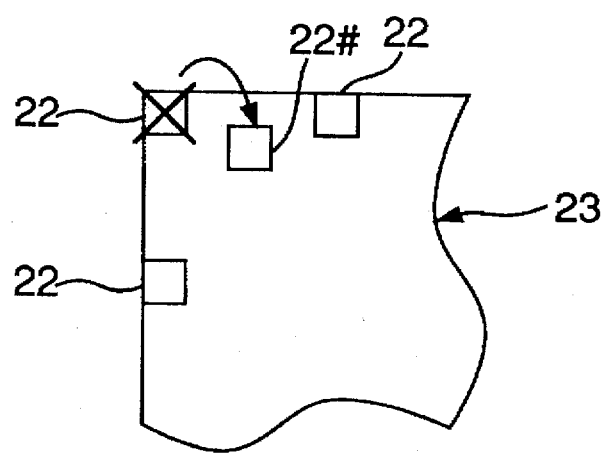
Figure 63C:
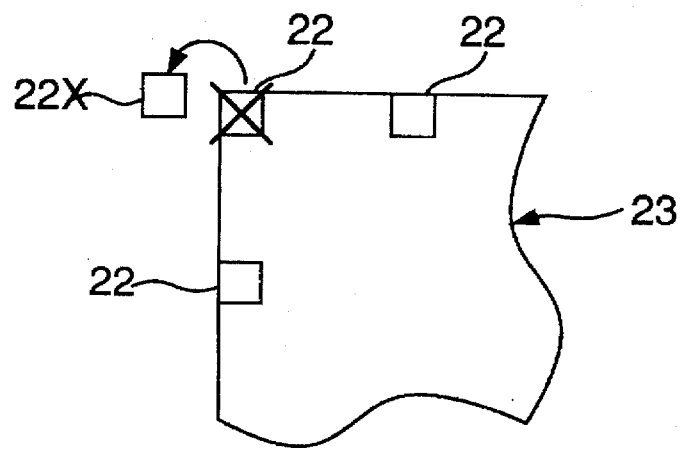

(4) Information representing whether or not it is a corner specific pattern or a corner segment is contained:

In searching for specific patterns 22 placed at the four corners of the information recording area 23, there are possibilities of mis-recognizing a different peripheral specific pattern 22 as a corner specific pattern 22 as shown in FIG. 63B, mis-recognizing a similar pattern 22# as a corner specific pattern 22 as shown in FIG. 63B, or mis-recognizing a dirt 22X or the like outside the information recording area 23 as a corner specific pattern 22 as shown in FIG. 63C. To prevent such mis-recognition, it is an effective measure to record, in the marginal portions, information that allows the discrimination between the four-corner specific patterns 22 and the other peripheral specific patterns 22, or information that allows the discrimination between the four-corner segments and the other segments.

Figure 64:
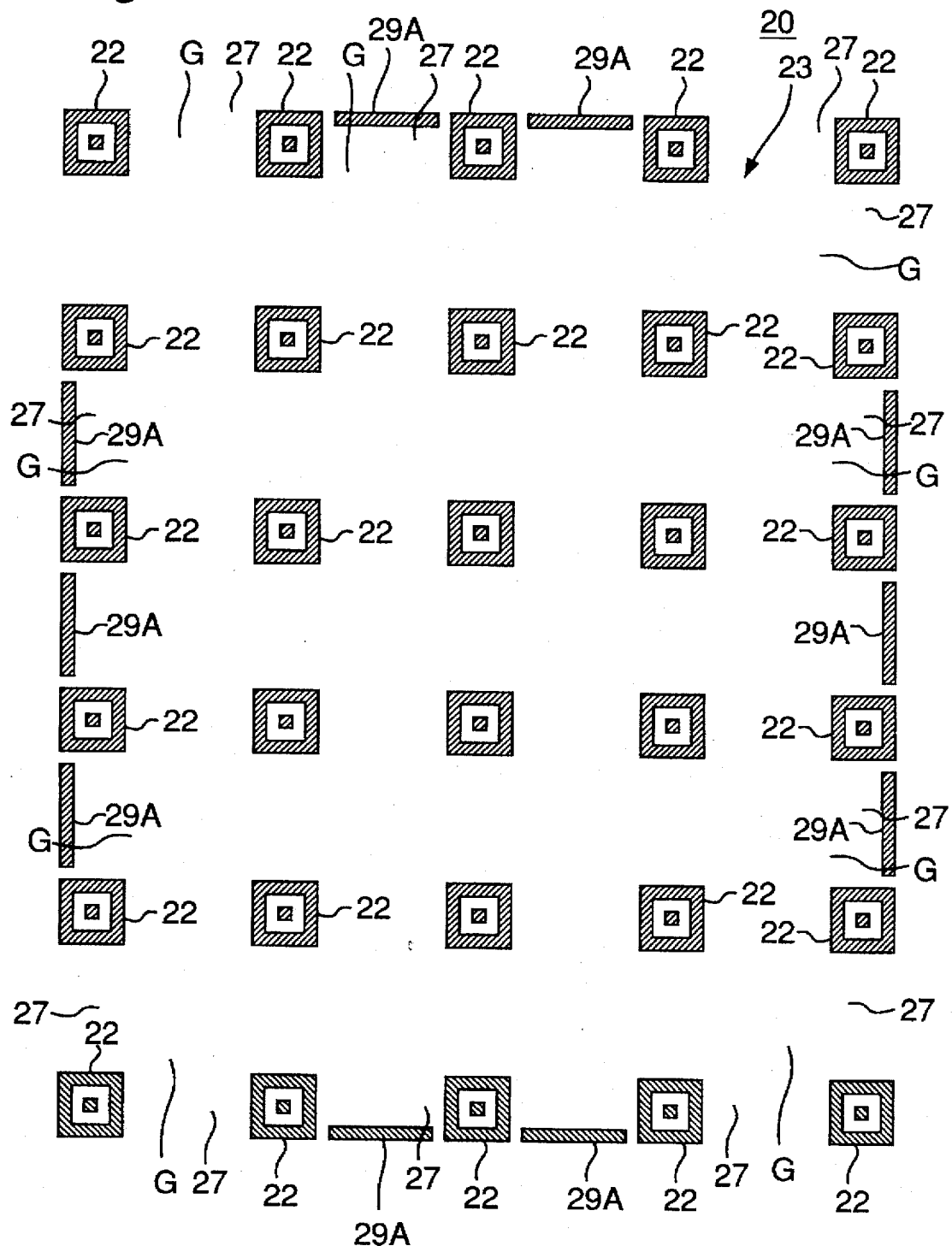
FIG. 64 is a view showing an example in which the presence or absence of frame patterns in the marginal portions is changed over between segments present at the four corners of the information recording area and the other segments.

A means for this purpose is, for example, a modification of the embodiment of FIG. 62, wherein the presence or absence of frame patterns 29A in the marginal portions 27 is switched between the four-corner segments G and the other segments G as shown in FIG. 64. With this means, it can be easily known, in reading operations, whether or not it is a corner segment G or a corner specific pattern 22. That is, whereas the method including steps of first finding four-corner specific patterns 22, and then searching for peripheral specific patterns 22 sandwiched by the four-corner specific patterns 22 has already been described, it is also possible to adopt another method including steps of first finding one of the four-corner specific patterns 22, and then searching for peripheral specific patterns 22 one by one while finding the other corner specific patterns 22. In such a case, discriminating the four-corner segments from the other segments makes it easily known that the four-corner specific patterns 22 have been reached. It is noted that original data recorded in the information recording area 23 is omitted in FIG. 64 for convenience.

Likewise, in the cases as shown in FIGS. 47 and 48 where the range for capturing image information is changed, it can be easily known that the range for information capture has reached the four-corner segments (FIG. 47) or the lowermost row (FIG. 48).

It is, of course, also possible to adopt a method other than the one using the frame pattern 29A as shown in FIG. 64. Only if the pattern of the marginal portion 27 can be clearly discriminated between the four-corner segments G and the other segments G, the information to be set to the marginal portions 27 may be any one.

(5) Index information is contained.

The index information refers to information that is convenient if known prior to actually reading data recorded in the information recording area, such as the number of segments (longitudinal×transverse numbers or total number), the size of digital data recorded in the information recording area, data modulation method, checksum, error correction method, or the type of applications for which data is usable. It is advantageous to record these types of information to the marginal portions 27.

The index information may be recorded by either a recording method of assigning one mesh to one bit as with the other information in the segment, or an utterly different method.

FIG. 65 shows an example in which index information is recorded in the marginal portions 27 by using the so-called bar code technique. The ITF (Interleaved Two of Five) coding method is adopted as the coding method. In the ITF, one numeral (decimal number) is represented by two thick bars (or spaces) and three thin bars (or spaces). The first-digit numeral is made up of only bars, and the second-digit numeral is made up of spaces to be engaged with the foregoing bars, whereby a two-digit decimal number is represented by five bars and five spaces.

Assuming that the size of one marginal portion 27 is 27 meshes×5 meshes, a case is considered where number "38", a two-digit decimal number, is encoded. FIG. 66 shows module arrangements for encoding the decimal numerals 0, ..., 9, where 1 corresponds to a thick bar and 0 corresponds to a thin bar. Using this table allows "38" to be expressed by a sequence of black bars, "thick/thick/thin/thin/thin" and a sequence of spaces, "thick/thin/thin/thick/thin" to be engaged with the black bars. If the thin bar corresponds to a one-mesh width and the thick bar corresponds to a three-mesh width, then one symbol can be expressed by an eighteen-mesh width, and adding a four-mesh wide start symbol and a five-mesh wide stop symbol allows a two-digit numeral (decimal number) to be expressed by a 27-mesh width. It is noted that the height of the bar is of a five-mesh width corresponding to the height of the marginal portion 27.

FIG. 67 shows an example in which the bar-code recorded data of FIG. 66 is inverted between white and black and inserted into the marginal portion 27. When the specific patterns 22 are surrounded by black meshes, inverting the bar-code recorded data white to black or black to white as in this example allows an easier discrimination between the specific patterns 22 and the bar-code recorded data. In addition, whereas the start symbol and the stop symbol are information needed to restrict the recording area for actual bar codes, the recording area in this example is restricted by the marginal portion 27 being sandwiched by specific patterns 22 so that the start symbol and the stop symbol may be omitted.

In this way, a bar code as a one-dimensional code as well as a two-dimensional pattern made up by providing the meshes with marks can be recorded in the units of meshes on the same recording surface. Since both are in the units of meshes, the same print control method may be applied for printing operations. Also, for reading operations, both types of information can be decoded by using the same decoding apparatus. Further, if the bar code portion can be taken out of the captured image information, then the bar code portion can be decoded by one-dimensional scanning. Further, since the bars and spaces constituting the bar codes are made up from a plurality of meshes, larger redundancy is involved as compared with the pattern in which one mesh represents one value. Thus, in the recording surface, portions (bar code portions) where reading errors are unlikely to occur can be formed. Besides, as a matter of course, bar code techniques other than the ITF may also be adopted.

Figure 68A:
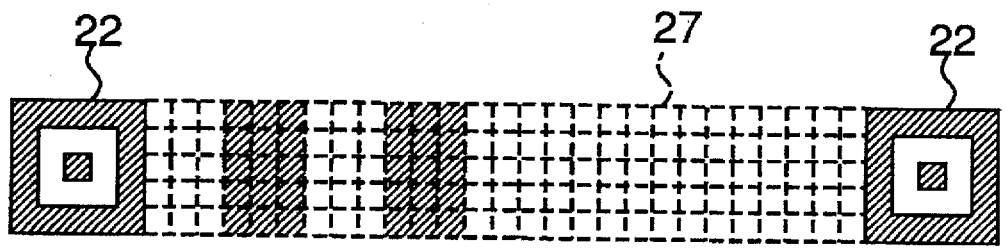
FIGS. 68A and 68B are views showing examples in which index informations are provided in the marginal portion of FIG. 59, where
Figure 68B:
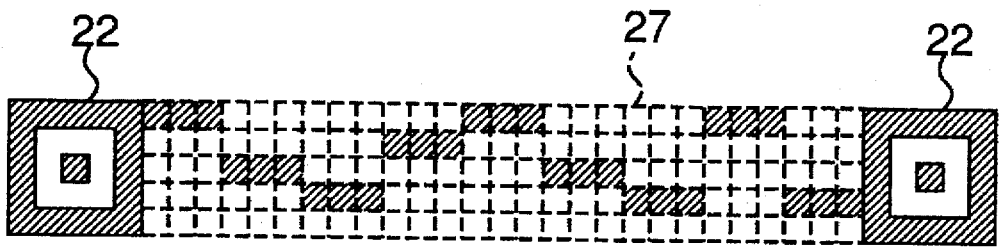

For representing index information by using a recording method other than the bar code technique, the method may be one by representing some information by the number, position, or thickness of bars as shown in FIG. 68A, or another by representing some information by the placement of a plurality of adjoining black meshes as shown in FIG. 68B.

An advantage of recording index information by a bar-code or other recording method different from that for other recorded information within the segment G exists in that only the index information can be read even when inside data cannot be read. For example, there may be a case where information indeed cannot be read in the units of meshes within the segment G, but the information can be read in the units of bars of the index information.

Figure 69:
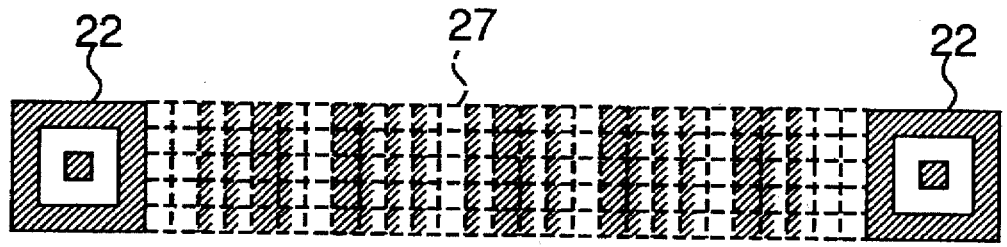
FIG. 69 is a view showing an example in which index information is written into the marginal portion of FIG. 59 without using meshes as the unit, where a thick bar is set 1.5 mesh wide, a thin bar is set 0.5 mesh wide, and a four-digit decimal number, '3852', is encoded with the ITF.

Whereas the marginal portion 27 has been utilized in the above-described examples only by a method of writing in the units of meshes, it is also possible to adopt a description without taking the meshes as the units, as shown in FIG. 69. However, when the description is made by taking the meshes as the units, reading operations can be performed by using the same method as in reading the recorded information within the segment, as an advantage.

Since the index information is of importance, it is also an important technique to record the information repeatedly at a plurality of places so that crush of any one place would not matter.

(6) Discriminating marks for top and bottom, right and left, and front and rear, or readable characters are contained.

When a recording carrier is inserted into the scanner using a line sensor, it is possible to incorporate into the marginal portion 27 top/bottom, right/left, and front/rear discriminating marks that allow persons to recognize the direction of the recording carrier, or top/bottom, right/left, and front/rear discriminating marks that allow the reading device to recognize the direction of an image captured by a CCD camera or the like.

When silent regions 28 are set by concentrating marginal portions to the top and left sides of the information recording area 23 as shown in FIG. 58, it is easy for both persons and machines to discriminate between top and bottom, right and left.

Figure 70A:
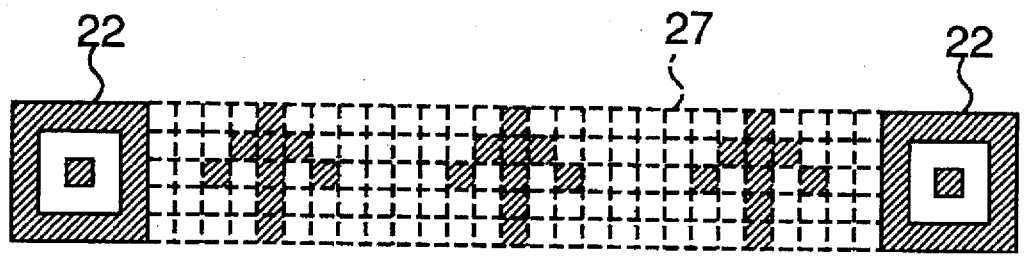
FIGS. 70A and 70B are views showing examples in which arrow patterns are recorded in a marginal portion, where
Figure 70B:
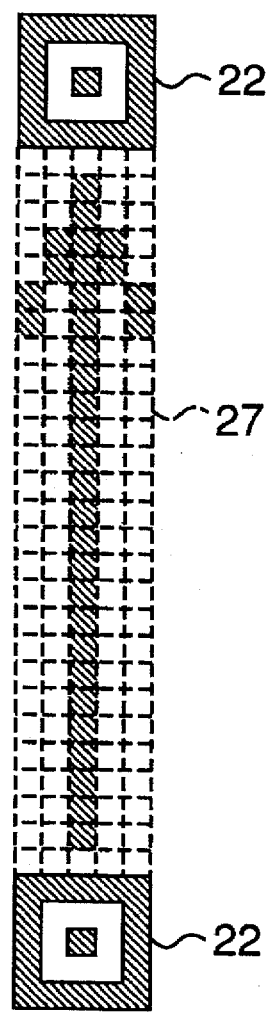
Figure 71A:
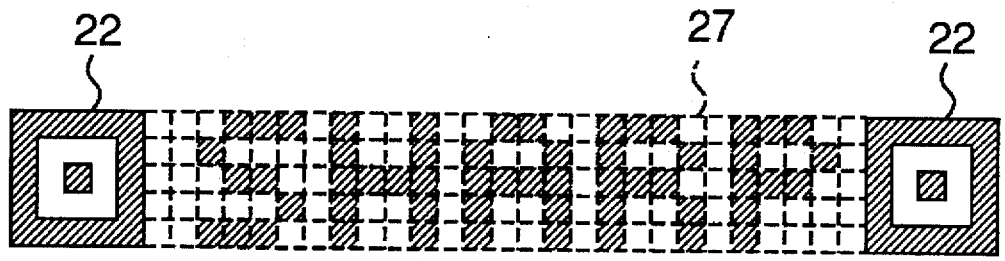
FIGS. 71A and 71B are views showing examples in which readable characters are presented in the marginal portion of FIG. 59, where
Figure 71B:
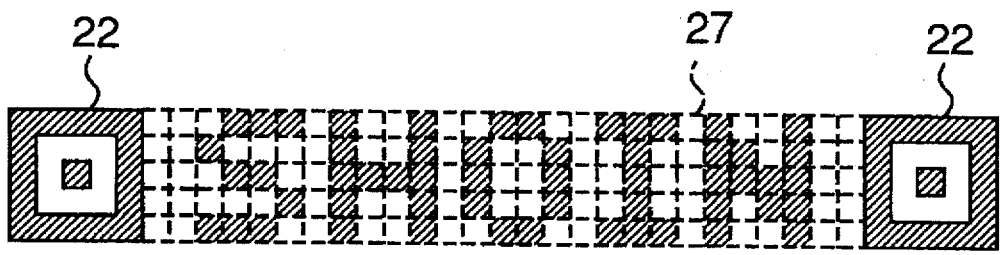

FIGS. 70A, 70B show examples in which arrow-shaped patterns are recorded into the marginal portion 27, so that the upward direction is recognized by persons. Also, FIG. 71A shows an example in which patterns representing characters are provided in the marginal portion 27 in the units of meshes, so that the top and bottom, right and left, and front and rear are recognized by persons. The use of characters or symbols makes it possible for persons to understand the contents of them (e.g., part of index information) as they are. FIG. 71B shows an example in which data can be decoded by a reading device incorporated in a word processor named "SHOIN".

In each of the above examples, a method of writing information into the marginal portion 27 in the units of meshes is adopted. Therefore, the contents of the information can be read by using the same method as used for reading the recorded information in the segments. The information of characters or the like that can be understood by persons as it is, is recognizable also for machines by using a method such as pattern matching.

Figure 72:
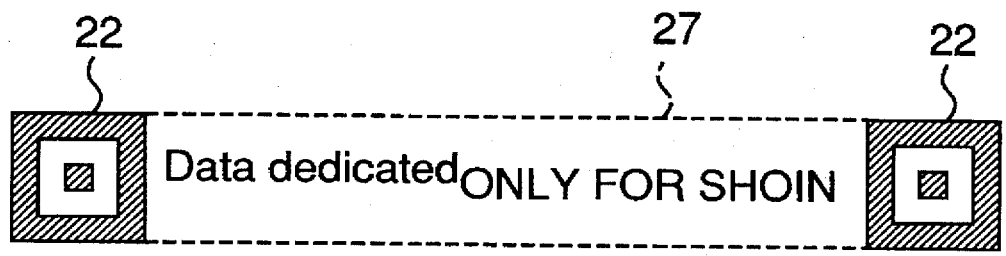
FIG. 72 is a view showing an example in which readable characters are presented in the marginal portion of FIG. 59 without using meshes as the unit.

In addition, as shown in FIG. 72, it is also permitted to enter top/bottom, right/left, front/rear discriminating marks or readable characters or the like without taking the meshes as the units. In such a case, although the reading device cannot decode it, information can be recorded to an amount large than when recorded in the units of meshes. Conversely, marks that cannot be read by persons but can be discriminated by the reading device for its top and bottom, right and left, and front and rear may also be recorded for secrecy prevention's sake.

(14) Utilizing segments located at particular positions

Figure 73A:
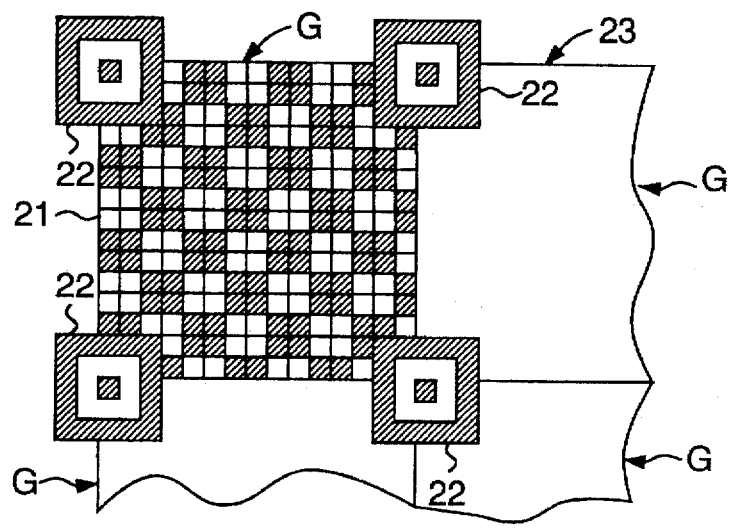
FIGS. 73A 73B and 73C are views showing examples in which information other than information originally intended to be recorded is set in the segment of the left top corner, where
Figure 73B:
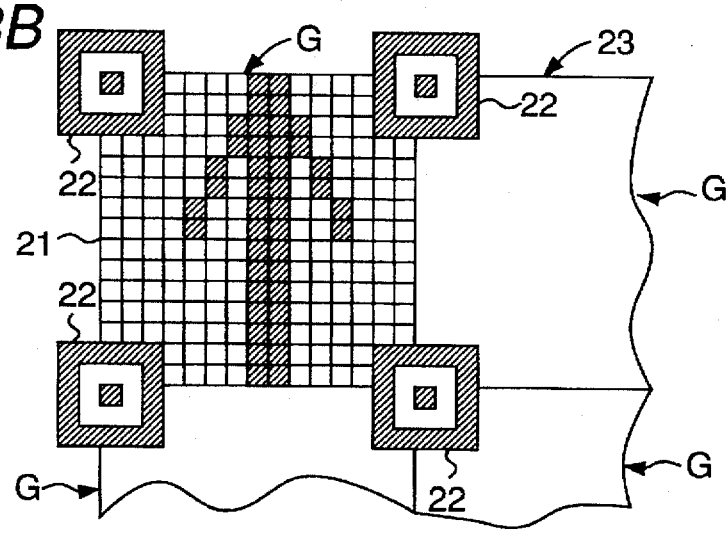
Figure 73C:
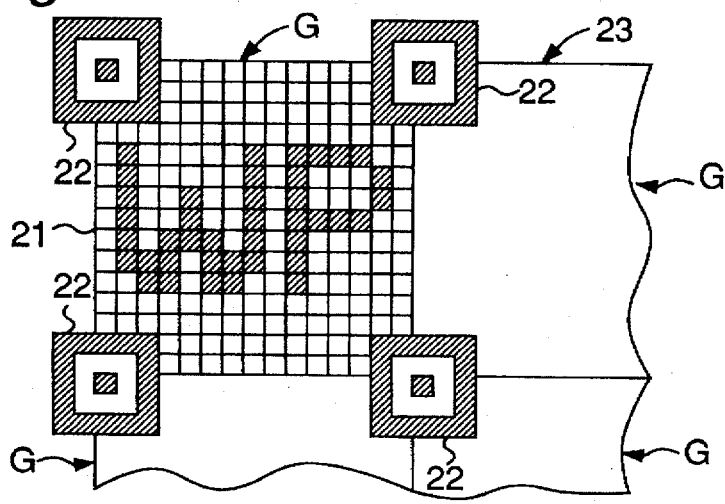
Figure 74:
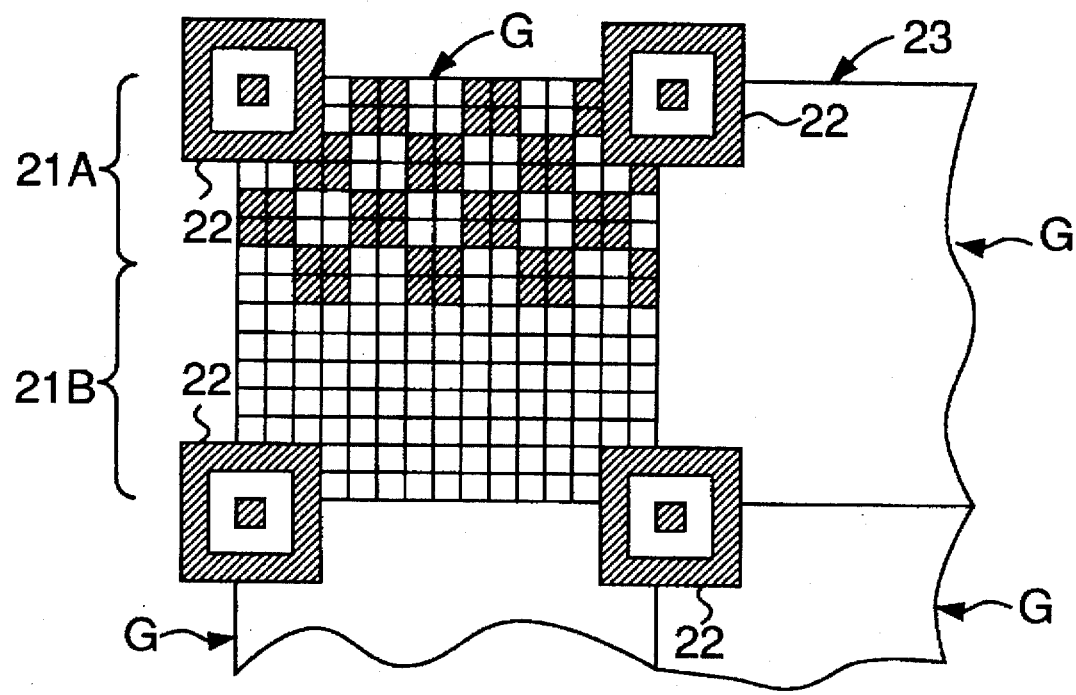
FIG. 74 is a view showing an example in which information other than information originally intended to be recorded is set in the upper half of the segment of the left top corner.

Likewise, information for the discrimination of top and bottom, right and left, and front and rear can be recorded to the segments G located at particular positions within the information recording area 23. For example, by using the segment G of the left top corner as a dummy segment, it is possible to enter a particular pattern as shown in FIG. 73A or to enter an arrow representing the upward direction as shown in FIG. 73B, or to enter readable characters as shown in FIG. 73C. In this case, during reading operation, data of the dummy segment is neglected. However, as shown in FIG. 74, it is permitted that the lower half of the dummy segment is used to enter effective data. Of course, a plurality of segments G may be used as such dummy segments. Also, because the segments G are arrayed longitudinal and transverse, segments for padding may be used for any data lack, in which case the segments for padding may be used as the dummy segments.

Also, index information as described above may be recorded in segments G located at particular positions within the information recording area 23.

Figure 75:
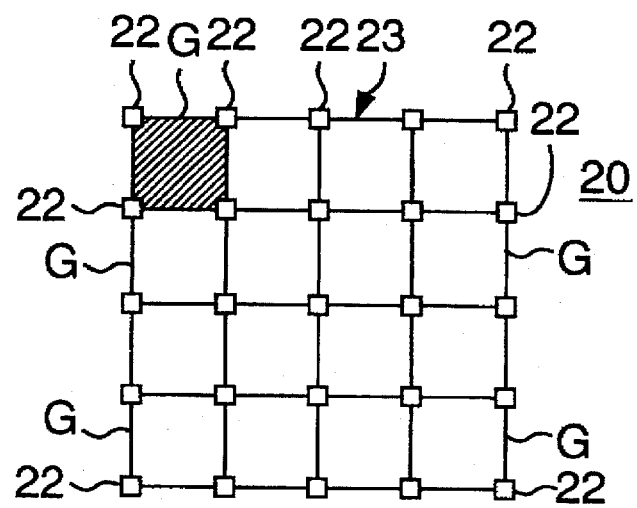
FIG. 75 is a view showing an example in which index information is recorded in a segment present at the left top corner of an information recording area.

In this case, one coding method and one reading algorithm can be shared between index information and general data. When the four-corner specific patterns 22 are first examined by the reading algorithm, it is advantageous to record index information to the segments G located at the four corners. The reason of this is that once the four-corner specific patterns 22 are found, the four-corner specific patterns 22 as well as the remaining three specific patterns 22 of the segments G to which the four-corner specific patterns 22 belong can be easily found without searching for all of the other specific patterns 22 arranged in the entire information recording area 23. Thus, the four-corner segments can be easily established, so that information of the four-corner segments G can be read prior to the information contained in the other segments. For example, as shown in FIG. 75, it is desirable to record index information to the segment G located at the left top corner of the information recording area 23.

Figure 76:
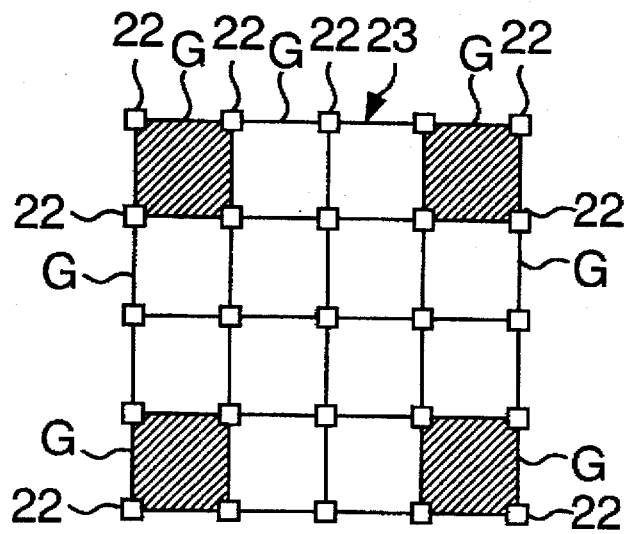
FIG. 76 is a view showing an example in which identical index information is recorded in the segments present at the four corners of an information recording area.
Figure 77:
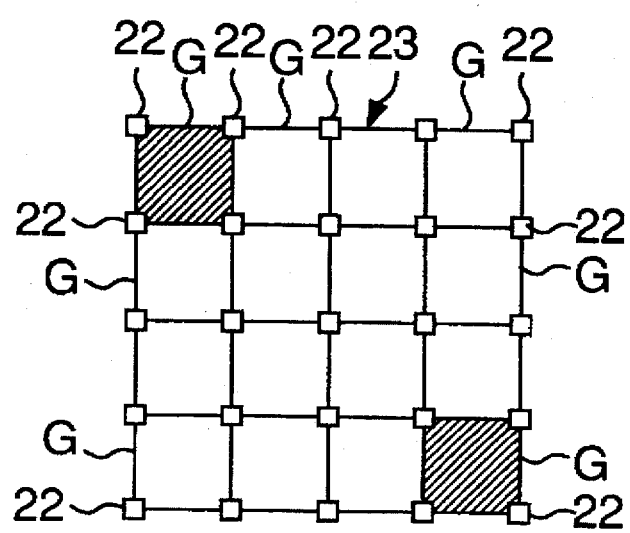
FIG. 77 is a view showing an example in which identical index information is recorded in the segments present at the left top corner and the right bottom corner of an information recording area.

Further, since the index information is of importance, identical index information may be recorded to a plurality of segments G with a view to increasing the redundancy. For example, when identical index information is recorded to the segments G located at the four corners of the information recording area 23 as shown in FIG. 76, even if reading the index information from one segment G out of the four-corner segments G has resulted in a fail, correct index information can be obtained from the index information of the other three segments. Furthermore, it is also permitted to increase or decrease the number of segments containing the index information according to the size of the information recording area 23. For example, when the size of the information recording area 23 is not so large, as shown in FIG. 77, index information may be recorded only to the segments G located at the left top corner and right bottom corner, other than recorded to all of the segments G located at the four corners. In this case, during reading operation, the segments G of the right top corner and left bottom corner out of the four-corner segments G are also regarded as containing index information, and are read like the segments G of the left top corner and right bottom corner. Then, out of the four-corner segments G, only the contents of the segments G of the left top corner and right bottom corner, in which information that can be decoded as index information has been contained, are regarded as index information, while the contents of the segments G of the right top corner and left bottom corner are regarded as data.

Figure 78A:
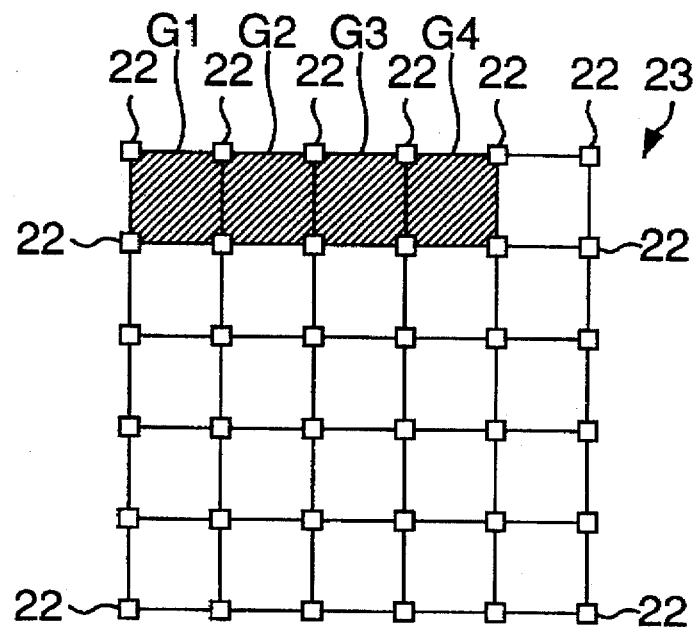
FIGS. 78A and 78B are views showing examples which index information is recorded over a plurality of segments of an information recording area.
Figure 78B:
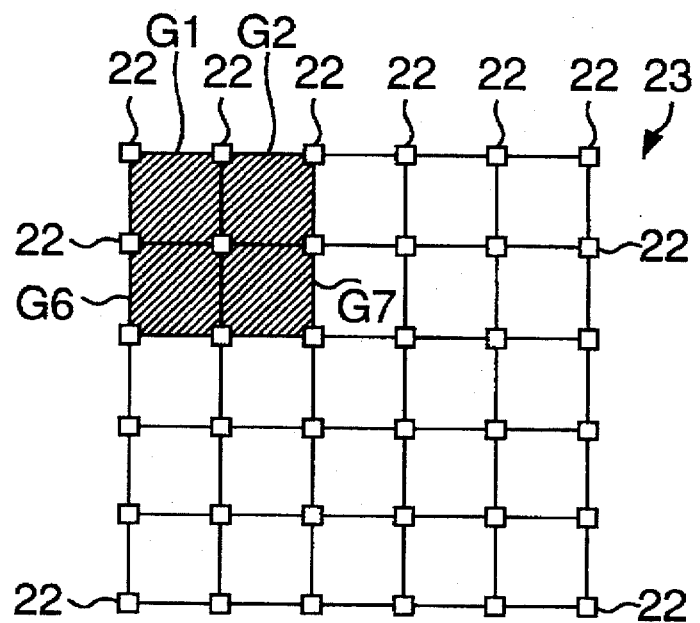

In the above examples, it has been arranged that index information is accommodated in a single segment G. Otherwise, it is also possible to accommodate different types of index information into a plurality of segments G so that the amount of index information is increased. For example, different types of index information may respectively be recorded in the four-corner segments G as shown in FIG. 76. As shown in FIG. 78A, index information may also be recorded over a segment G1 of the left top corner, and three segments G2, G3, and G4 adjoining on the right side. Further, as shown in FIG. 78B, index information may also be recorded over a segment G1 of the left top corner, and its adjoining three segments G2, G6, and G7.

(15) Examples in which index information is recorded at the four corners of a general-use information recording area The method in which index information is recorded at the four corners of the information recording area set in the recording surface is not limited to cases in which the information recording area is made up from the segments G, but may be widely applied to rectangular information recording areas. For example, it may be applied to a case, in which small blocks composed of a plurality of adjoining meshes are set, where a plurality of the small blocks are arrayed without clearances on a recording surface to make up an information recording area.

Figure 79:
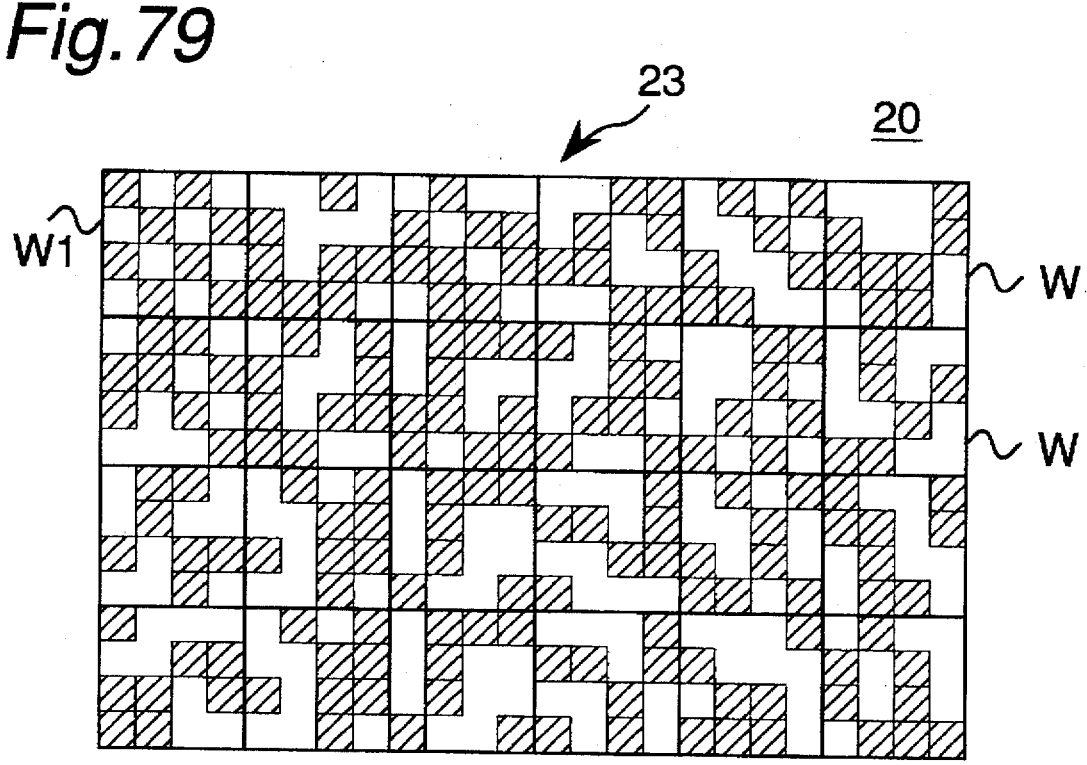
FIG. 79 is a view for explaining a digital information recording method in which an information recording area is segmented by virtual square small blocks, and designated pattern are allocated in the units of small blocks for implementation of recording.
Figure 80:
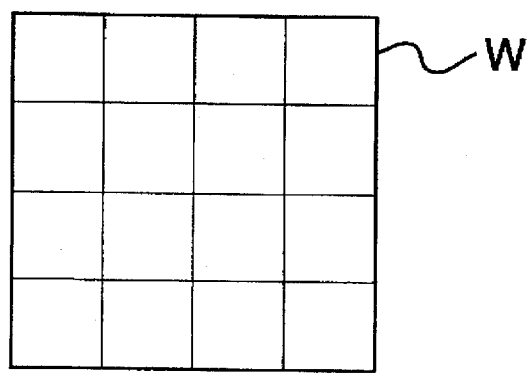
FIG. 80 is a view showing the small block in detail.

In this recording method, for example, a small block W in which totally 16 meshes of longitudinal 4×transverse 4 are adjoined to one another into a square is set as shown in FIG. 80, and this small block W is arrayed transversely and longitudinally into a matrix on the recording surface 20 as shown in FIG. 79, whereby a rectangular information recording area 23 is formed (in addition, the boundary lines between the small blocks W in FIG. 79 are virtual). Out of the patterns into which the small blocks W can be formed by white and black marks (values) being added to the meshes, only patterns whose number of succeeding meshes of the same value either in the longitudinal or transverse direction is 3 or less are adopted as specified patterns. In this case, the small blocks W can be formed into such specified patterns in 22,874 ways, where one small block can be associated with the values of 14 bits (in 16,384 ways). Then, the digital information to be recorded is divided according to the number of small blocks W so that pieces of unitary information are created, where the pieces of unitary information are allocated to the small blocks W, respectively, and thus recorded. With such a specified pattern adopted, the number of succeeding meshes of the same value either in the longitudinal or transverse direction throughout the entire information recording area 23 is necessarily 6 or less, whereby reading errors can be prevented from occurring.

Figure 81:
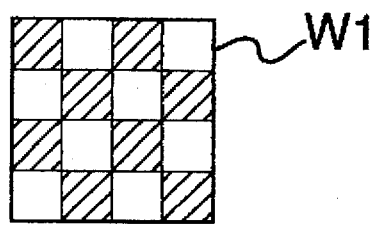
FIG. 81 is a view showing a control pattern set in the small block of left upper corner in FIG. 79.
Figure 82:
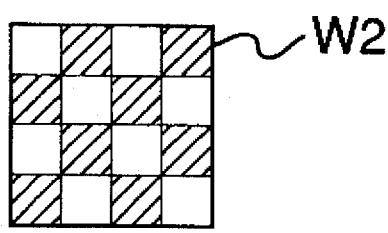
FIG. 82 is a view showing a pattern resulting from rotating the control pattern of FIG. 81 to 90 degrees.

In the example shown in FIG. 79, a control pattern W1 of checkered pattern (see FIG. 81) is assigned to the small block of the left top corner with the aims of uniquely determining the top and bottom, right and left of the recording surface and of obtaining clocking information for discriminating the size of the meshes. In addition, it is assumed that this control pattern W1 and a pattern that is formed by rotating the control pattern W1 (see FIG. 82) are not adopted as the specified pattern. Since this control pattern W1 is a pattern in which white and black meshes are alternately placed, finding the control pattern W1 within the recording surface 20 makes it possible to discriminate the size of the meshes. Further, finding the control pattern W1 also makes it possible to uniquely discriminate the top and bottom, right and left of the recording surface 20.

Figure 83:
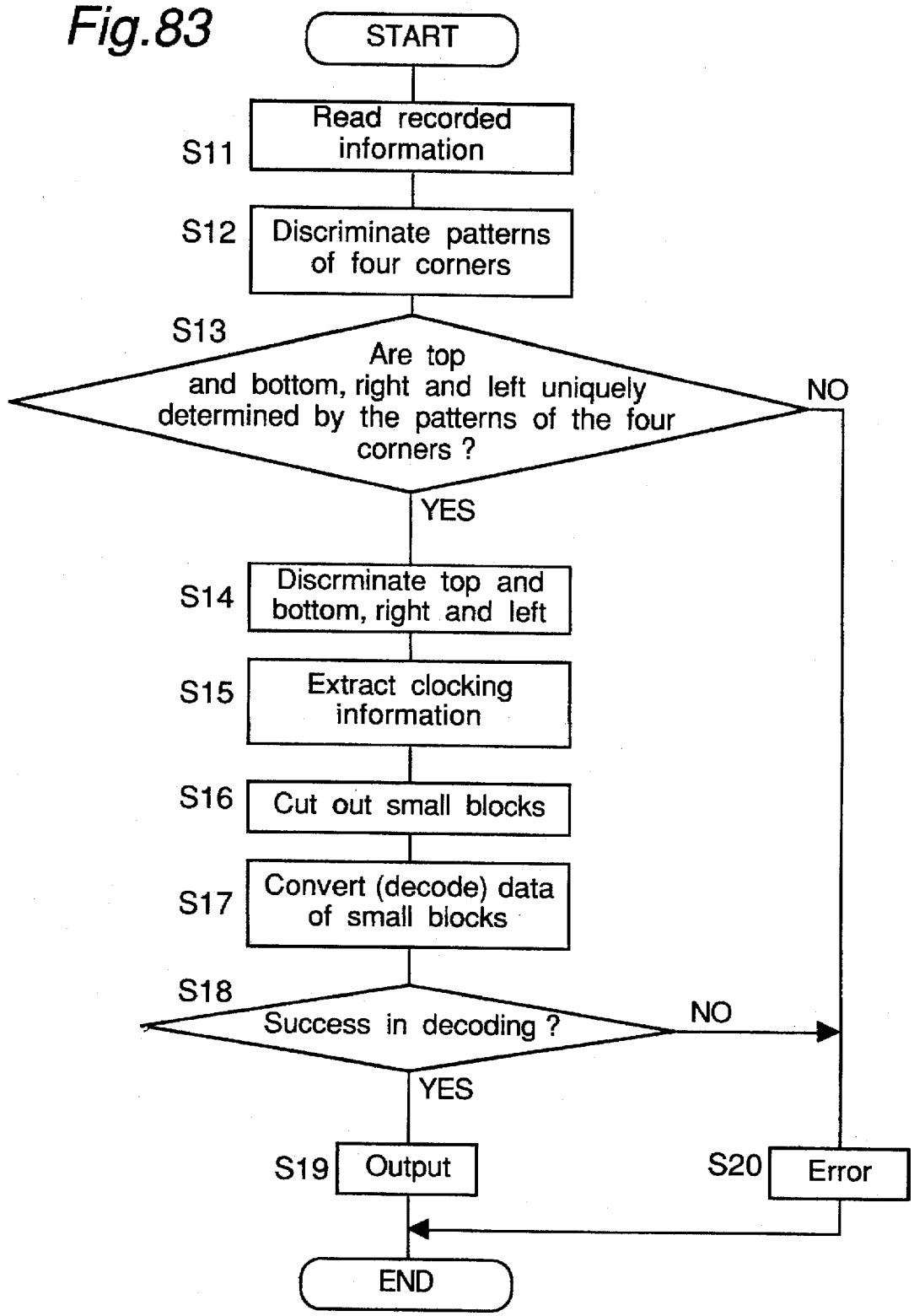
FIG. 83 is a chart showing a processing flow for reading the information recorded in the embodiment of FIG. 79.

When information recorded by such an information recording method is read, the information recorded on the recording surface 20, as shown in FIG. 83, is read and converted into image information (S11), and then the control pattern W1 is found by discriminating the four-corner patterns of the information recording area 23 (S12, S13). The top and bottom, right and left, and the clocking information are obtained from this control pattern W1 (S14, S15). Based on them, small blocks W are cut out from the information recording area 23 (S16), and the information (specified pattern) recorded in the units of small blocks is converted into the original data (S17), whereby the recorded information is decoded (S18, S19). If the control pattern W1 cannot be found at step S13, it is regarded as a reading error and processed as such (S20). By finding the control patterns W1 placed at the four-corner small blocks in this way, the reading process can be carried out with high efficiency.

Also, as in the information recording methods using segments as described before, index information may be recorded to small blocks located at particular positions within the information recording area 23. In such a case, the index information is assumed to contain the number of small blocks (longitudinal×transverse, or total), data size, data modulation method, checksum, error correction method, types of applications to which data is usable, etc.

For example, index information is recorded to a small block W placed at the right top corner in the example of FIG. 79. In this case, in reading operation, after the control pattern W1 is found from the recording surface 20, the small block W of the right top corner is cut out and then a specified pattern represented by this small block W is examined, whereby the index information can be obtained. Since small blocks W are cut out in order starting with each end, the small blocks W of the four corners can be cut out earlier than the other small blocks, so that their information can be read out earlier. It is noted that the index information that can be recorded in one small block is limited to 14 bits or less in this example.

Further, to increase the redundancy of index information, it is also possible to repeatedly record identical index information to a plurality of small blocks, or to record index information in excess of 14 bits to over a plurality of small blocks.

Further, when the information recording area is formed by arraying the small blocks W, the small blocks W can be arrayed according to specified array rules including the direction and number with which the small blocks W should be arrayed, as in the case of above-described information recording methods using segments. Thus, in reading operations, the original digital information can be easily restored based on the array rules.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for recording digital information, comprising the steps of virtually setting in a matrix form meshes corresponding to bits on a planar recording surface, providing the meshes with optically recognizable marks corresponding to digital information to be recorded, and recording the digital information to be recorded as a two-dimensional pattern, and further comprising the steps of:

setting a specific pattern for representing a location within the recording surface, said specific pattern being made up by giving the marks in a predetermined pattern to a plurality of meshes which are adjoined to one another into a specific shape, and setting a rectangular block which is composed of a plurality of meshes adjoined to one another longitudinally and transversely into a rectangular shape and which has longitudinal and transverse dimensions larger than those of the specific pattern;

setting a segment in which the specific patterns are overlaid or circumscribed to the rectangular block in the units of meshes;

setting an information recording area in which the two-dimensional pattern is to be expressed, by arraying a plurality of the segments without clearances on the recording surface;

preparing pieces of unitary information by dividing the digital information to be recorded according to a number of the segments, and assigning the pieces of unitary information to the segments, respectively; and recording the pieces of unitary information to meshes other than those occupied by the specific patterns within the respective segments.

2. The method for recording digital information according to claim 1, further comprising the steps of:

preparing divisional patterns by dividing specific patterns in at least one direction of longitudinal and transverse directions within the respective segments, and locating the divisional patterns so that they are inscribed on the four corners of the rectangular block, respectively;

arraying the segments so that the specific pattern is synthesized from the divisional patterns allocated to adjoining four rectangular blocks, over a point where the four rectangular blocks are adjoining one another with their vertices abutting.

3. The method for recording digital information according to claim 2, wherein:

in the segments present along a perimeter of the information recording area, the divisional patterns that are located on the perimeter side of the blocks are combined with the divisional patterns that are circumscribed to the blocks to synthesize the specific pattern.

4. The method for recording digital information according to claim 1, further comprising the step of:

recording to the segments, number information representing a sequence of the pieces of unitary information assigned to the segments.

5. The method for recording digital information according to claim 1, further comprising the step of:

recording to the segments, adjacency information representing whether or not each of the segments has a adjoining segment.

6. The method for recording digital information according to claim 1, wherein:

the segments are arrayed according to specified array rules containing a direction and a number in which the segments should be arrayed.

7. A method for decoding digital information, for reading information recorded by the method for recording digital information according to claim 2, comprising the steps of:

recognizing a portion of the recording surface corresponding to a corner of the information recording area;

recognizing four specific patterns located at positions corresponding to vertices of one rectangular block present at the corner of the information recording area;

decoding, within one segment specified by the four specific patterns in the information recording area, a pattern represented by meshes other than those occupied by the specific patterns to thereby read the unitary information assigned to the segment;

detecting four specific patterns located at positions corresponding to vertices of a rectangular block adjoining the one rectangular block;

decoding, within a segment adjoining the one segment specified by the four specific patterns in the information recording area, a pattern added to meshes other than those occupied by the specific patterns to thereby read the unitary information assigned to the segment; and linking the unitary information read from the one segment with the unitary information read from the segment adjoining the one segment.

8. An apparatus for decoding digital information, for reading information recorded by the information recording method according to claim 2, comprising:

a reading means opposed to the recording surface, for outputting image information representing an opposing portion out of a two-dimensional pattern recorded on the recording surface; and a control means for performing control steps of: moving the recording surface and the reading means relatively to each other; recognizing a portion of the recording surface corresponding to a corner of the information recording area based on image information outputted by the reading means; thereafter, recognizing four specific patterns located at positions corresponding to vertices of one rectangular block present at the corner of the information recording area; decoding, within one segment specified by the four specific patterns in the information recording area, a pattern represented by meshes other than those occupied by the specific patterns to thereby read the unitary information assigned to the segment; subsequently, with a reading range in the recording surface changed by moving the recording surface and the reading means relatively to each other, detecting four specific patterns located at positions corresponding to vertices of a rectangular block adjoining the one rectangular block; decoding, within a segment adjoining the one segment specified by the four specific patterns in the information recording area, a pattern added to meshes other than those occupied by the specific patterns to thereby read the unitary information assigned to the segment; and linking the unitary information read from the one segment with the unitary information read from the segment adjoining the one segment.

9. The apparatus for decoding digital information according to claim 8, wherein the reading means comprises an optical system that can change a magnification with which a two-dimensional pattern recorded on the recording surface is converted into the image information;

the control means performs at least a control step of changing the magnification of the optical system between the step of recognizing a portion of the recording surface corresponding to a corner of the information recording area and the step of reading the unitary information from the segment specified by the four specific patterns in the information recording area.

10. A method for recording digital information, comprising the steps of virtually setting in a matrix form meshes corresponding to bits in a generally rectangular information recording area provided within a planar recording surface, providing the meshes with optically recognizable marks corresponding to digital information to be recorded, and recording the digital information to be recorded as a two-dimensional pattern, and further comprising the steps of:

arranging a plurality of specific patterns for representing a location within the recording surface in such a way that the specific patterns are spaced from and paralleled to one another with specified intervals in directions of row and column in the information recording area, said specific patterns being made up by giving the marks in a specified pattern to a plurality of meshes which are adjoined to one another into a specific shape; and arranging the specific patterns arrayed in the direction of row or column to locations where the specific patterns protrude out of the information recording area with respect to at least one side of the information recording area.

11. The method for recording digital information according to claim 10, further comprising the step of:

placing, in marginal portions each defined by a side of the information recording area and opposing sides of two adjacent protruding specific patterns, a frame pattern extending along an outer tangent line of the information recording area with at least a clearance of one mesh size with respect to the opposing side of the protruding specific patterns.

12. The method for recording digital information according to claim 10, further comprising the step of:

arranging, in the marginal portions, clocking patterns provided with marks alternately different from one another with respect to the direction along the side of the information recording area.

13. The method for recording digital information according to claim 3, further comprising the step of:

switching the presence or absence of patterns in the marginal portions each defined by a side of the information recording area and the circumscribed divisional patterns, between segments present at the corners of the information recording area and the other segments out of the segments present along the perimeter of the information recording area, or arranging patterns different from one another in the marginal portions concerning the segments present at the corners of the information recording area and the other segments out of the segments present along the perimeter of the information recording area.

14. The method for recording digital information, according to claim 1, further comprising the step of:

expressing, in units of meshes, characters or symbols that can be understood by persons as they are, at part of the information recording area.

15. The method for recording digital information, according to claim 1, further comprising the steps of:

arranging, in the information recording area, specific patterns for representing a location within the recording surface, said specific patterns being made up by giving the marks in a specific pattern to a plurality of meshes which are adjoined to one another into a specific shape; and expressing, in the units of meshes, characters or symbols that can be visually recognized by persons, at part of regions other than regions where the specific patterns are arranged, in the information recording area.

16. The method for recording digital information, according to claim 1, further comprising the steps of:

arranging, in the information recording area, specific patterns for representing a location within the recording surface, said specific patterns being made up by giving the marks in a specified pattern to a plurality of meshes which are adjoined to one another into a specific shape; and arranging patterns representing top and bottom, right and left, and front and rear of the recording surface, at part of regions other than regions where the specific patterns are arranged, in the information recording area.

17. The method for recording digital information, according to claim 1, further comprising the steps of:

recording bar codes made up from bars and spaces in the units of meshes, at part of the information recording area.

18. The method for recording digital information, according to claim 1, further comprising the steps of:

arranging in regions other than regions occupied by bar codes in the information recording area, specific patterns for representing a location within the recording surface, said specific patterns being made up by giving the marks in a specified pattern to a plurality of meshes which are adjoined to one another into a specific shape.

19. The method for recording digital information according to claim 3, further comprising the step of:

recording in marginal portions each defined by a side of the information recording area and the circumscribed divisional patterns, index information representing at least one of an array state of the segments, size of digital information recorded in the information recording area, coding method and error correction method for pieces of unitary information recorded within the segments.

20. The method for recording digital information according to claim 1, further comprising the step of:

recording in segments present at particular positions within the information recording area, index information representing at least one of an array state of the segments, size of digital information recorded in the information recording area, coding method and error correction method for pieces of unitary information recorded within the segments.

21. The method for recording digital information according to claim 20, wherein:

the information recording area is set into a generally rectangular shape; and the index information is recorded to segments present at the four corners of the information recording area.

22. A method for recording digital information, comprising the steps of virtually setting in a matrix form meshes corresponding to bits on a planar recording surface, providing the meshes with optically recognizable marks corresponding to digital information to be recorded, and recording the digital information to be recorded as a two-dimensional pattern, and further comprising the steps of:

setting rectangular small blocks composed of a plurality of adjoining meshes;

arraying a plurality of the small blocks without clearances on the recording surface to thereby set an information recording area where the two-dimensional pattern is to be expressed; and preparing pieces of unitary information by dividing the digital information to be recorded according to a number of the small blocks, and assigning and recording the pieces of unitary information to the small blocks, respectively; and further comprising the step of:

recording to small blocks present at particular locations in the information recording area, index information representing at least one of an array state of the small blocks, size of digital information recorded in the information recording area, and coding method and error correction method for the pieces of unitary information recorded in the small blocks.

23. The method for recording digital information according to claim 22, wherein:

the information recording area is set into a generally rectangular shape; and the index information is set to small blocks present at the four corners of the information recording area.

24. The method for recording digital information according to claim 19, further comprising the step of:

recording identical index information to a plurality of marginal portions, segments, or small blocks, respectively.

25. The method for recording digital information according to claim 20, further comprising the step of:

recording identical index information to a plurality of marginal portions, segments, or small blocks, respectively.

26. The method for recording digital information according to claim 22, further comprising the step of:

recording identical index information to a plurality of marginal portions, segments, or small blocks, respectively.

27. The method for recording digital information, according to claim 10, further comprising the step of:

expressing, in units of meshes, characters or symbols that can be understood by persons as they are, at part of the information recording area.

28. The method for recording digital information, according to claim 22, further comprising the step of:

expressing, in units of meshes, characters or symbols that can be understood by persons as they are, at part of the information recording area.

29. The method for recording digital information, according to claim 10, further comprising the steps of:

arranging, in the information recording area, specific patterns for representing a location within the recording surface, said specific patterns being made up by giving the marks in a specific pattern to a plurality of meshes which are adjoined to one another into a specific shape; and expressing, in the units of meshes, characters or symbols that can be visually recognized by persons, at part of regions other than regions where the specific patterns are arranged, in the information recording area.

30. The method for recording digital information, according to claim 22, further comprising the steps of:

arranging, in the information recording area, specific patterns for representing a location within the recording surface, said specific patterns being made up by giving the marks in a specific pattern to a plurality of meshes which are adjoined to one another into a specific shape; and expressing, in the units of meshes, characters or symbols that can be visually recognized by persons, at part of regions other than regions where the specific patterns are arranged, in the information recording area.

31. The method for recording digital information, according to claim 10, further comprising the steps of:

arranging, in the information recording area, specific patterns for representing a location within the recording surface, said specific patterns being made up by giving the marks in a specified pattern to a plurality of meshes which are adjoined to one another into a specific shape; and arranging patterns representing top and bottom, right and left, and front and rear of the recording surface, at part of regions other than regions where the specific patterns are arranged, in the information recording area.

32. The method for recording digital information, according to claim 22, further comprising the steps of:

arranging, in the information recording area, specific patterns for representing a location within the recording surface, said specific patterns being made up by giving the marks in a specified pattern to a plurality of meshes which are adjoined to one another into a specific shape; and arranging patterns representing top and bottom, right and left, and front and rear of the recording surface, at part of regions other than regions where the specific patterns are arranged, in the information recording area.

33. The method for recording digital information, according to claim 10, further comprising the step of:

recording bar codes made up from bars and spaces in the units of meshes, at part of the information recording area.

34. The method for recording digital information, according to claim 22, further comprising the step of:

recording bar codes made up from bars and spaces in the units of meshes, at part of the information recording area.

35. The method for recording digital information, according to claim 10, further comprising the step of:

arranging in regions other than regions occupied by bar codes in the information recording area, specific patterns for representing a location within the recording surface, said specific patterns being made up by giving the marks in a specified pattern to a plurality of meshes which are adjoined to one another into a specific shape.

36. The method for recording digital information, according to claim 22, further comprising the step of:

arranging in regions other than regions occupied by bar codes in the information recording area, specific patterns for representing a location within the recording surface, said specific patterns being made up by giving the marks in a specified pattern to a plurality of meshes which are adjoined to one another into a specific shape.

* * * * *